United States Patent [19]
Vanhove et al.

[11] Patent Number: 5,963,973
[45] Date of Patent: Oct. 5, 1999

[54] MULTIPROCESSOR COMPUTER SYSTEM INCORPORATING METHOD AND APPARATUS FOR DYNAMICALLY ASSIGNING OWNERSHIP OF CHANGEABLE DATA

[75] Inventors: Elisabeth Vanhove, Les Clayes Sous Bois, France; Minoru Inoshita, Glendale, Ariz.; William A. Shelly; Robert J. Baryla, both of Phoenix, Ariz.

[73] Assignee: Bull HN Information Systems Inc., Billerica, Mass.

[21] Appl. No.: 08/796,309

[22] Filed: Feb. 7, 1997

Related U.S. Application Data

[60] Provisional application No. 60/033,007, Dec. 16, 1996.

[51] Int. Cl.$^6$ .............................. G06F 12/00; G06F 13/00
[52] U.S. Cl. .............................. 711/130; 711/3; 711/118; 711/121; 711/154
[58] Field of Search .............................. 711/3, 118, 121, 711/130, 147, 154, 123

[56] References Cited

U.S. PATENT DOCUMENTS

| | | | |
|---|---|---|---|
| 4,161,024 | 7/1979 | Joyce | 711/121 |
| 4,167,782 | 9/1979 | Joyce | 711/141 |
| 4,195,340 | 3/1980 | Joyce | 711/133 |
| 5,193,163 | 3/1993 | Sanders et al. | 711/122 |
| 5,398,325 | 3/1995 | Chang et al. | 711/118 |
| 5,526,495 | 6/1996 | Shibata et al. | 395/307 |
| 5,590,299 | 12/1996 | Bennett | 711/5 |
| 5,644,753 | 7/1997 | Ebrahim et al. | 711/131 |

Primary Examiner—Tod R. Swann
Assistant Examiner—Tuan V. Thai
Attorney, Agent, or Firm—JS S. Solakian; JH H. Phillips

[57] ABSTRACT

A computer system including a group of CPUs, each having a private cache which communicates with its CPU to receive requests for information blocks and for servicing such requests includes a CPU bus coupled to all the private caches and to a shared cache. Each private cache includes a cache memory and a cache controller having: a processor directory for storing identification words identifying information blocks resident in the cache memory and including a status field indicative of the write permission authority the local CPU has on the block, an output buffer for storing the identification words of a block resident in the cache memory for which the CPU does not have and seeks write permission and for selectively sending identification words and an invalidate command onto the CPU bus, an input buffer for storing the identification words of all recent write permission requests in the group, a comparator for comparing the identification words in the output buffer with the identifications in the input buffer and control logic, responsive to the comparator sensing a compare condition (typically indicating a request by another CPU for write permission on the same block for which the local CPU has also requested write permission), for aborting the write permission request of the local CPU and establishing a retry process.

10 Claims, 66 Drawing Sheets

```
0    PFTCH-KTG
     WAIT
   1    PFTCH-LT
        RREAD-L
        RREAD-C
        RREAD-OB
     2    WRBACK-UNC
       3    SBCHG-R
            SBCHG-C
            SBCHG-W
         4    PFTCH-UNC
           5    WRBACK-CND
             6    PFTCH-CND
               7    AXCMD-XSV
```

FIG. 8A

| NEXT 0:4 | | DIR CMD | SOURCE OF ADRL | SOURCE OF ADRH, LEV | USAGE AND COMMENTS |
|---|---|---|---|---|---|
| | | | | | AX COMMANDS |
| 0000 | NODIR | NOP | | | NO CD DIR OPERATION |
| 0001 | AXCMD-XSV | CONS | AX-ADRL | TED | DO NEXT XMITTED AXCMD OR STACKED AXCMD OR SAVED AXCMD (AFTER WAIT-TRGO) |
| 0010 | PFTCH-CND | CONS | DD-ADRL | SOB-ADRH | IF AXCMD.EQ.NOP, PREFETCH INST |
| | AXCMD | CONS | AX-ADRL | TED | ELSE DO XMITTED AXCMD |
| 0011 | WRBAK-CND | READ | SOB-ADRL | SOB-LEV | IF AXCMD.EQ.NOP, READ USING SBLK ADR, LEV IN SOB, TO WRITEBACK OB |
| | AXCMD | CONS | AX-ADRL | TED | ELSE DO XMITTED AXCMD |
| | | | | | PREFETCH, WRITEBACK |
| 0100 | PFTCH-LT | CONS | DD-ADRL | TMP-ADRH | LOAD TEMP ADREG, PREFETCH WITH TEMP-ADRH USED FOR TRA OR TRA CON MISS AFTER RECEIVING TRGO=1 |
| 0101 | PFTCH-KTG XMITTED IF TRGO | CONS | DD-ADRL | TMP-ADRH | KEEP TEMP ADREG, PREFETCH WITH TEMP-ADRH, (INHIBITS LOADING IF HIT OBADREG) AFTER TRGO USED FOR TRA CON HIT AFTER RECEIVING TRGO=1 |

| | | | | | |
|---|---|---|---|---|---|
| 0110 | PFTCH-UNC | CONS | DD-ADRL | SOB-ADRH | PREFETCH, SOB SPECIFIES IB ADREG (UNCONDITIONAL : IB EMPTY) |
| 0111 | WRBAK-UNC | READ | SOB-ADRL | SOB-LEV | READ USING SBLK ADR, LEV IN SOB, TO WRITBACK OB |
| | | | | | ACB OPERATIONS IN CD |
| 1000 | SBCHG-R | READ | DD-ADRL | DD-LEV | ACB BLOCK CHANGE, READ USING DD DIR LEVEL |
| 1001 | RREAD-L | NOP THEN READ | DD-ADRL THEN SOB-AD | DD-ADRH THEN SOB-LEV | USED TO LOAD THE ADDRESS OF A MISSING BLOCK INTO OB ADR.REG, AND DO THE WRITE BACK OF THE OB TO THE RAM |
| 1010 | SBCHG-C | CONS | DD-ADRL | DD-ADRH | USED TO WRITE ON A VALID BLOCK (INVALIDATE AT ACB LEVEL) |
| 1011 | SBCHG-W | W1W2 | DD-ADRL | DD-ADRH | ACB BLOCK CHANGE, WRITE COMPARE ACB BLOCK ADR WITH OB BLOCK ADR |
| | | | | | PREFETCH, REREAD, WAIT |
| 1100 | NO MORE USED (EX ABORT) | | | | WAS ABORT IF BPU FREEZE OR ERROR TO ABORT PAGING BUT NOT ASB REQUEST PROCESSING NO MORE CODED IN NEXT FOR PERFORMANCE REASON. |
| 1101 | WAIT | | DD-ADRL | DD-ADRH | WAIT-TRGO INHIBIT LOADING OB ADR |
| 1110 | RREAD-C | CONS | DD-ADRL | DD-ADRH | USED FOR EIS PREFETCH ON OPERAND, CONDITIONAL TRANSFER AND INVALIDATE INTERFERENCE |
| 1111 | RREAD-OB | CONS | SOB-ADRL | SOB-LVL | USED IN EIS EXCLUSIVELY AND SIPHON TO REREAD THE BLOCK SIPHONED FROM THE OB |

FIG. 8B

| B-CL-X2 0:3 | VIRT TO REAL ADDR | CACH OPND | LOAD OBUFF OPND ADREG | |
|---|---|---|---|---|
| 000 | | | | NOP: NO OPND ACCESS |
| 001 | | | | RESERVED |
| 010 | | | | RESERVED |
| 011 | | | | RESERVED |
| 100 | | | | RESERVED |
| 101 | YES | READ ONLY | NO | READ ONLY CACHE OPERAND ACCESS (IN CD SET BUF-IBVAL-L2 IN CDAD, SET AMBUSY) |
| 110 | YES | READ ONLY | YES LOB | READ ONLY CACHE OPERAND ACCESS AND LOAD OB ADDR GIVEN BY B-LOB 0:2, EIS SEQ BUFFERED READ CMD'S (IN CD ENABLES LOAD OF OB) |
| 111 | YES | WRITE READ | YES LOB | CACHE READ/WRITE AND LOAD OB ADR'S, FOR SINGLE ACESS WRITE'S, RAR;EIS BUFFERED READ/WRITE ACCESS CMD'S (IN CD ENABLES LOAD OF OB, SET OB VALID AND AMBUSY) |

FIG. 9

| | READ ONLY CACHE OPND | WRITE /READ CACHE OPND | LOAD OBUFF OPND ADREG | |
|---|---|---|---|---|
| 000 | NO | NO | | NOP |
| 001 | NO | NO | RESET | RESET OB ADDR REG VALID ON LAST EIS CMD, CHG TO GEN-CMD;SOB (0_1) SPECIFIES OBSS-VAL-L2 TO RESET<br>00 DO NOT RESET<br>01 RESET OB00, 01-VAL-L2=0<br>10 RESET OB10, 11-VAL-L2=0<br>11 RESET OB00, 01, 10, 11-VAL-L2=0<br>NOT USED (EXCEPT FOR ENABLIN OB-HIT) |
| 010 | NO | NO | RESET | RESET OB ADDR REG VALID IN WRITEBACK, THRU CYCLE SOB (1_2), SAVED FROM PRIOR CYCLE.<br>00 RESET OB00-VAL-L2=0<br>01 RESET OB01-VAL-L2=0<br>10 RESET OB10-VAL-L2=0<br>11 RESET OB11-VAL-L2=0<br>(IN CD ENABLES LOAD OF OB VALID, DISABLE LOAD OF OB) |
| 011 | NO | NO | NO | DATA AVAILABLE FOR CD PAGING OPERAND ACCESS ON NEXT CYCLE ON CDDT BUS |
| 100 | NO | NO | IB (SOB) | LOAD REAL ADDR IN IB ADDRESS REG-NO PREFETCH (SET BUF-IBVAL-L2 AND ENABLE LOAD OF IB IN CDAD) |
| 101 | YES | NO | IB | LOAD REAL ADDR IN IB ADDRESS REG-PREFETCH (SET BUF-IBVAL-L2 AND ENABLE LOAD OF IB IN CDAD, SET VALID_CONS) |

FIG. 10

| 110 | YES | NO | YES | LOAD OB ADDR. REG H, L, LEV SPECIFIED BY LOB (0_1)<br>READ OPERAND ACCESS<br>(IN CD ENABLES LOAD OF OB, SET OB VALID AND AMBUSY IF RREAD-L, SET VALID-CONS |
| --- | --- | --- | --- | --- |
| 111 | NO | YES | YES | LOAD OB ADDR. REG H, L, LEV SPECIFIED BY LOB (0_1)<br>WRITE OPERAND ACCESS, INIT CD-DIR<br>WRITE-MODIFIED BIT IF BLOCK-STATUS=V~M<br>(IN CD ENABLES LOAD OF OB, SET OB VALID AND AMBUSY, SET VALID-CONS) |

FIG. 11

|  | READ | CONS | WRITE |  |
| --- | --- | --- | --- | --- |
| 000 | YES | NO | NO | READ CYCLE ONLY |
| 001 | YES | NO | YES | READ FOLLOWED BY WRITE, WITH W1=1,W2=0 |
| 010 | YES | NO | NO | READ ONLY, TRANSMIT RB(I) TO DD (MPSC) |
| 011 |  |  |  | RESERVED |

| | | UPDATE | |
|---|---|---|---|
| | | CD DIRECTORY | DD DIRECTORY |
| INTERNAL REQUEST | MISS REQUEST READ R&E | AFTER THE CONSULTATION, EVEN IF THE REQUEST HASN'T YET BEEN SENT ONTO THE ACB | ONE CYCLE AFTER THE RECEPTION OF THE ACKNOWLEDGMENT FROM THE SHARED CACHE (CYCLE 2&3) |
| | INVALIDATE REQUESTS | AFTER THE CONSULTATION, AND THEN WAITS FOR THE ACKNOWLEDGE/ NOT ACKNOWLEDGE (ACK/NACK) FROM DD | |
| | INTERRUPT READ REGISTER WRITE REGISTER | NO | NO |

FIG. 30

| | | UPDATE | |
|---|---|---|---|
| | | CD DIRECTORY | DD DIRECTORY |
| EXTERNAL REQUEST | MISS REQUEST READ R&E | AFTER THE DD DIRECTORY UPDATE, AT A LATER POINT IN TIME IF A HIT OCCURS IN DD | ONE CYCLE AFTER THE RECEPTION OF THE IMPLICIT OR EXPLICIT ACKNOWLEDGEMENT FROM THE SHARED CACHE (CYCLE 2 & 3) |
| | INVALIDATE REQUESTS | AFTER THE DD DIRECTORY UPDATE, AT A LATER POINT IN TIME IF A HIT OCCURS IN DD | |
| | INTERRUPT READ REGISTER WRITE REGISTER | NO | NO |

FIG. 34

| DTCL0 i:1 | DTCL1 i:1 | MEANING |
|---|---|---|
| 0 | 0 | NOP - NO DATA TRANSFER |
| 0 | 1 | THE SHARED CACHE WILL BE THE OWNER OF THE DATA BUS ON THE NEXT CYCLE AND IT WILL SEND DATA TO CCi |
| 1 | 0 | THE PRIVATE CACHE i WILL BE THE OWNER OF THE DATA BUS ON THE NEXT CYCLE AND IT WILL SEND DATA FOR A SWAP OR A WRITE REGISTER |
| 1 | 1 | THE PRIVATE CACHE i WILL BE THE OWNER OF THE DATA BUS ON THE NEXT CYCLE AND IT WILL SEND DATA RELATED TO A SIPHON OPERATION |

FIG. 41

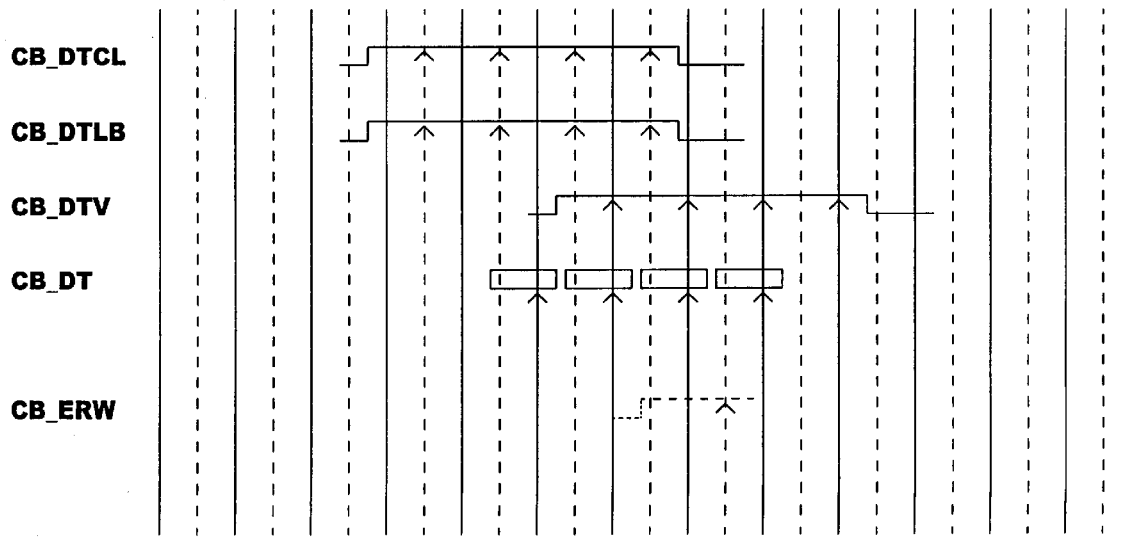

FIG. 42

MULTIPROCESSOR COMPUTER SYSTEM INCORPORATING METHOD AND APPARATUS FOR DYNAMICALLY ASSIGNING OWNERSHIP OF CHANGEABLE DATA

CROSS REFERENCE TO RELATED PROVISIONAL APPLICATION

This application claims the benefit of the filing date of U.S. Provisional patent application Ser. No. 60/033,007, filed Dec. 16, 1996, entitled MULTIPROCESSOR COMPUTER SYSTEM EMPLOYING PRIVATE CACHES FOR INDIVIDUAL CENTRAL PROCESSOR UNITS AND A SHARED CACHE by William A. Shelly et al.

FIELD OF THE INVENTION

This invention relates to the art of computer hardware and, more particularly, to a multiprocessor computer system employing private cache memories for individual central processor units and at least one shared cache memory bridging diverse central processor and system busses.

BACKGROUND OF THE INVENTION

In the generation-to-generation development of mainframe computer systems, increased speed of operation is sought for a given class of system, and it is therefor useful to minimize the time required to carry out operations which are performed often. This is particularly the case in multiprocessor systems because frequent operations which cause interaction between the processors, or in which one processor briefly takes over a common facility, affects the performance of the entire system.

Some modern computer systems employ multiple processors, each of which has its own private cache memory. As is well known in the art, if a given processor asks its private cache for a block (typically, a group of several operand words) of information which is not currently resident, the private cache control requests the block from one or more additional units in the system, at least one of which should be able to fill the request. The other units may include the private caches of the other processors and a main memory. Other systems, such as that contemplated, interpose a secondary, shared cache between the several private caches and a main memory (and possibly other information sources). In this configuration, a private cache miss in a given processor results in a request to at least the shared cache and, as in the present system, also to all the private caches in a group of processors. If none of these units have a valid copy of the requested block, the shared cache seeks it in main memory or elsewhere.

It is common, in multiprocessor systems in which each processor has its own private cache and in which there is a shared cache, for more than one copy of a given information block to be resident in such private caches and/or the shared cache at a given time. If more than one copy of a given information block is, indeed, resident in the several caches at a given time, it is necessary, to maintain coherence, that only one of the processors "owns" the block and is therefore empowered to modify the block. Therefore, if a processor which has a copy of, but does not own, a block in its private cache wishes to use the block in a fashion which does not require modification, the request sent to its private cache results in a cache hit, and the information is supplied to the processor from its private cache.

However, if a processor which has a copy of, but does not own, the block in its private cache wishes to use the block in a fashion which may require modification, it has no authority to do so. Consequently, it must request ownership of the block If the block is not in use by the current owner and no other processor has an outstanding request to itself assume ownership, ownership is granted (by an arbiter which is the shared cache in the exemplary system) to the requesting processor, and it proceeds with the operation which may result in modification to the block.

But, if the block is either already in use by the current owner or some other processor has already requested ownership, a conflict (interference condition) arises which must be resolved. Typically, this has been achieved by the arbiter notifying the requesting processor that it will not be granted ownership, the processor then waiting to try again or taking up another task and trying again later for ownership of the block of interest. The former approach, which suspends operation of the requesting processor, has an obvious speed penalty. The second approach is better, but the requesting processor must still wait for the arbiter's adverse decision before taking this course of action, and this is another source of adverse effect on performance.

Thus, it will be clear to those skilled in the art of multiprocessing, once these problems are understood, that if the fact that a request for ownership of a block by a given processor cannot be granted can be determined before the request is even broadcast to the other private caches and the shared cache, the requesting processor can more quickly take up other tasks before trying again, and a significant improvement in system speed could be achieved. It is to these ends that the present invention is directed.

OBJECTS OF THE INVENTION

It is therefore a broad object of this invention to provide, in a multiprocessor computer system in which each processor has its own cache and there is a shared cache, an improved process for each CPU's requesting and obtaining ownership of a block of information which it needs to modify.

It is a more specific object of this invention to provide such a process and corresponding logic circuitry by which fast and efficient servicing of requests by a given CPU for write permission on a block of information of which a valid block is resident in its local cache.

SUMMARY OF THE INVENTION

Briefly, these and other objects of the invention are achieved with a computer system including one or more groups of central processor units, each having a private cache module which communicates bilaterally with its CPU to receive requests for instruction and operand information blocks and for servicing such requests. The computer system further includes, for each group of CPUs, a CPU bus coupled to all the private cache modules in the group for bilateral communication of address and control signals and information blocks. Within each group of CPUs, a shared cache unit is coupled to the CPU bus for bilateral communication with the several CPUs of address and control signals and information blocks.

Each private cache memory module includes a cache memory and a cache controller having a processor directory for storing identification words for corresponding information blocks resident in the cache memory, each identification word including a status field indicating a current authority of the local CPU to modify the corresponding information block, a first value in the status field indicating that the block is valid, but that the local CPU does not currently have authority to modify the corresponding information block and a second value in the status field indicating that the CPU does currently have such authority. When a write request is initiated, the status field in the processor director for the block is changed from the first value to the second value in anticipation that the request will be granted.

The cache controller also includes a command/address output buffer for receiving the identification words of blocks for which the local CPU has a valid copy, but does not have write permission on the block and seeks such permission and for selectively broadcasting such identification words onto the CPU bus. The command/address output buffer also associates an "invalidate" command which will be broadcast onto the CPU bus with the block address to seek to invalidate the block in all other caches on the CPU bus. Further, the cache controller includes a command/address input buffer for receiving from the CPU bus all requests for write permission from all CPUs on the CPU bus. A first comparator compares such requests in the command/address output buffer with the requests in the command/address input buffer, and if a compare condition is detected (indicating a prior request by another CPU for write permission on the same block for which the local CPU has also requested write permission), the request in the command/address output buffer is aborted. In the exemplary system, the abort operation is accomplished by changing the invalidate command in the command/address output buffer to a "NOP "(no operation) command such that, when the request is broadcast onto the CPU bus, no substantive action is taken. In addition, an operation is instituted to set the status field in the processor to a third value to indicate that the copy of the block in the local cache is no longer known to be the latest copy and is therefore invalid. Thus, it will be understood that the CPU which successfully obtained write permission on the block has successfully invalidated the block in the local CPU's cache.

To further enhance the efficiency of the system, each private cache controller also includes: a bus directory coupled to receive identification words from the command/ address input buffer when an acknowledgment signal has been received over the CPU bus (thereby updating the bus directory), and a command/address transfer buffer coupled to receive updated identifications words from the bus directory to provide for timely update, from the command/ address transfer buffer, of the processor directory at an opportune time. In addition, a second comparator monitors the identification words in the command/address output buffer and those in the command/address transfer buffer and, in the event of a compare, carries out the previously described abort of the local CPU's write permission request.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIGS. 4–40 relate to an actual implementation of a presently preferred embodiment of the invention; more particularly:

FIG. 4 is a private cache coherency model;

FIG. 5 is a shared cache coherency model;

FIG. 6 is a block diagram illustrating access conditions to a processor (CD) directory component;

FIG. 7 is a chart illustrating access priority to the CD directory;

FIGS. 8A–8B and 9–12 are tables showing certain "next" codes pertaining to CD directory access;

FIGS. 16A–16D, 17A–17B, 18A–18B and 19 respectively illustrate first, second, third and fourth aspects of data flow through a DDDP block component of the private cache controller;

FIG. 20 is a timing chart of signals sent by a private cache to a CPU bus;

FIG. 21 is a timing chart of signals sent by a shared cache to the CPU bus;

FIG. 23 is a block diagram of the CPU bus management logic;

FIG. 24 is block diagram of data flow through a DDSB block shown in FIG. 21;

FIGS. 25–29 are detailed logic diagrams of the DDSB block;

FIG. 30 is a table summarizing the updating of processor (CD) and CPU bus (DD) directories in the private cache controller consequent to internal requests;

FIGS. 31A–31B, 32A-1 through 32A-3 and 32B-1 through 32B-2 are flow diagrams illustrating cache controller behavior on internal requests which require a CD directory access;

FIG. 33 is a flow diagram illustrating cache controller behavior on a swap operation;

FIG. 34 is a table summarizing the updating of processor (CD) and CPU bus (DD) directories in the private cache controller consequent to external requests;

FIGS. 35A-1 through 35A-2, 35B, 36A–36B, 37A-1 through 37A-2 and 37B are flow diagrams illustrating cache controller behavior on external requests requiring a directory update;

FIG. 38 is a timing diagram illustrating boundary of interference operation;

FIG. 39 is a timing diagram illustrating null command operation;

FIG. 41 is a table summarizing DTCL coding; and

FIG. 42 is a timing diagram illustrating data transfer of a block.

DESCRIPTION OF THE PREFERRED EMBODIMENT(S)

Figure 1:
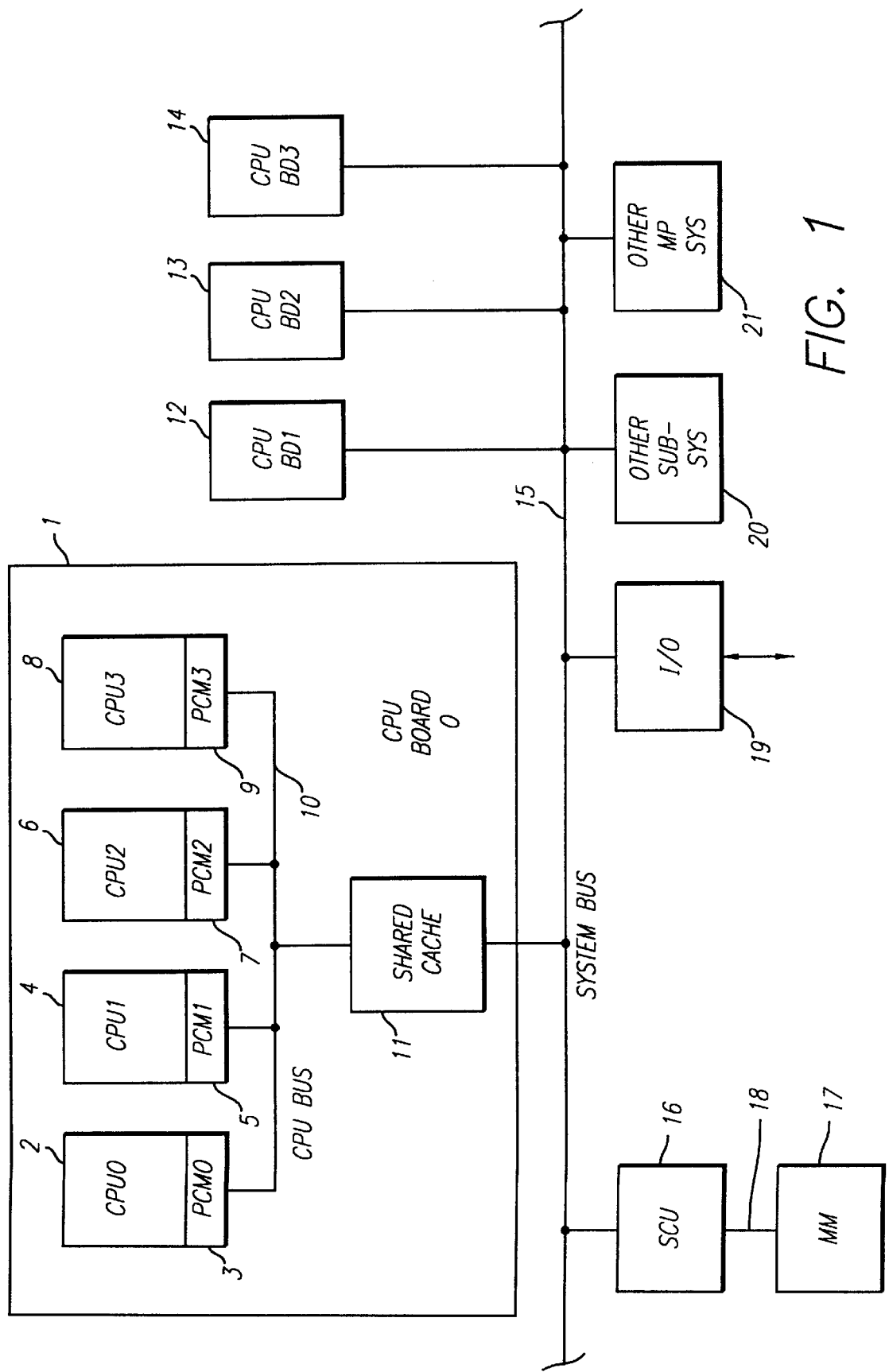
FIG. 1 is a high level block diagram of an exemplary multiprocessor computer system incorporating the invention.

Attention is first directed to FIG. 1 which is a high level block diagram of an exemplary multiprocessor computer system incorporating the invention. A first CPU board (CPU Board "0") 1 includes four central processor units 2 (CPU "0"), 4 (CPU "1"), 6 (CPU "2"), 8 (CPU "3"). Each of the central processor units 2, 4, 6, 8 situated on the first CPU board 1 includes an integral private cache memory module, 3, 5, 7, 9, respectively. The private cache modules 3, 5, 7, 9 are each configured as "store into"; i.e., the results of each completed operation performed in the CPU are stored into the private cache. Each of the private cache modules 3, 5, 7, 9 on CPU Board "0" 1 interface with a CPU bus 10 for direct communications between the CPUs 2, 4,6,8.

In the exemplary system, there are three additional CPU boards 12 (CPU Board "1"), 13 (CPU Board "2") and 14 (CPU Board "3"), each of which is substantially identical to CPU board 1 although those skilled in the multiprocessor art will understand that each CPU board and each CPU on each of the boards is assigned a unique identification number to facilitate communication and cooperation among the CPUs in the system.

CPU board 1 (i.e., CPU Board "0") also includes a shared cache 11 disposed between ("bridging") the CPU bus 10 and a system bus 15. It will be understood that each of the CPU boards 12, 13, 14 also each includes a CPU bus and a shared cache, identically oriented.

A system control unit 16 serves to couple the system bus 15 to a main memory unit 18 via a memory bus 17. In addition, one or more input/output units 19 interface the system bus 15 with various input/output subsystems, not shown, to achieve input/output functions on a system basis, all as well known to those skilled in the art. Similarly, other subsystems 20, not otherwise specified or shown, may be connected to the system bus 15 to complete a given multiprocessor system, and other, complete, multiprocessor systems, represented by the block 21, may also communicate with the multiprocessor system depicted in FIG. 1 via the system bus 15.

System control unit 16 also conventionally provides a multi-phase clock to all the system units.

Figure 2:
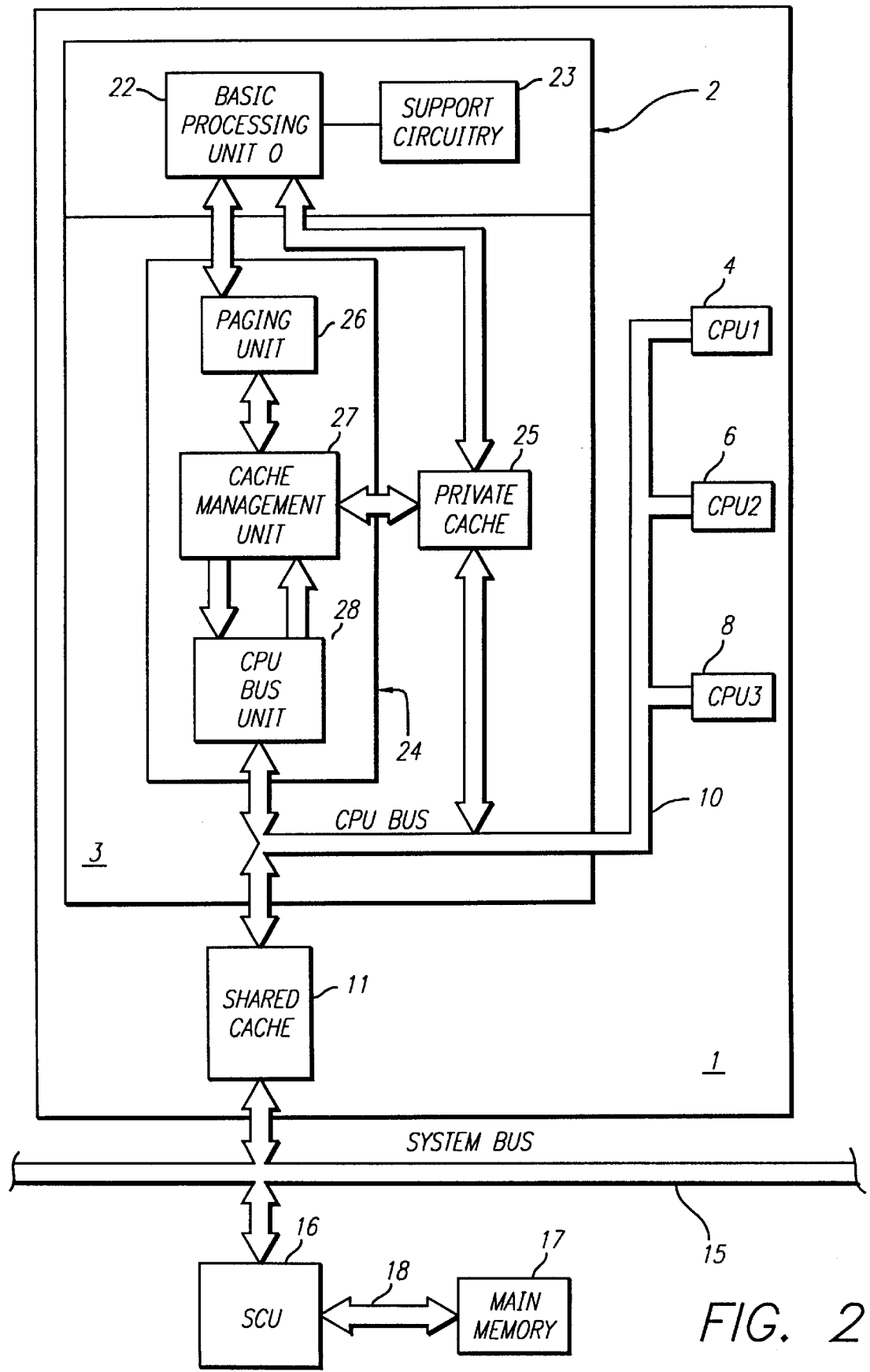
FIG. 2 is a slightly lower level block diagram showing additional details of a CPU board in the multiprocessor system of FIG. 1.

FIG. 2 is a slightly lower level block diagram of CPU "0" 2 of CPU board 1 (CPU Board "0"illustrating additional structure which is present in each CPU in the system. CPU "0" 2 includes a basic processing unit 22 and support circuitry 23 therefor. An example of a suitable basic processing unit 22 and support circuitry 23 may be found in U.S. Pat. No. 5,195,101, entitled EFFICIENT ERROR DETECTION IN A VLSI CENTRAL PROCESSING UNIT, by Russell W. Guenthner et al, assigned to the same assignee as the present invention and incorporated by reference herein.

As previously described, CPU "0" 2 also includes private cache module "0" 3 which constitutes a cache control unit 24 and a private cache 25 (which itself includes additional logic to be described below). Cache control unit 24 includes paging unit 26, cache management unit 27 and CPU bus unit 28. Paging unit 26 interfaces with basic processing unit "0" 22 and cache management unit 27. Cache management unit 27 also interfaces with private cache memory 25 and CPU bus unit 28. CPU bus unit also interfaces with CPU bus 10 and, via CPU bus 10, shared cache 11. Private cache 25 is also coupled directly to receive information from and send information to the CPU bus 10 and to receive information from and send information to basic processing unit "0" 22.

As previously described, shared cache 11 also interfaces with system bus 15 and, via system bus 15, with system control unit 16 and other systems/subsystems shown in FIG. 1. Main memory 17 may be accessed via the system control unit 16 and memory bus 18.

It will be seen that there are numerous paths for information flow among the various blocks shown in FIGS. 1 and 2. The types of information may include control, address, instructions and operands. A given CPU may directly access its own private cache module and indirectly access the private cache modules incorporated into the other CPUs on a shared CPU board. Thus, CPU "0" 2 can access, via the CPU bus 10, the shared cache 11 it shares with CPU "1" 4, CPU "2" 6 and CPU "3" 8. CPU "0" 2 can also, under defined conditions, access the private cache module of CPU "2" 6 (for example) via the CPU bus 10 to effect a local "siphon". Further, CPU "0" 2 can access (via CPU bus 10, shared cache 11 and system bus 15) the shared caches (not shown) on each of CPU Board "1" 12, CPU Board "2" 13 and CPU Board "3" 14. Still further, a given CPU may indirectly access the private cache modules (not shown) of a CPU (not shown) on another CPU board; e.g., CPU "0" on CPU board 1 (CPU Board "0") may, under defined conditions, access the private cache module of any one of the CPUs on CPU Board "2" 13 (FIG. 1) via CPU bus 10, shared cache 11, system bus 15 and the shared cache on CPU Board "2" to effect a remote "siphon".

Further yet, for example, CPU "0" 2 can access main memory 17 via CPU bus 10, shared cache 11, system bus 15, SCU 16 and memory bus 18. Still further, for example, CPU "0" 2 can access, via CPU bus 10, shared cache 11 and system bus 15, any other block shown coupled to the system bus 15 in FIG. 1 to achieve bilateral communication with input/output devices, other subsystem components and even other multiprocessor systems.

Most of these accesses can be either read or write and can be in either direction. Therefore, those skilled in the art will understand that not only must access request conflicts be conclusively resolved, but coherence among the private caches modules, shared caches and main memory must be unerringly maintained. As notoriously well known in the art, achievement of absolute coherence is an extraordinarily difficult process which becomes geometrically more complex as the number of communicating entities increases.

Figure 3:
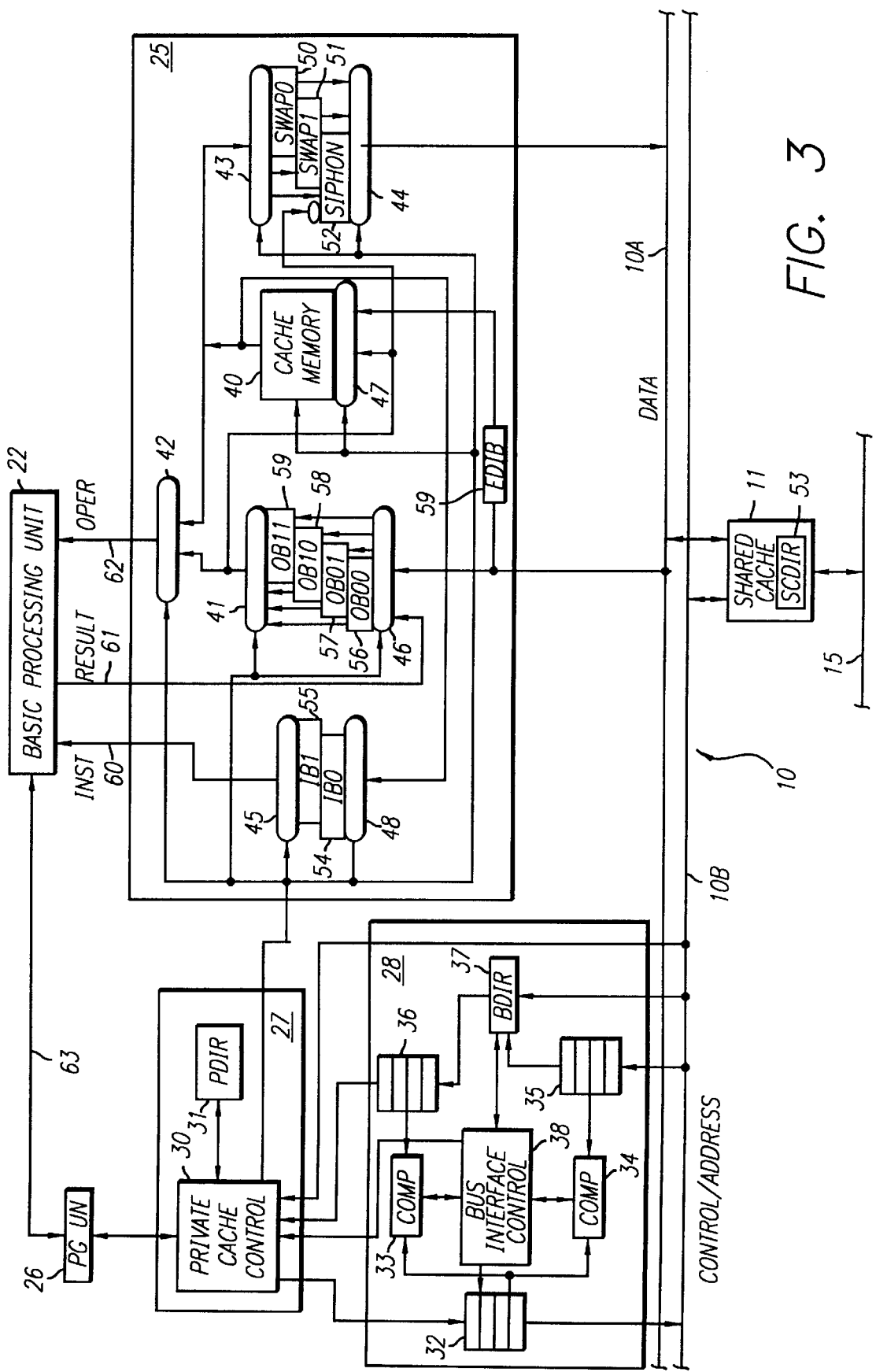
FIG. 3 is an intermediate level block diagram particularly showing additional details of a private cache representative of those associated with each CPU on the CPU board shown in FIG. 2.

FIG. 3 shows more details of the structure and information flow, particularly control and address information, within the cache management unit 27 and CPU bus unit 28 in conjunction with the private cache 25. In cache management unit 27, a private cache control block 30 communicates with paging unit 26, private cache 25, a processor directory 31 and various blocks in CPU bus unit 28.

If a cache miss occurs, i.e., if basic processing unit 22 requests a block of information which is not (according to processor directory 31) resident in a private cache random access memory 40 (hereinafter, cache memory 40), private cache control block 30 carries out/directs several operations. First, the fetching of the requested block is anticipated such that the processor directory 31 is updated to indicate its imminent presence. Second, inasmuch as room must be made in the cache memory 40 for the requested block, a suitable algorithm (typically, least recently used) is run to select a block to be swapped out of the cache memory 40 and into the shared cache 11 via one of the swap buffers 50, 51 and the CPU bus 10.

Third, private cache control 30 sends control and address information pertaining to the cache miss to CPU bus unit 28 where this information is placed into a command/address output buffer 32 which selectively delivers control and address information to the CPU bus 10. This information includes not only the identification of the block under request, but also the identification of the block being swapped out to make room for the expected block. The contents of output buffer 32 are also read by first inputs to two comparators 33, 34.

Control and address information issued by the output buffer 32 of all the CPUs on the board (including that from local output buffer 32) in response to private cache misses is received from the CPU bus 10 into a command/address input buffer 35. The output stage of input buffer 35 selectively delivers information to a bus directory 37 which selectively supplies address and control information to a command/address transfer buffer 36. In addition, the contents of input buffer 35 are also read by a second input to comparator 34, and the contents of transfer buffer 36 are also read by a second input to comparator 33.

Transfer buffer 36 selectively delivers control and address information to the private cache control block 30 in cache management unit 27 for timely update of the processor directory required by servicing external requests such as siphons which remove a block from the cache memory 40.

The outputs of each of the comparators 33 and 34 are coupled to the bus interface control block 38 which also communicates with private cache control block 30 in cache management unit 27. Data may be received directly into the private cache memory 25 from the CPU bus 10 and supplied to basic processing unit "0" 22. In addition, data may be transferred from the private cache memory 25 onto the CPU bus 10.

CPU bus 10 is divided into two sections: data section 10A and control/address section 10B. CPU bus data section 10A communicates bilaterally with private cache memory 25 and shared cache 11 which includes a shared cache directory 53. Similarly, CPU bus control/address section 10B communicates bilaterally with both CPU bus unit 28 and shared cache 11. Data (operands/instructions) from CPU bus data section 10A is applied as a first input to multiplexer 46 which controls input to an operand buffer set of four operand buffers 56, 57, 58, 59. A second input to multiplexer 46 is from the basic processing unit 22 via a result bus 61, and a third input is from cache memory 40. Multiplexers 47, 48 respectively control input to cache memory 40 and to instruction buffers 54, 55 from cache memory 40.

Thus, the instruction buffers and operand buffers selectively receive input (instructions and operands, respectively), via multiplexers 48, 46 from cache memory 40. In addition, the operand buffers selectively receive result information from the basic processing unit 22 via result bus 61 and from the CPU data section 10A. Similarly, cache memory 40 selectively receives input, via multiplexers 41 and 47, from the operand buffers and from EDI buffer 59.

Operand information read from cache memory 40 is available to one input of multiplexer 42 and at the input of multiplexer 43. A second input to multiplexer 42 is from the operand buffers via multiplexer 41. Operands are selectively sent to basic processing unit 22 via operand bus 62. Instructions received from cache memory 40 are selectively directed to basic processing unit 22 via multiplexer 48, instruction buffers 54, 55, multiplexer 45 and instruction bus 60.

A block output buffer set selectively transfers information from the private cache 25 to the data section 10A of the CPU bus 10. The block output buffer set includes swap0 buffer 50, swap1 buffer 51 and siphon buffer 52. Input to multiplexer 43 from cache memory 40 is selectively steered to one of the swap buffers 51, 52 or, under certain conditions, to siphon buffer 52. Another input to siphon buffer 52 is from the operand buffers via multiplexer 41.

Control signals from private cache control block 30 conventionally serve to dynamically select the appropriate inputs to the multiplexers 41, 42, 43, 44, 45, 46, 47, 48 for appropriate transfer to their respective outputs.

Consider now the operation of the private cache module shown in FIG. 3. During normal operation, the basic processing unit 22 sends successive requests for information blocks (instructions or operands) to the cache management unit 27 (via request bus 63 and paging unit 26) where the processor directory 31 is consulted to determine if the requested block is resident in cache memory 40. If the requested block is currently in the cache memory 40, it is transferred to the instruction buffers (via multiplexer 48) or to the operand buffers (via multiplexer 46) or more directly to the basic processing unit (via multiplexer 42), depending upon the type of block requested and various other conditions, all under control of signals issued by the private cache control block 30. This is a normal private cache hit.

However, if the consultation with the processor directory 31 indicates that the requested block is not resident in the cache memory 40, various actions are taken as discussed above, including copying address and control signals (identifying both the missed and requested block and the block being swapped out to make room in the cache memory 40 for the expected block) to command/address output buffer 32 in the CPU bus unit 28. Assuming that no action is taken to inhibit placing this information on the CPU bus address and control section 1OB, the request is broadcast onto the CPU bus address/control section 1OB in a relative priority among the current CPU bus operations of the several CPUs and the shared cache.

All units on the CPU bus 10 (i.e., the private caches of all four of the CPUs on the board; e.g., the private caches 3, 5, 7, 9 in FIG. I and the shared cache 11) receive the address and control information relating to a given request (including the identification of the block being swapped out of the requesting private cache) into their respective command/address input buffers 35. In the service of a request, the requested block is placed on the data section 10A of the CPU bus 10 in quarter-block increments by the unit (usually the shared cache 11) which owns the block, and an acknowledgment signal is sent by the shared cache 11. The data is selectively read into the operand buffers of the requesting unit. Thus, if the cache memory 40 is busy, the requested block is still promptly available to the basic processing unit via the operand buffers which also update the cache memory when it becomes available. Therefore, the basic processing unit does not have to wait for the cache memory to be updated before the requested information received on the CPU bus 10 is available to it.

In this manner, the service of a routine private cache miss is carried out similarly to the process for a single processor system employing a store-into cache and a main memory for supplying blocks in the case of a cache miss.

In the straightforward case of a request from another CPU to siphon a block from the local CPU shown in FIG. 3 in which there is no compare condition in comparator 34, the request enters the command/address buffer 35 and routinely moves to the bus directory 35. If the local cache memory 40 does not have the requested block, the request goes not further, and the processor directory 31 need not be consulted. If the local cache 40 does own the block, the bus directory acknowledges this fact, and a routine siphon operation is carried out to transfer the block from the cache memory 40 (or operand buffers) to the requesting CPU via the siphon buffer 52 and CPU bus data section 10A.

However, in the case of a multiprocessor system configured as in FIG. 1, interferences or conflicts can arise which must be definitively resolved with as little performance loss as possible.

Therefore, consider now a second example in which there has been a private cache miss in the given CPU shown in FIG. 3 and another unit on the CPU bus 10 has already placed a request on the CPU bus address/control section lOB for the block the given CPU has determined will be swapped out and sent to the shared cache 11. This block is therefore resident in one or the other of the swap buffers 50, 51. In that case, the identification of this interfered block is not only in the command/address output buffer 32 of the given CPU, but also is in the command/address input buffer 35, and the comparator 34 senses this condition by comparing the swap identifications in output buffer 32 with request identifications in input buffer 35. When this condition is sensed, comparator 34 accordingly signals the bus interface control 38 which notifies the private cache control 30 to send out the block temporarily stored in one of the swap buffers 50, 51 onto the CPU bus data section 10A to service the other requesting CPU as if a siphon had taken place.

The bus interface control block 38 also nulls the swap aspect of the affected request in output buffer 32 so that no swap information will be placed on the control/address section 10B of the CPU bus as this would be an illegal operation that would slow down the system; further space has already been made for the block in one of the swap buffers 50, 51 in the other requesting CPU which has performed its own swap. In effect, this particular swap operation is converted to a "siphon" operation on the fly.

When the acknowledgment signal is received, indicating that the transfer of the block requested by the other CPU (or, rarely, by the shared cache) has been (or soon will be) completely transferred, the bus directory 37 is updated to indicate that the "siphoned" block is no longer in the cache memory 40. In addition, all the same address and control content from the input buffer 35 is passed along to the transfer buffer 36 which serves to permit updating the processor directory 31 (to reflect the serviced "siphon" request) when such action is not disruptive to the normal consultation of the processor directory in conjunction with ongoing requests from the basic processing unit 22.

It has previously been mentioned that a comparison is also made between the contents of the buffers 32 and 36 by the comparator 33. If a compare condition is detected by the comparator 33, the swap aspect of servicing the locally requested block can be converted to a "siphon" as previously described.

It will be understood that the bus directory 37 is updated prior to the updating of the processor directory 31 for serviced external requests. This permits the processor directory 31 to operate with the basic processing unit 22 without interruption, updating being carried out when the processor directory 31 is not otherwise occupied. However, as the bus directory 37 is already updated, external inquiries from other units on the CPU bus 10 can routinely interrogate the bus directory to determine if a copy of the externally requested block is resident in the private cache memory 40. If the block is there, a normal siphon operation transfers the requested block to the CPU bus 10 via the operand buffers and the siphon buffer EDO 52. This leaves a "vacancy" in the cache memory 40 such that it may not be necessary to carry out a swap consequent to a subsequent private cache miss, thereby further improving the efficiency of the system. In this case, the control signals sent to the cache miss output buffer 32 from the private cache control block 30 reflect this condition.

By providing two alternately used swap EDO buffers 50, 51 and the previously described logic, two local private cache miss requests can be outstanding simultaneously to the extent that a second miss procedure can be started as soon as the data from the first request is received, even if the first swap is not completed. (Additional simultaneous requests could be accommodated by providing corresponding additional swap buffers and the relevant support logic.)

Another feature of the circuitry shown in FIG. 3 is that not only can two outstanding requests be accommodated, but the quarter block segments of the two requested blocks sent to the private cache from the CPU bus 10 from the transmitting unit(s) can be received and handled intermixed. This is because each of the operand buffers 56, 57, 58, 59 are half-block in length and are divided into two quarter block addressable sections. Thus, a first full block can be loaded from the CPU bus data section 10A, in quarter block increments, into operand buffers OB00 56 and OB01 57 (the combination, strictly speaking, being a first full operand buffer); and a second full block can be loaded from the CPU bus data section 10A, in quarter block increments, into operand buffers OB10 58 and OB11 59 (the combination, strictly speaking, being a first full operand buffer) under the direction of the multiplexer 46. Since the identity of the arriving quarter-block segments is known to the private cache control block 30 from information on the CPU bus control/address section 10B, the appropriate gating signals can be supplied to the multiplexers 46, 48 to coordinate the intermixed arrival of the quarter-block segments of two internally requested blocks and the selective transfer of any quarter block in the operand buffers to the basic processing unit 22.

In a presently preferred embodiment of the invention, the processor directory 31 and bus directory 37 each constitute a set associative memory of sixty-four sets of 16×24 bit arrays; i.e., sixteen levels of sixty-four entries of twenty-four bits. The format of each block identification word in the directories includes a status field of which two-bits indicates the validity and write permission status of each block resident in the cache memory 40 as follows:

00=an invalid (i.e., known not to be the latest version of the identified block) copy of the identified block is present in the cache memory, and the local CPU does not have write or read permission on it;

01=this status code is not allowed;

10=a valid copy of the identified block is present in the cache memory, but the local CPU does not have write permission on it; identical copies may exist in other private caches, the shared cache and/or main memory; and 11=a valid copy of the identified block is present in the cache memory, and the local CPU has write permission on it; this is the only such copy in the system.

Consider now a condition in which a basic processing unit 22 is processing information so as to need the authority to write in a block, known to be resident in its cache memory 30 as determined by consultation of the processor directory 31, and the status field of the identification word for the block in the processor directory is found to be set to "10" indicating that the block is valid, but that the local CPU does not "own" the block; i.e., has no current authority to modify it. The local CPU must therefore seek ownership of the block.

When this condition arises, the private cache control 30 changes the status field in the relevant identification word from "10" to "11" in the processor directory 31, anticipating that the request for ownership will be granted. (However, no action can be taken on the block until an acknowledgment signal is received.) The modified identification word and an associated "invalidate" command are sent to the command/address output buffer 32 in the CPU bus unit 28 in contemplation of the modified identification word being broadcast onto the CPU bus 10 with the invalidate command, thus seeking to invalidate the block in all other caches on the CPU bus 10. However, while the modified identification word is still resident in the command/address output buffer 32, a comparison is made, by the comparator 33, with the address portions of identification words which are currently resident in command/address transfer buffer 36 in the manner previously described in conjunction with the process of servicing a cache miss. Similarly, a comparison is made, also as previously described, by the comparator 34, to identification words which are currently resident in the command/address input buffer 35.

If neither of the comparators 33, 34 senses a compare condition, the address of the subject block and the invalidate command are broadcast onto the CPU bus 10 from the command/address output buffer 32. Assuming that there is not a substantially simultaneous request for ownership of the same block on the CPU bus or that there is not some condition to which the shared cache 11 is sensitive which precludes granting ownership of the subject block to the requesting CPU, the shared cache will send an acknowledgment signal to the requesting CPU which gives immediate permission to write to the subject block in the cache memory 40. Occasionally, substantially simultaneous requests for ownership of the same block may be present on the CPU bus 10, and the shared cache 11 then acts as arbiter using, for example, a straightforward precedence among the four CPUs on the CPU bus to select the service request to be acknowledged. In the example, the order of precedence is: CPU0 2, CPU1 4, CPU2 6, CPU3 8.

However, if the comparator 34 senses a compare condition, this signifies that a prior request for ownership of the block has been recently made by another CPU (or even the shared cache 11 which may be handling a request for the same block from the system bus 15) and granted, i.e., the shared cache 11 has issued an acknowledgment signal to the other CPU. If another CPU (one of the CPUs 4, 6, 8 in the example) or the shared cache has already made the request for ownership of the block, and the request has been granted, the earlier request has higher priority such that the current request by the local CPU for the same block must be aborted. This is achieved by taking several actions. First, the status field of the block's identification word in the command/address input buffer 35 is set to "00" such that the bus directory 37 is accordingly updated at the next opportune time. The status code "00" indicates that the copy of the requested block resident in the local cache memory 40 is no longer known to be the latest copy of the block because another processor has been granted write permission on it. Further, the status code "00" indicates that the request by the local CPU for write permission has not been granted. The identification word, now modified to have a status code "00", is written into the bus directory 37 and placed into the command/address transfer buffer 36 for update of the processor directory 31 at an opportune time.

In addition, the command in the command/address output buffer 32 associated with the requested block is changed from "invalidate" to "NOP" (no operation) such that, when the address of the block and the command are broadcast onto the CPU bus command/address section 10B, no action is taken. (This is merely one simple way to abort the request which is suitable in the exemplary system)

Similarly, if the comparator 33 senses a compare condition, it is known that another CPU (or the shared cache 11) has already been granted ownership of the requested block such that the local request must be aborted by changing the command associated with the block in the command/address output buffer 32 to NOP, the status field having already been changed to "00".

It will be observed that the prevailing CPU has successfully invalidated the subject block in all other caches on the CPU bus 10, including the private cache 25 of the CPU0 2.

Under these conditions, the request by the local CPU remains outstanding, and, further, the copy of the subject block resident in its cache memory 40 is no longer valid. To respond to this state, the private cache control 30 again sends to the command/address output buffer 32 the address of the subject block, this time with an accompanying read-and-exclusivity command. That is, the request is now to siphon a valid copy of the subject block from the current owner and to assume ownership at the same time.

It should be noted for completeness that the shared cache 11 is also in communication with the system bus 15 as previously described and that it must also deal with requests from system components for write access to information blocks which may be resident in one or more of the caches on the CPU bus 10. Thus, it will be understood that acknowledgment signals may also be sent onto the system bus 15 by the shared cache 11 and that any conflicts with a request for the same block observed on both the CPU bus 10 and the system bus 15 must be resolved by the shared cache 11 in accordance with the principles already presented.

The foregoing is a somewhat simplified, for clarity, disclosure of the invention, which, however, fully teaches the principles for its practice to those skilled in the art of computer system design. There follows a more detailed disclosure of a presently preferred embodiment of the invention. In the following exposition and in FIGS. 4–40, certain convenient abbreviations are employed. Thus, for example, the CD directory corresponds to the processor directory 31, the DD directory corresponds to the CPU bus directory 35, ACB corresponds to the CPU bus 10, ASB corresponds to the system bus 15 and AX is the address and execution component of the basic processing unit 22 as set forth more fully in the aforementioned U.S. Pat. No. 5,195,101.

Figure 4:
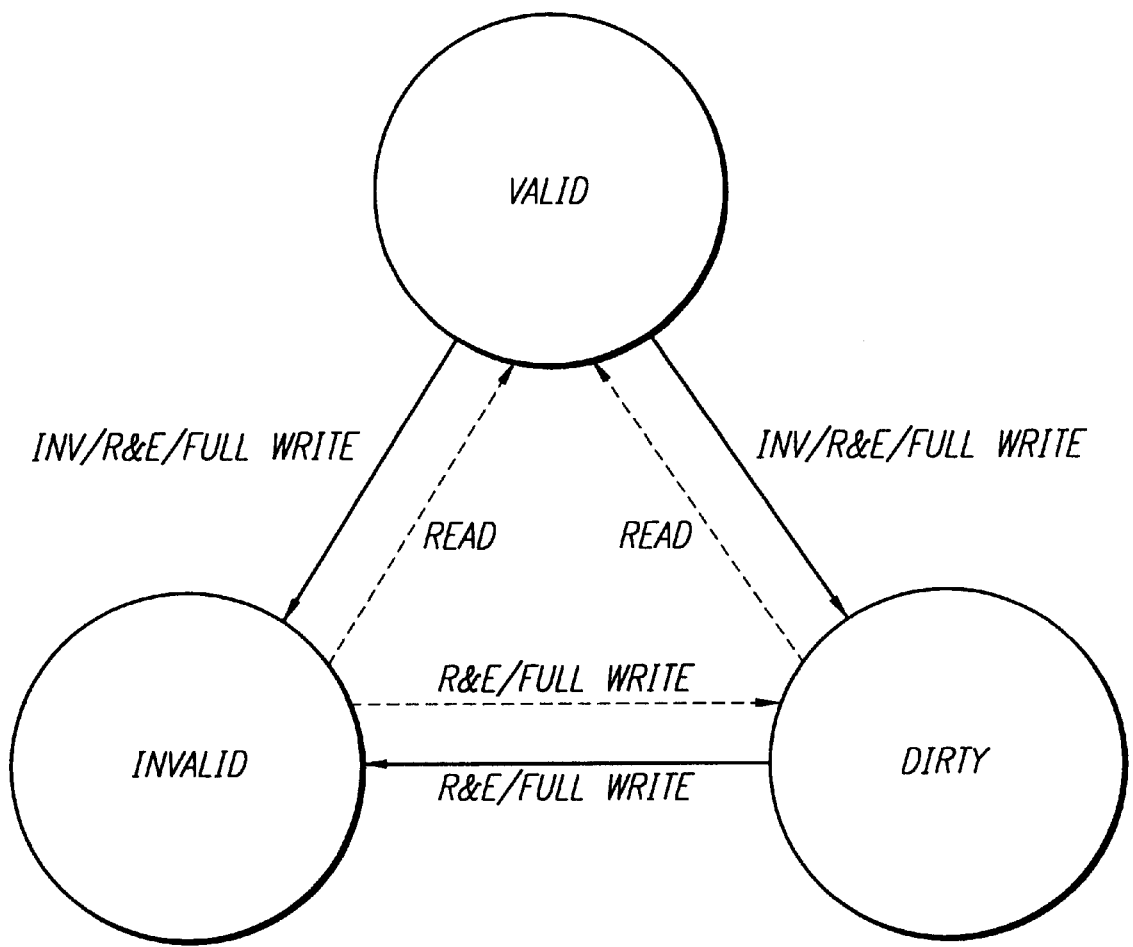

Referring to FIG. 4, the coherency model for each private cache is shown. Arrowed solid lines denote a received request while dashed lines indicate a request sent. "Valid" indicates that memory is coherent and copies may exist in one or more other private caches; "invalid" indicates that no copy is present in the set; "dirty" indicates that memory is not coherent; no other copy exists in any cache other than this unique one.

Figure 5:
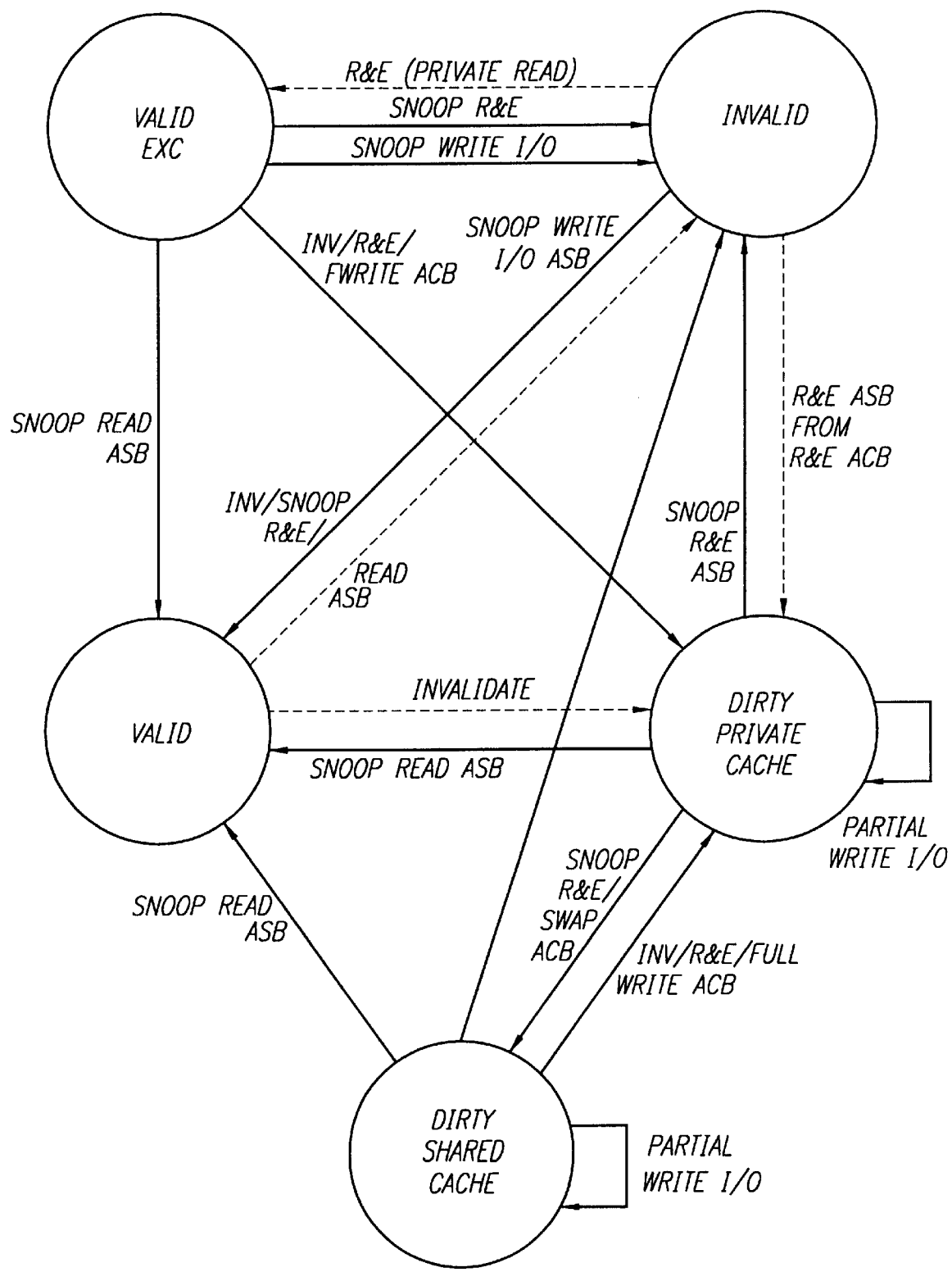

Referring to FIG. 5, the coherency model for the shared cache is shown. From the shared cache view point:

"invalid" indicates that no copy is present in the set;

"valid" indicates that the shared cache block is coherent with the memory; copies of the block may exist in private caches of the CU board and in caches of any other CPU board;

"valid (with exclusive property)" means that the shared cache block is coherent with memory; copies may exist only in the private caches of this CPU board;

"dirty (with updated shared cache copy)" means that the shared cache is the unique owner of the block; and "dirty (with CPUx owner of the line)" means that CPUx is the unique owner of the line in the system.

A. CD DIRECTORY ACCESS AND BUFFER MANAGEMENT

A.1—BUFFERS OB-IB-EDI-EDO

A.1.1.—Overview

In order to minimize the number of private cache memory or directory accesses and to allow prefetch, the private cache (corresponding to the private cache 25 in FIG. 3) provides:

- two 32 byte instruction buffers (IB; i.e., IB0, IB1—corresponding to the buffers 54, 55 in FIG. 3) with read-only access; and
- four 32 byte operand buffers (OB; i.e., OB00, OB01, OB10, O11—corresponding to buffers 56, 57, 58, 59 in FIG. 3) with read-only, write-only and read-alter-rewrite access.

In order to overlap requests on the CPU bus 10, the cache provides CPU bus buffers:

- one 64 byte external data-in (EDI) buffer (corresponding to buffer 59 in FIG. 3) used for read requests; and
- three 64 byte External Data Out (EDO) buffers (corresponding to buffers 50, 51, 52 in FIG. 3) used for two swap requests and one siphon request.

The cache controller manages the transfer of data in the private cache memory 40 with several signals:

- B-IRB-T1N 0:5—selects the word to be sent on the instruction bus from IB to the basic processing unit 22;
- B-ORB-T1N 0:8—selects the source of data to be sent on the operand bus (from cache memory or OB) to the basic processing unit 22;
- B-RLB-T2N 0:4—selects the eight-word buffer to be loaded with the cache memory output (into IB, OB or EDO);
- B-RAW-T1N0:4—selects the OB or EDI to be written into cache memory (for codes 10xx, used to transfer OB to EDO without write in cache memory);
- B-WR-T1N 0:13—selects the words coming from operand or result bus and the OB written; and
- B-SLB-T1N 0:6—selects the OB/IB to be written with EDI from the CPU bus or the EDO to be sent onto CPU bus.

The addresses of the sub-block contained in those buffers are temporarily stored:

- in CDAD block for IB and OB and
- in DDSB block for EDI and EDO.

In CDAD, a temporary address latch (ITEMP-AD-L2) is used to hold the target address of a transfer or a conditional transfer until the TRGO cycle. The loading of these buffer address latches is controlled by DD. Address comparison is done on OB/IB address latches for each address received from the CPU.

A.1.2—CPU Bus Buffers EDI and EDO

The cache controller sends only one read miss onto the CPU bus at a time, so it needs only one EDI buffer 59 to stack data coming from the CPU bus. The EDI buffer is used only in case of EIS (extended instruction set) commands; in this case, the cache memory will be updated from EDI. For general commands, the block is loaded directly into a pair of operand buffers (OB00 and OB01 or OB10 and OB11). The cache memory will be updated from the operand buffer (cache memory will write into EDI, but it will be never used).

The CPU bus miss may be associated with a swap request, so the cache controller needs one EDO buffer 50 to stack the 64 byte block to be written into the shared cache. A second EDO buffer 51 is provided for swap, in order to start a second miss as soon as the cache controller receives the data of the first miss, even if the first swap is not terminated (lower priority than miss).

The shared cache (corresponding to the shared cache 11 in FIG. 30 allows only one siphon at a time, so the cache controller needs only one EDO buffer (corresponding to buffer 52 in FIG. 3) to stack the 64 Bytes block for delivering siphon data to the CPU bus. The address of the block in EDI is not temporarily stored because it is the same as in OB.

As soon as all the data are received from the CPU bus, EDI is written back to cache memory. The addresses of the blocks in EDO are temporarily stored in DDSB, until the data is sent on the CPU bus.

A. 1.3—Instruction Buffer

A.1.3.1—Overview

The instruction fetching is done through the cache instruction buffer which consists of two 32 byte sub-block buffers (corresponding to buffers 54, 55 in FIG. 3). Instructions are supplied in sequential order to the basic processing unit 22 (FIG. 3) on the instruction bus (four bytes) following a transfer command and are continuously prefetched into the instruction buffer until a page crossing is reached or another transfer command is received.

A.1.3.2—Initial Fill of the Instruction Buffers

The initial fill of the instruction buffers occurs during an unconditional transfer or a conditional transfer that goes. The basic processing unit supplies the address to the cache directory, and the addressed word is placed on the operand bus to be transferred to the basic processing unit. If the cache receives the transfer go signal (A-I-TRGO-T2) from the basic processing unit, the addressed word is sent on the operand bus, and the addressed block is loaded into the instruction buffers, then instruction fetching is continued from that point. If the transfer is no go, the load of the new block in the instruction buffer is cancelled, and the cache memory continues to send instructions from the current instruction sub-block buffer on the instruction bus.

The instruction buffer page address latch is loaded from CPU address during unconditional transfer and from the temporary address latch during transfer go cycle of a conditional transfer. The sub-block address part is loaded from the same origin during a transfer and from B-L-X1 during prefetch.

The private cache sends the instruction word along to the basic processing unit with the instruction available signal (B-I-AVAIL-T2) which indicates that a valid instruction word is on the instruction bus. The basic processing unit responds with the instruction request signal (A-INST-RQ-T2), notifying the cache that the last instruction word was accepted and the next instruction should be sent. If the cache does not receive A-INST-RQ-T2, the previous instruction word is sent every cycle until A-INST-RQ-T2 is received.

A.1.3.3—Instruction Buffer Refilling

The next sub-block is prefetched with an unconditional prefetch if the transfer target is not the last word of the sub-block and this sub-block is not the last one of the page. If the prefetch is instituted and the block is not present in the cache or is still in transit from CPU bus, prefetching is held off until the instruction buffer is emptied. An unconditional prefetch is made when the instruction buffer is emptied. The instruction buffer is continuously refilled in this manner until either a page boundary is reached or a transfer command is executed.

A.1.3.4—Page Crossing

When the instruction buffer delivers the last instruction on a page, the cache control waits for the next instruction request and notifies the basic processing unit that the cache memory needs a new virtual address for the next instruction (B-STATUS-T1 0). The basic processing unit will calculate the new virtual address and issue a transfer command to restart instruction transmissions.

A.1.3.5—Store Compares

In the general command set, the sub-block real addresses associated with all store commands must be compared with the instruction buffer real addresses in the event that the store command references the real address currently in one of the instruction sub-block buffers. In the EIS command set, the comparison is only done at the page level. (The comparison is done at the page level in CDAD and at the sub-block level in DDDP.) If a store command has a hit in the current instruction buffer, the current instruction transfer will be aborted, the instruction buffer will be invalidated and the basic processing unit will be notified of the store compare (B-STR-CMP-FLT-T2). The basic processing unit will issue a transfer command to restart instruction transmissions.

A.1.4—Operand Buffers

A.1.4.1—Overview

Two operand buffers, OB0 and OB1 (corresponding to buffers 54, 55 in FIG. 3), are used to perform operand read or write transfers over the operand or result bus. The sub-block address latches are loaded from CPU address under DD control or from DD (B-L-X1) during prefetch. A transfer on operand buffer is terminated:

by the cache, when the byte count (length) of the transfer is exhausted, by the basic processing unit, using A-CMD-CAN-T1 signal (cancel command), or by the basic processing unit, using a stop bit of a command or a CHG-GEN.

A.1.4.2—Prefetch

In the general command set, there is no prefetch. In carrying out EIS commands, on LBUF1, the next sub-block is systematically prefetched. In 9—9 move, 9—9 compare (i.e., move and compare of nine bit character strings) and EIS non-9—9 alphanumeric accesses, the next sub-block to be loaded into an operand buffer is fetched when all bytes or words of that sub-block have been read or written. In EIS decimal access, no prefetch is necessary if two sub-blocks are needed, and the three sub-blocks case is too rare to justify a prefetch implementation.

A.1.4.3—Write Back

When an operation is ended, the written operand buffers are written back to cache memory when there is an opportunity (cache not busy) or when a buffer is needed and no buffer is free. The operand buffers are systematically written back on the CHG-EIS command and on reset reception. In a siphon, if the block is modified in an operand buffer, the data will be written directly from the operand buffer to EDO for one sub-block, then from cache memory to EDO for the second sub-block. If a write occurs on a read operand buffer, this buffer can still be read because there is software protection (the bytes read are not the same as the bytes written).

A.1.4.4—Use in the General Command Set

With general commands, the four sub-block operand buffers are used independently, except in case of a miss where the block is loaded in OB00 and OB01 or in OB10 and OB11. The sub-block containing the two, four or eight byte operand is loaded in the next operand buffer which is not-occupied, not-waiting-to-be-written, in the prioritized order: OB11, OB01, OB10, OB00.

A.1.4.5—Use in the EIS Command Set

With the EIS (extended instruction set) commands, a written operand is always loaded in OB01. For alpha instructions, if there are two operands, the first operand is loaded in OB00 and the second one in OB01. For decimal-numeric instructions, the operand is loaded into the even part of OB00 or OB01 for an even address and into the odd part of OB00 or OB01 for an odd address.

A.2—CD Directory Access

A.2.1—Overview

The CD directory (corresponding to processor directory 31 in FIG. 3) is accessed:

on a basic processing unit internal request, on an external request when cache controller must be invalidated or changed from status modified to status valid, and on a DD request to write back buffer or do prefetch.

For an internal request, the swap is detected during the CD directory update, and the address is sent to DD.

DD selects the operand buffer to write with B-LOB-X1N 0:2 and the operand buffer or instruction buffer to read with B-SOB-X1N 0:3. DD specifies to CD the next CD directory cycle to do on the B-NXT-X1 and B-CL-X2 lines coming from DDCS.

A.2.2—Access Types in CD Directory

Figures 6, 7:
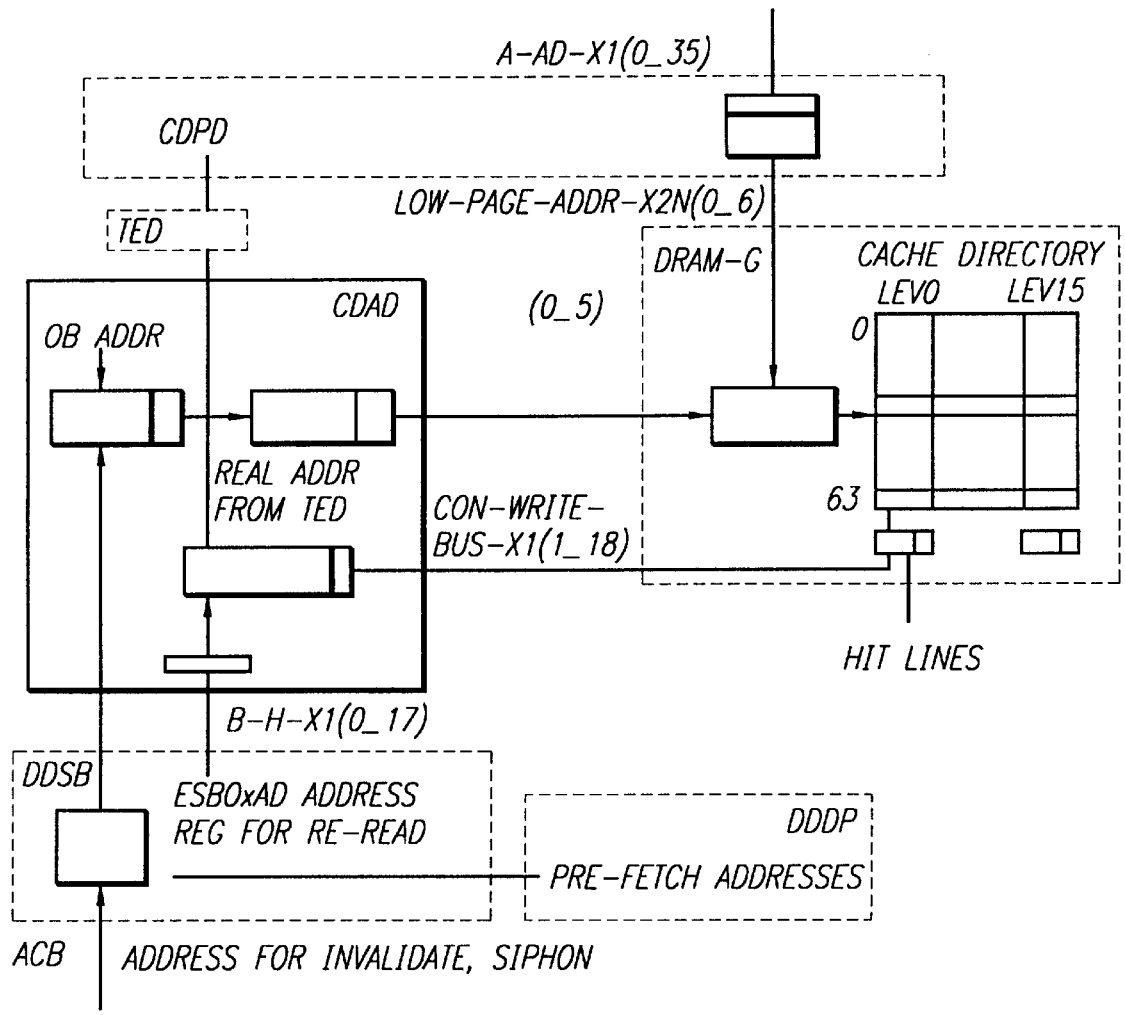
Figure 13A:
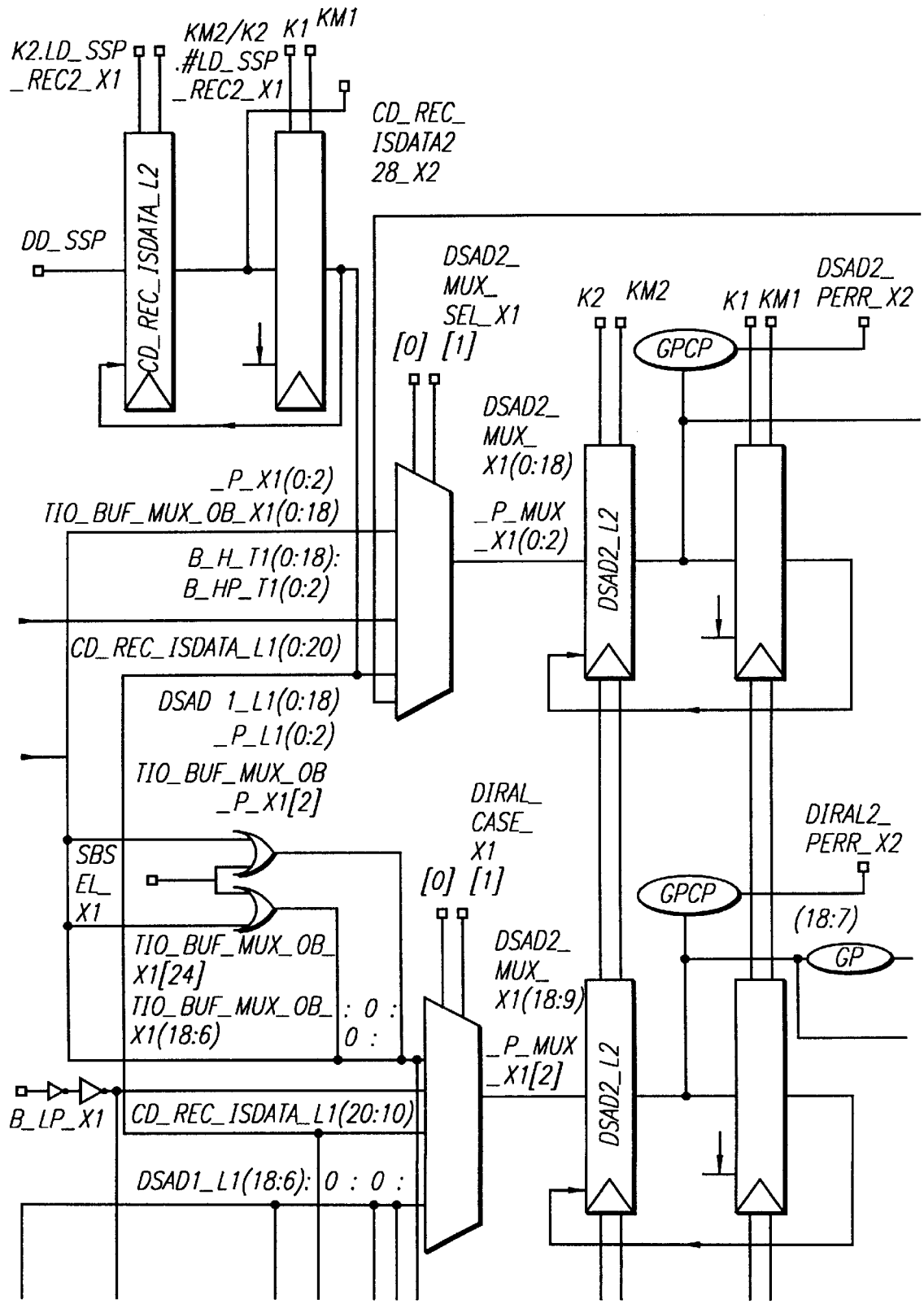
FIGS. 13A–13D, 14A–14C and15A–15E respectively illustrate first, second and third aspects of data flow through a CDAD block component of a private cache controller.
Figure 13B:
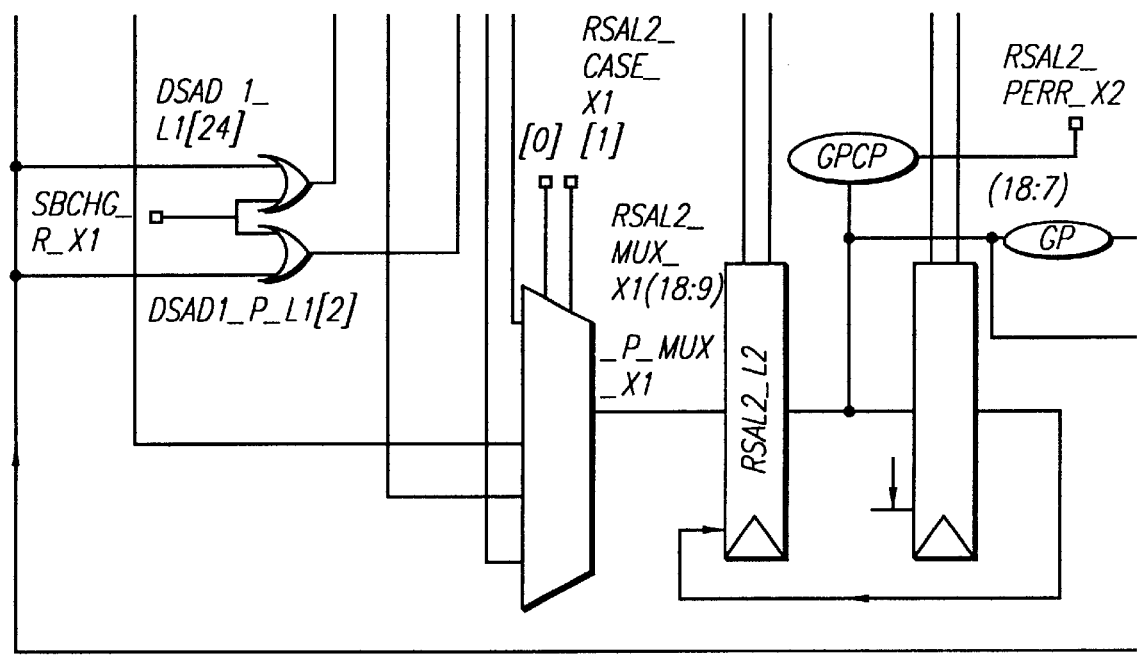
Figure 13C:
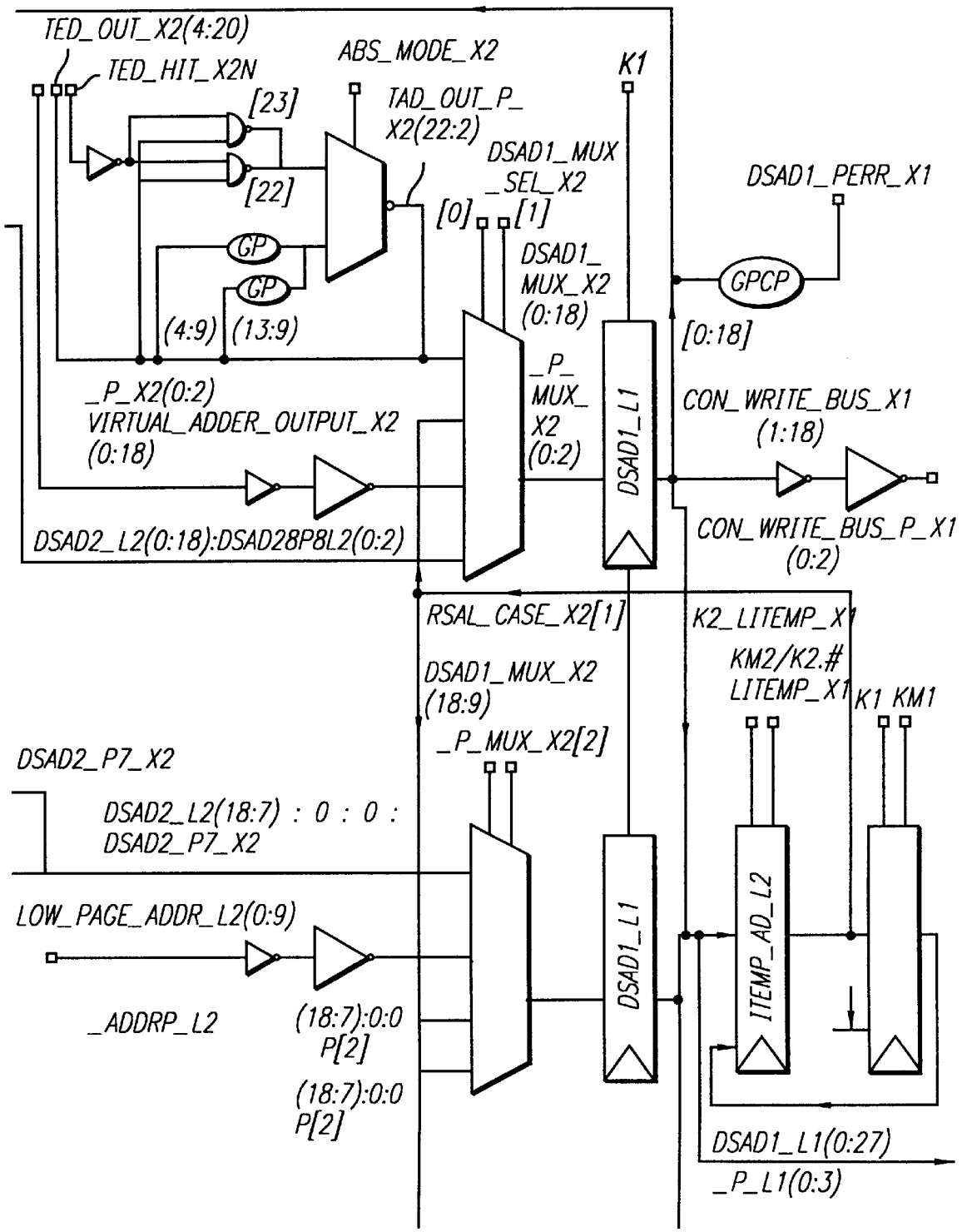
Figure 13D:
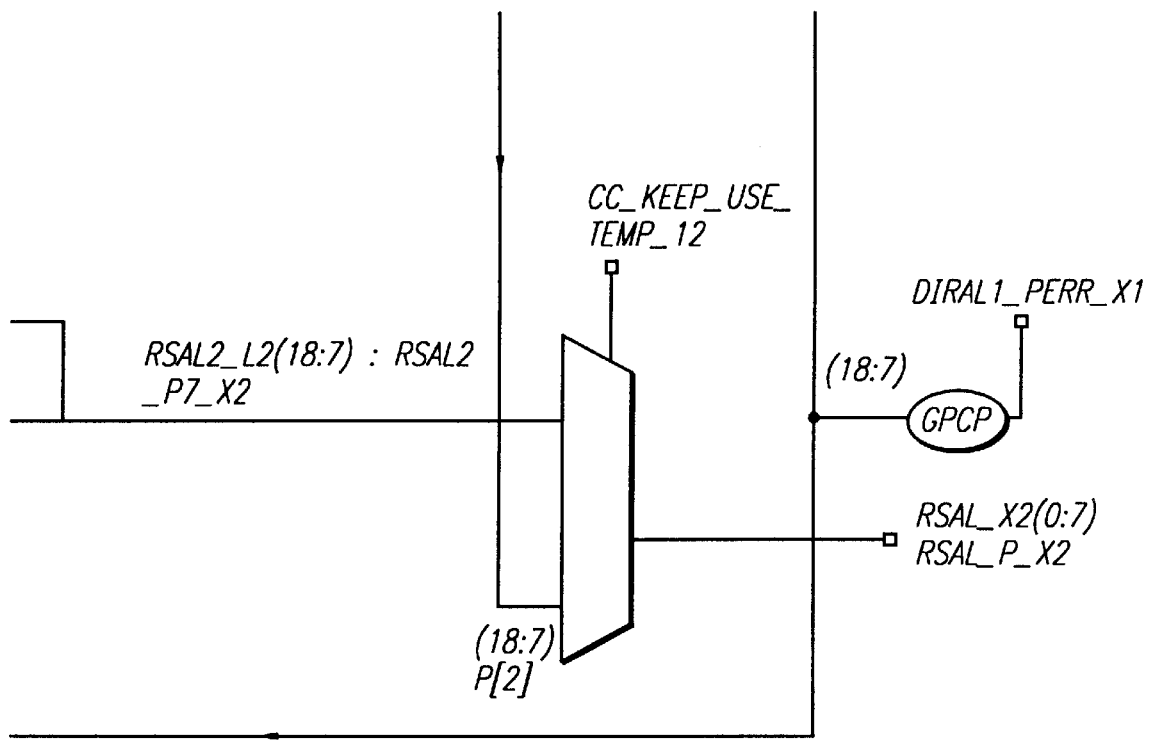
Figure 14A:
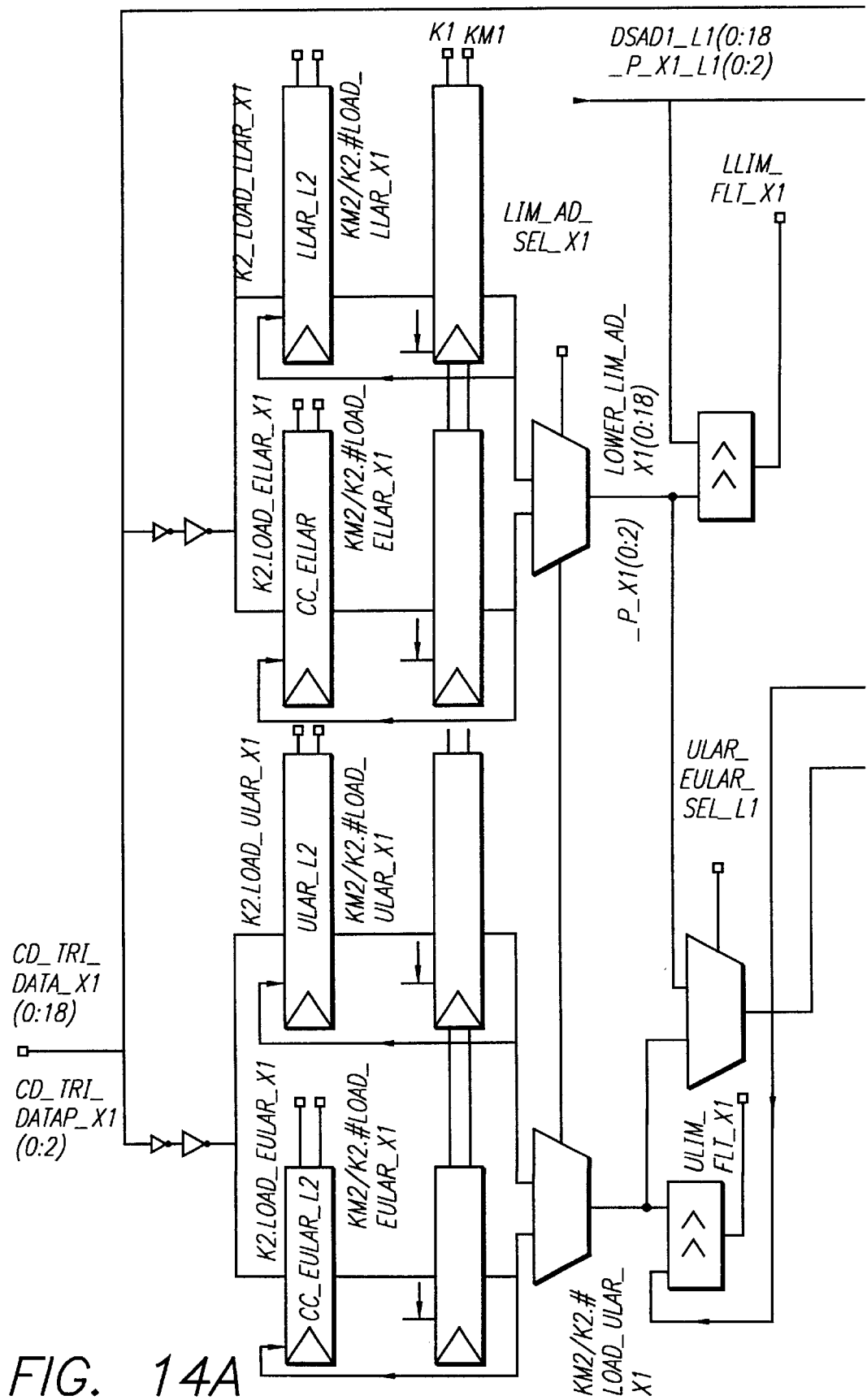
Figure 14B:
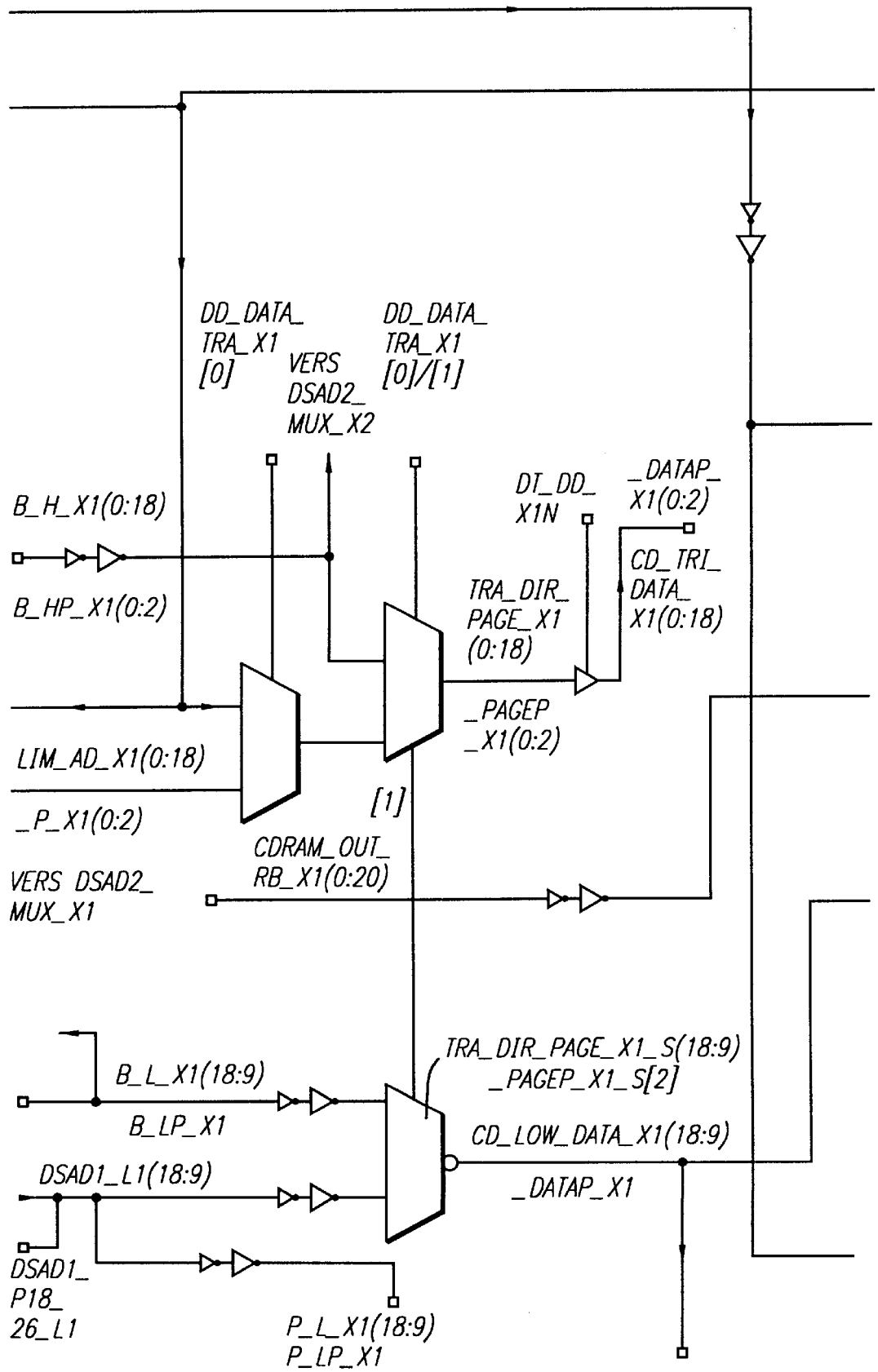
Figure 14C:
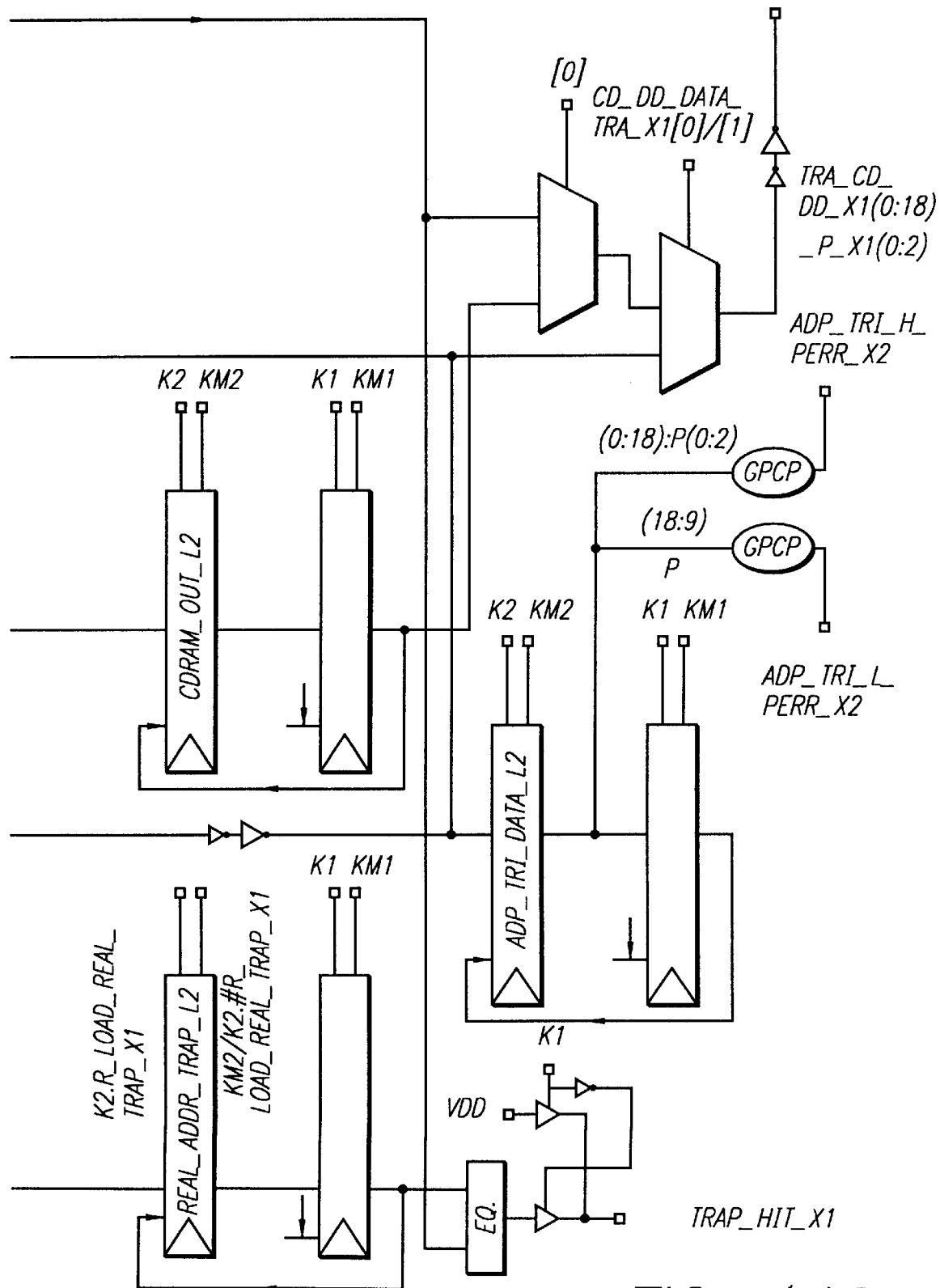
Figure 15A:
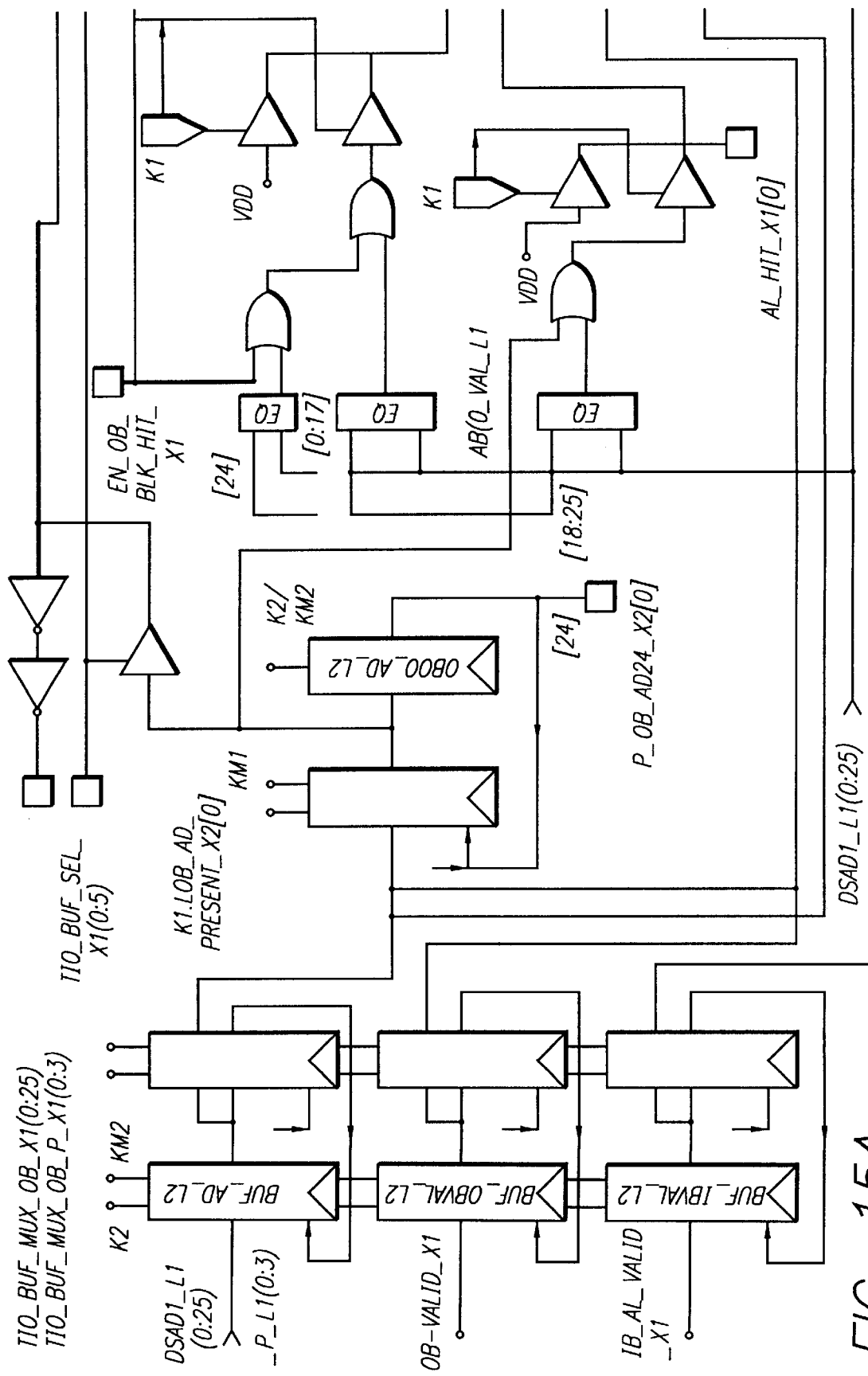
Figure 15B:
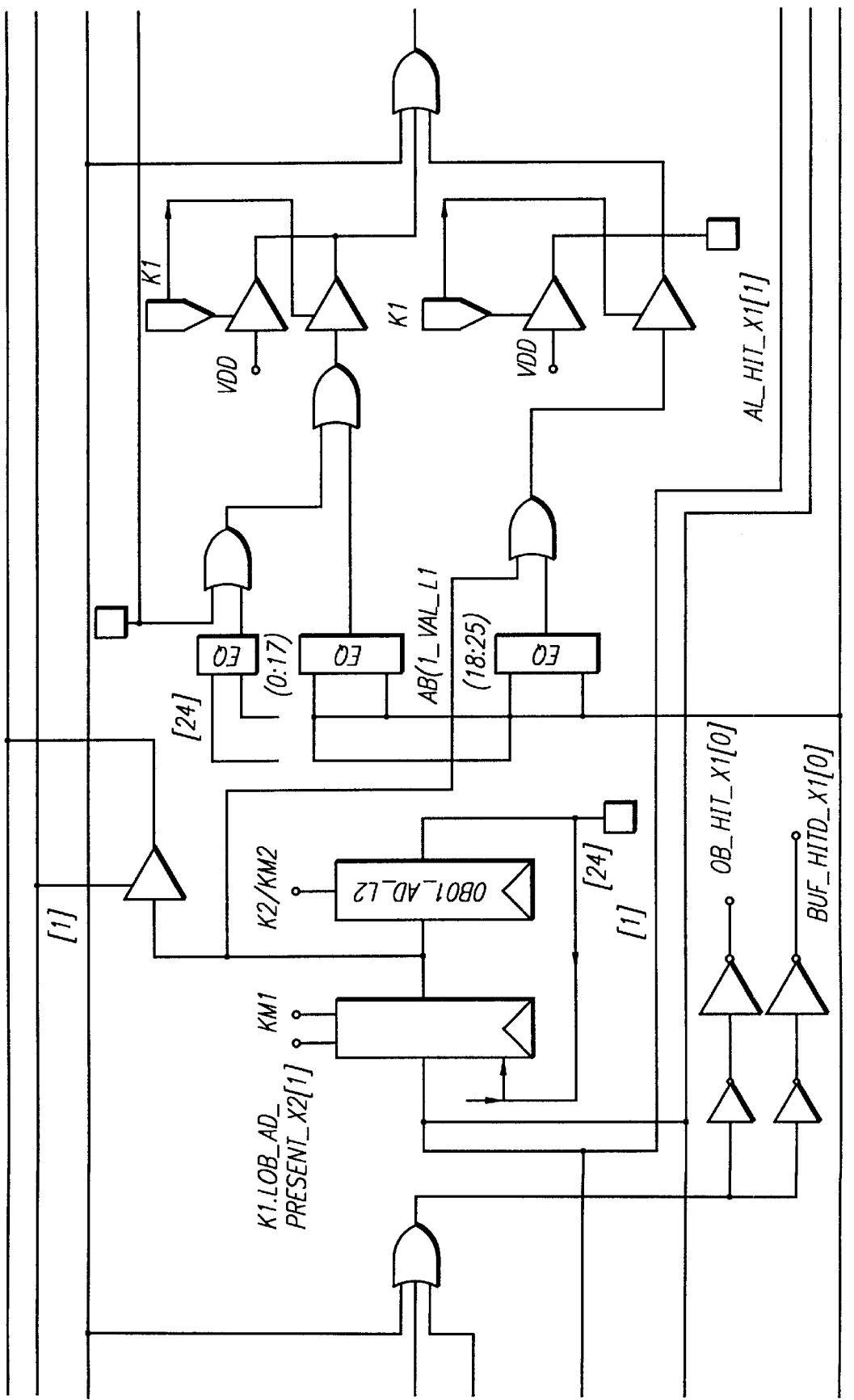
Figure 15C:
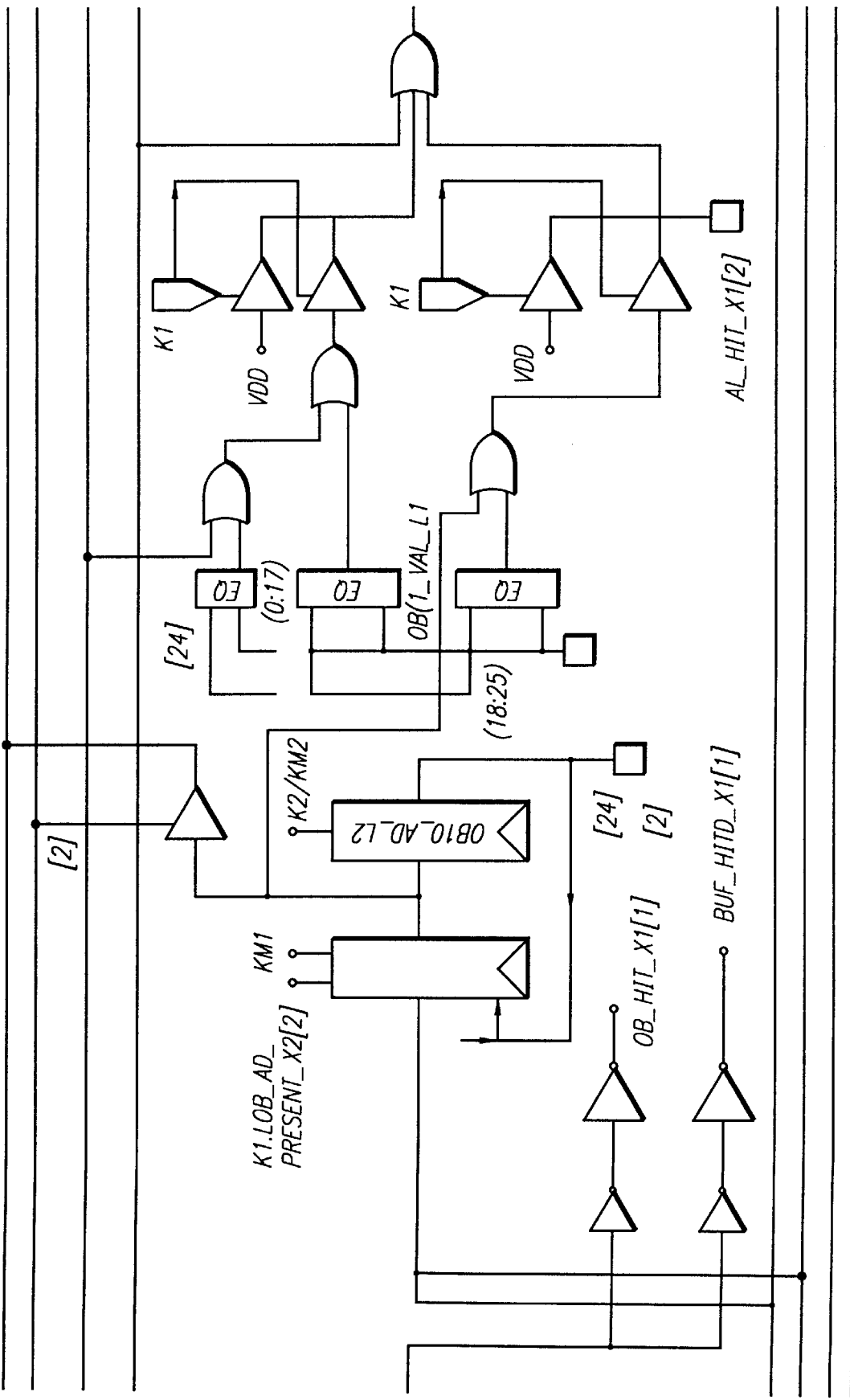
Figure 15D:
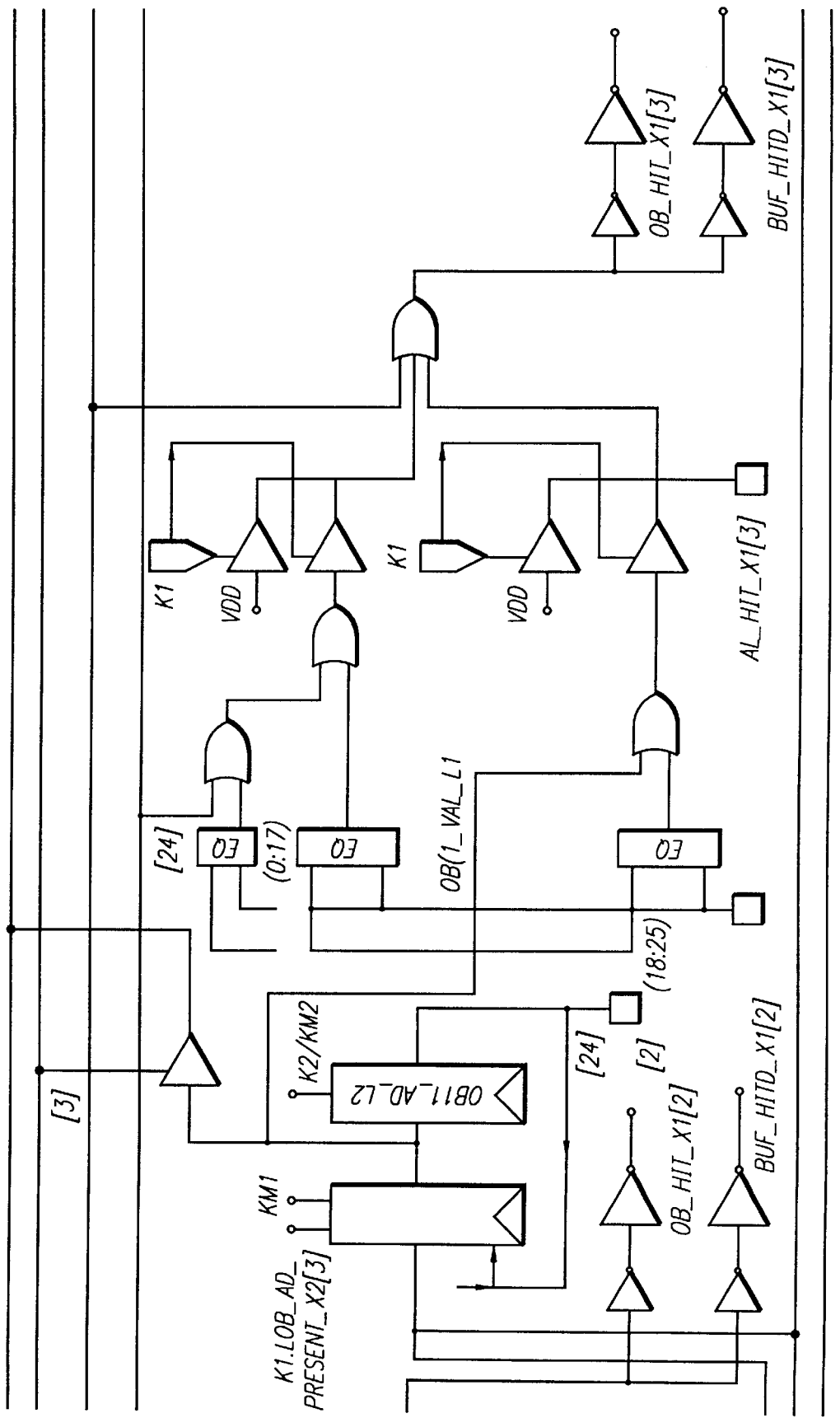
Figure 15E:
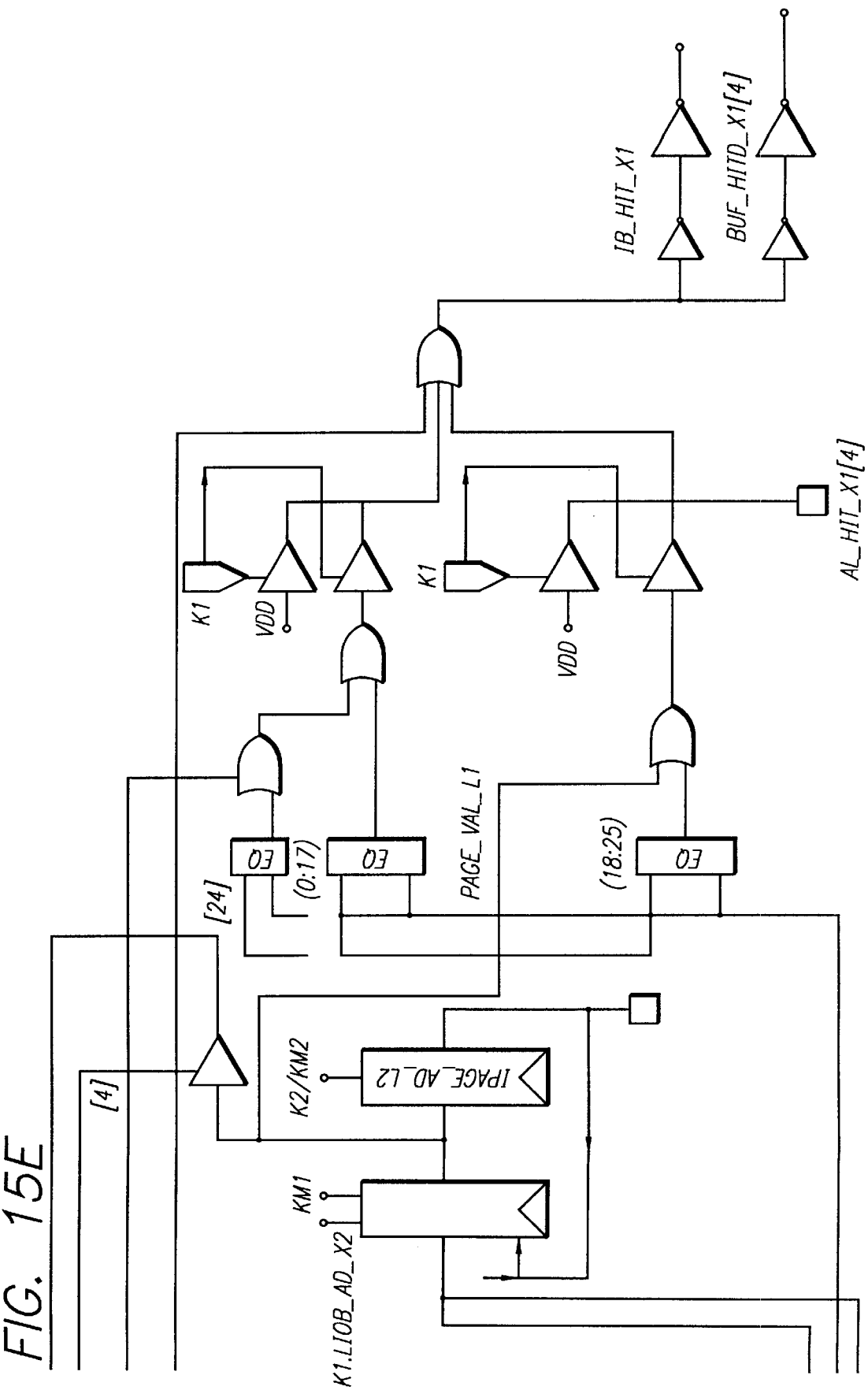
Figure 16A:
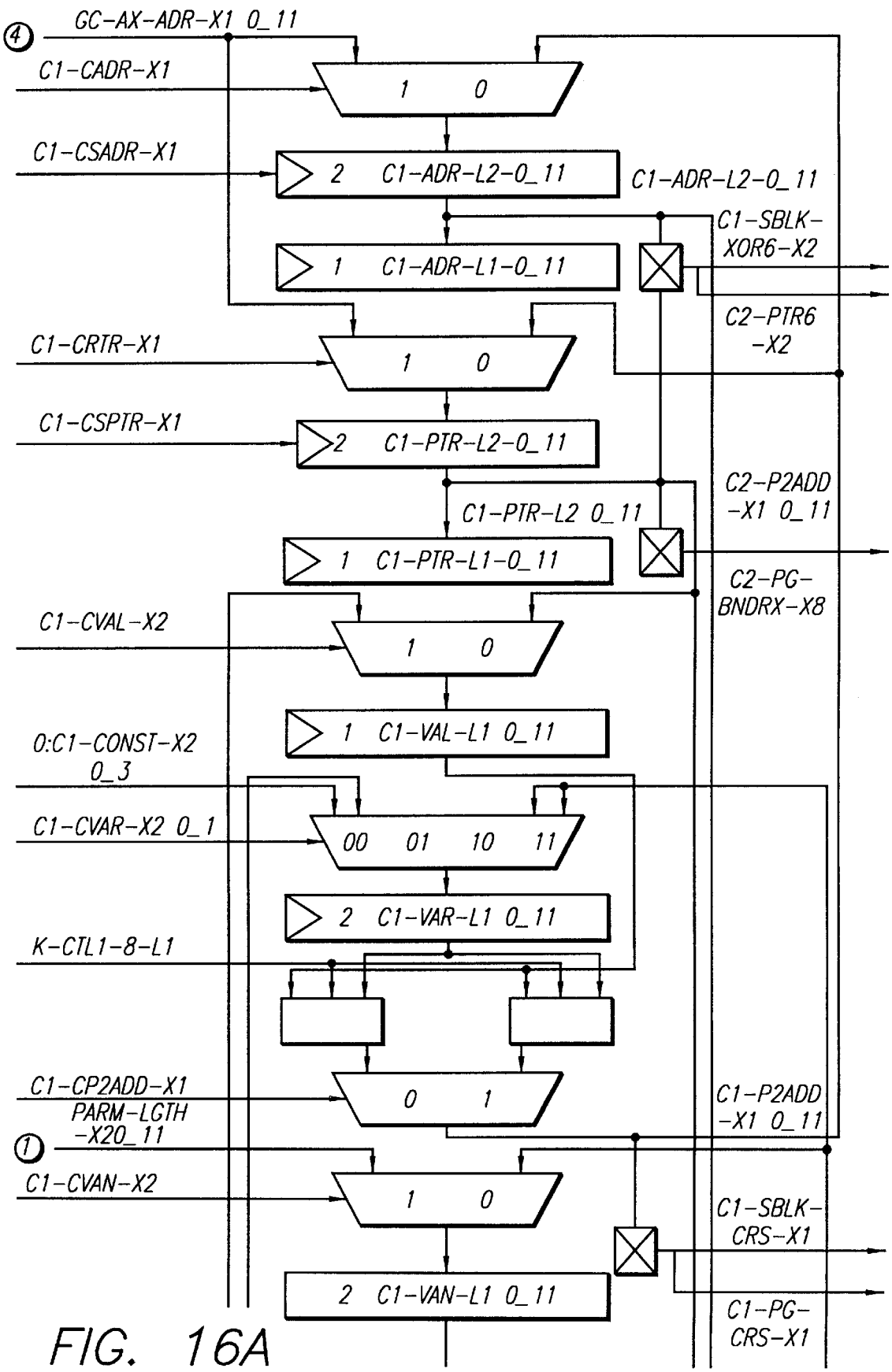
Figure 16B:
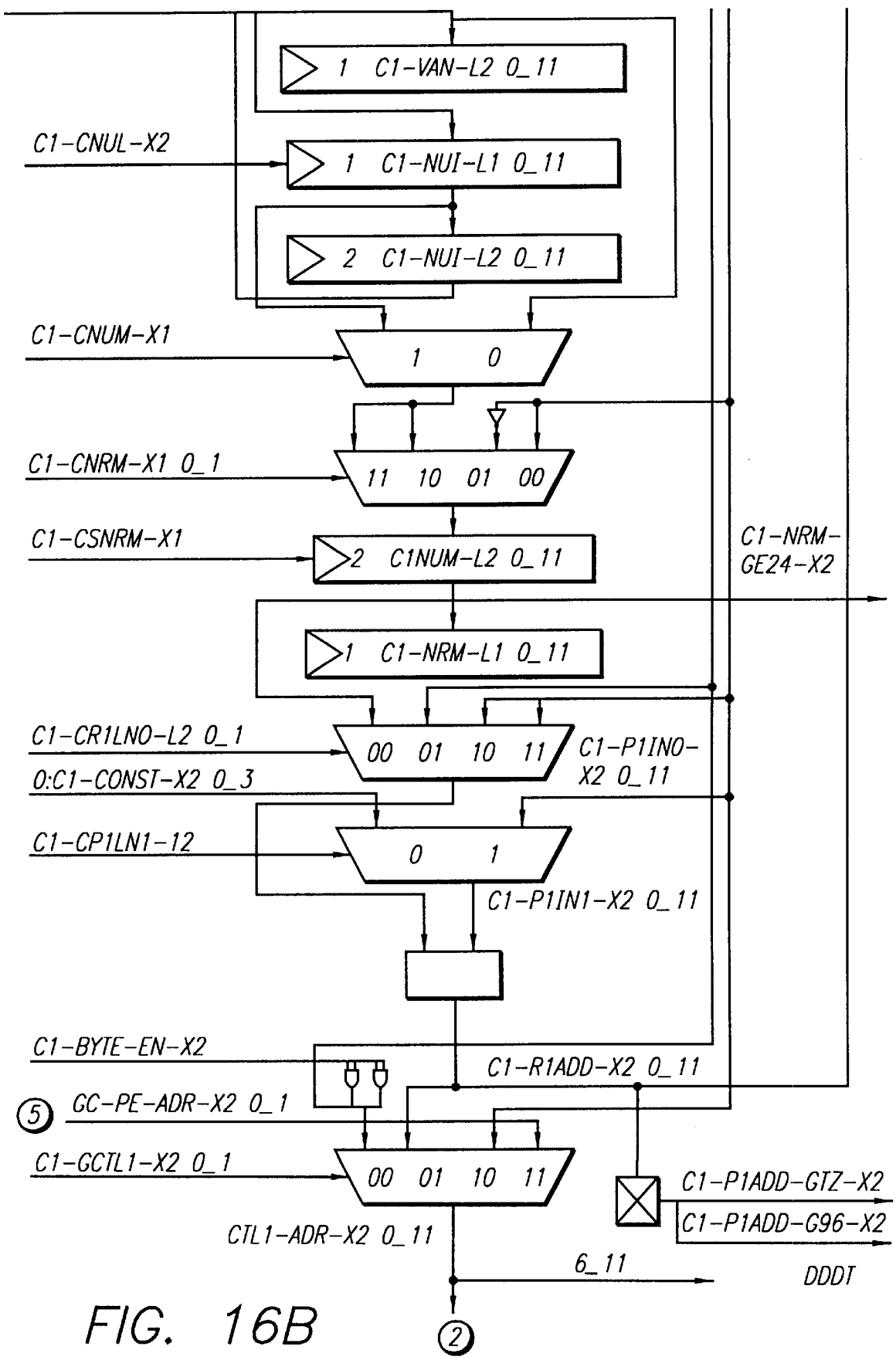
Figure 16C:
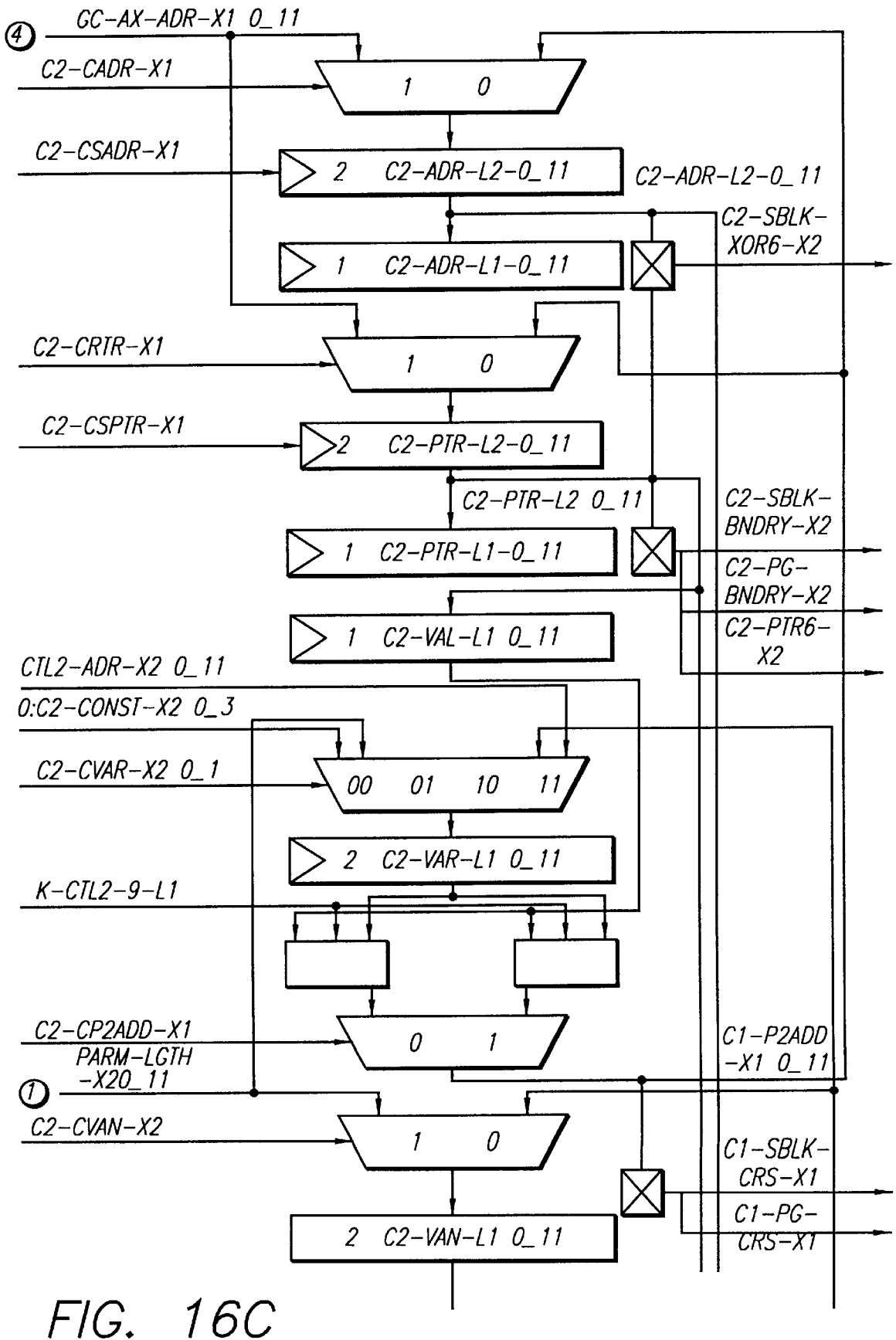
Figure 16D:
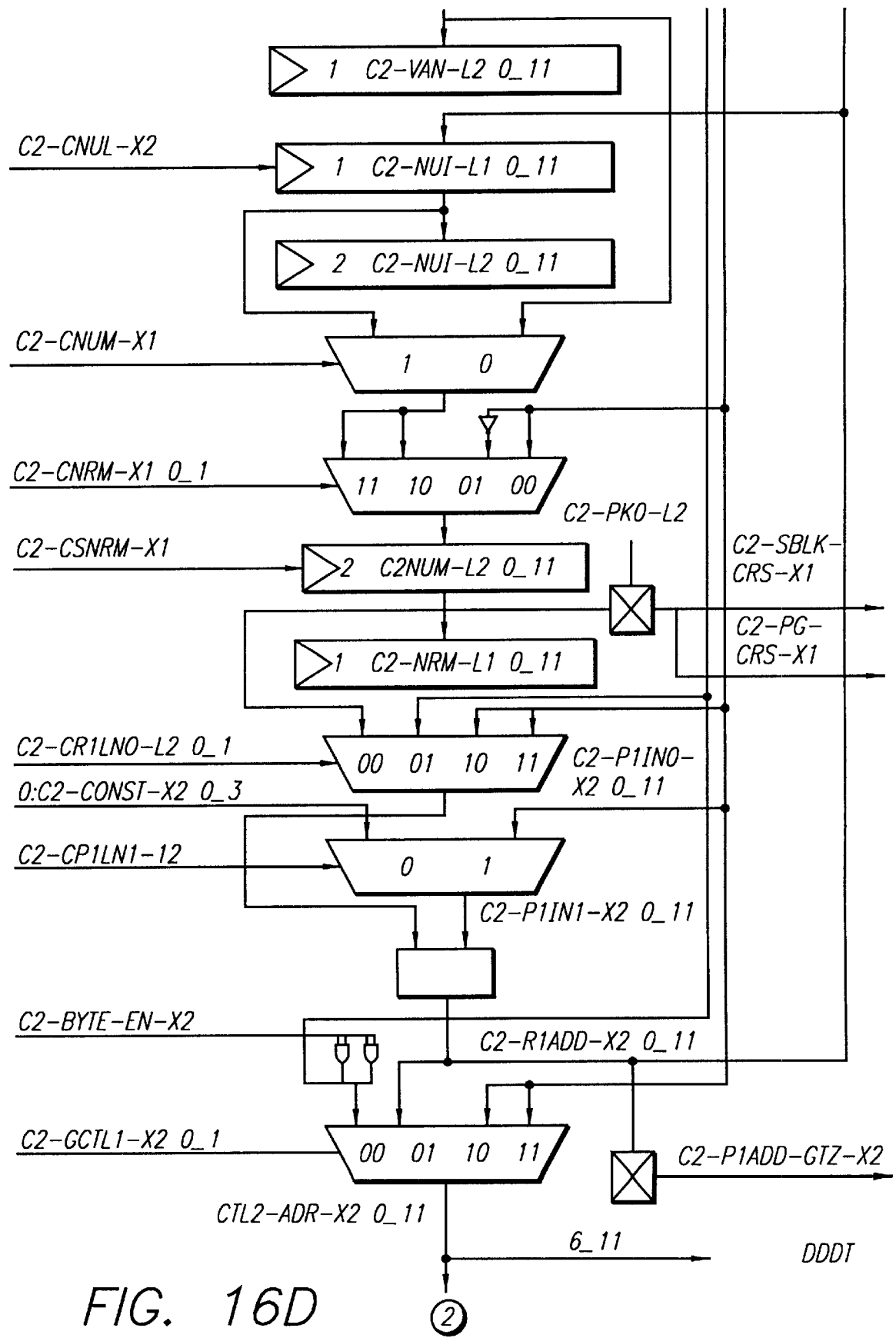
Figure 17A:
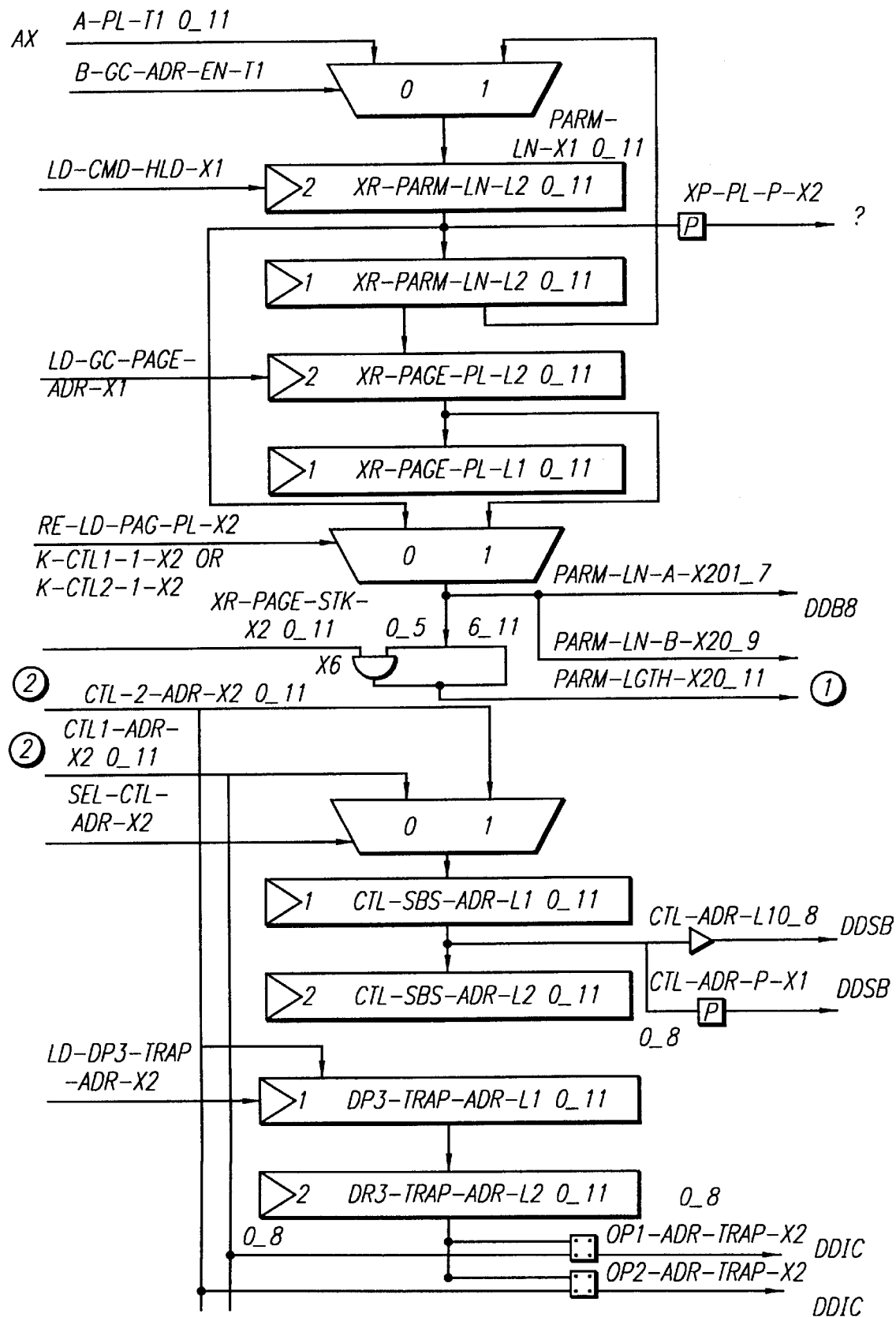
Figure 17B:
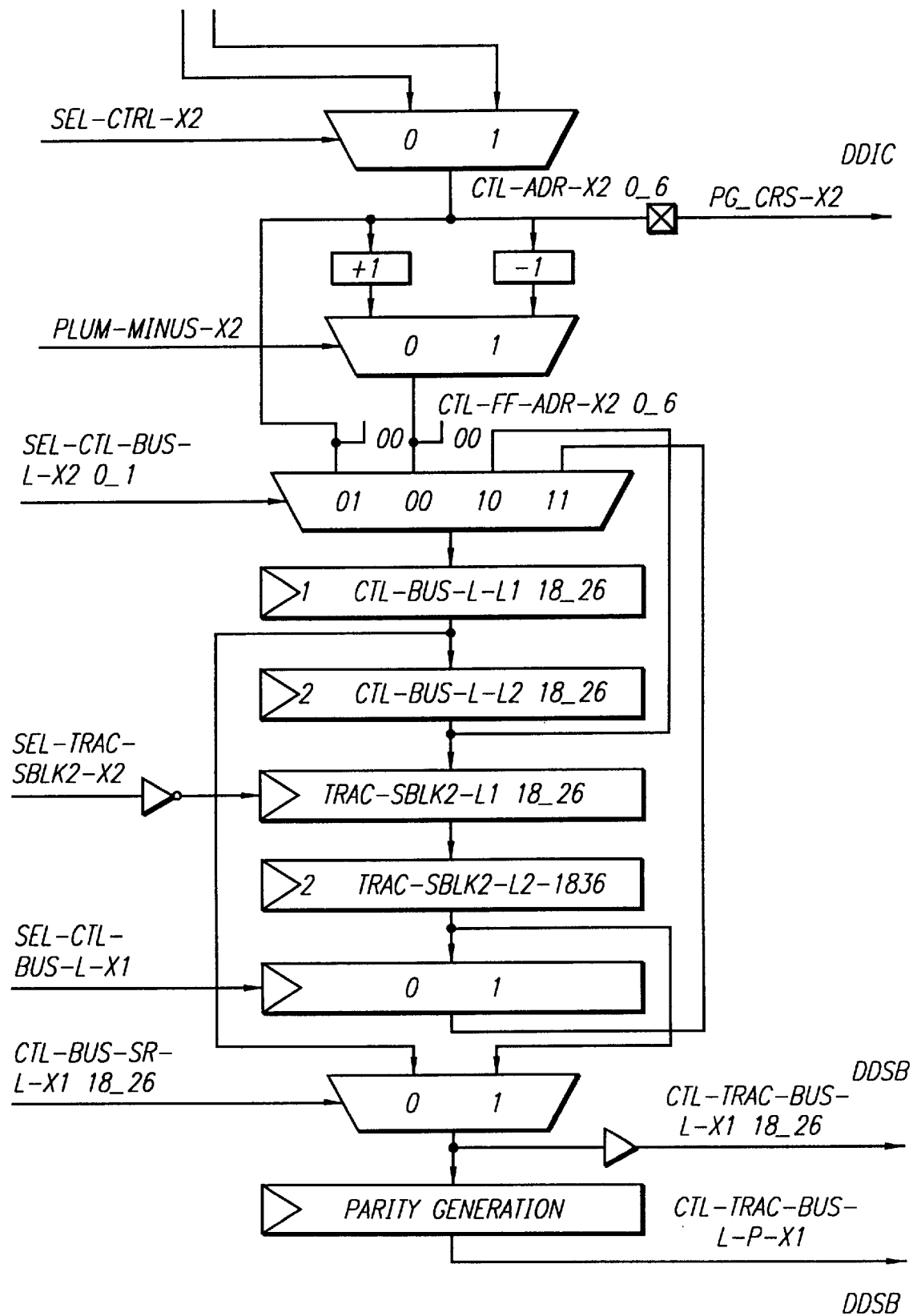
Figure 18A:
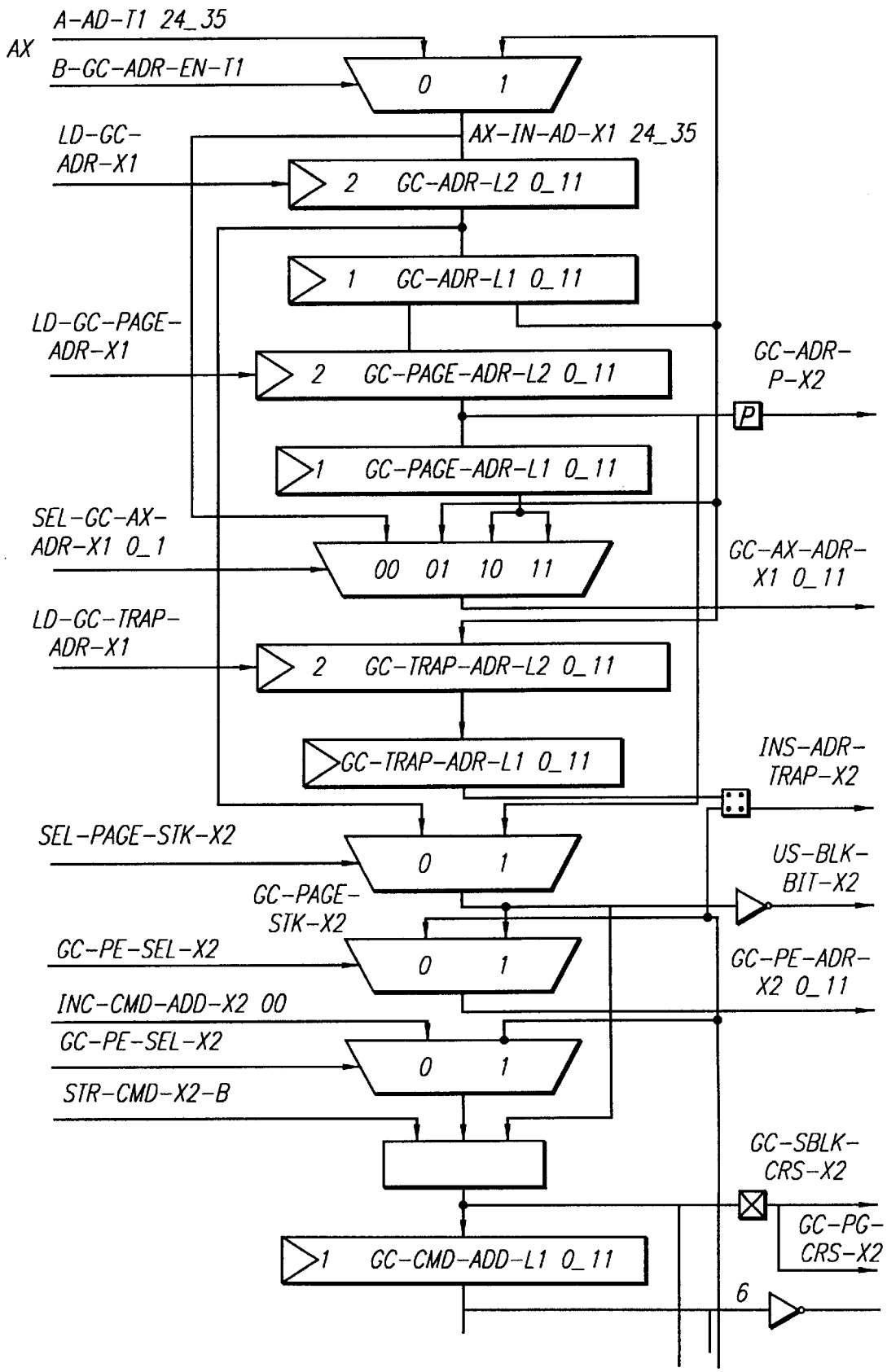
Figure 18B:
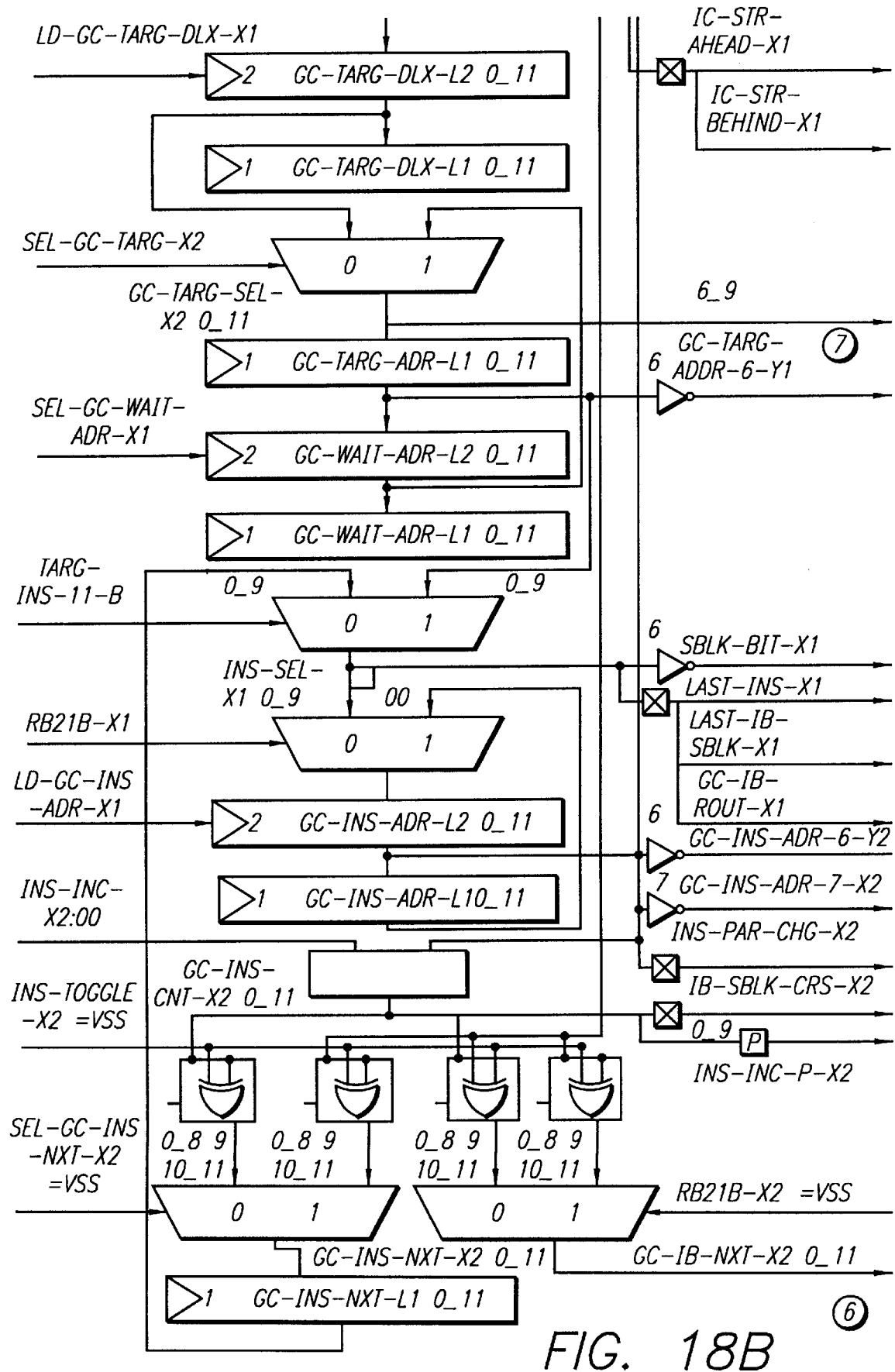
Figure 19:
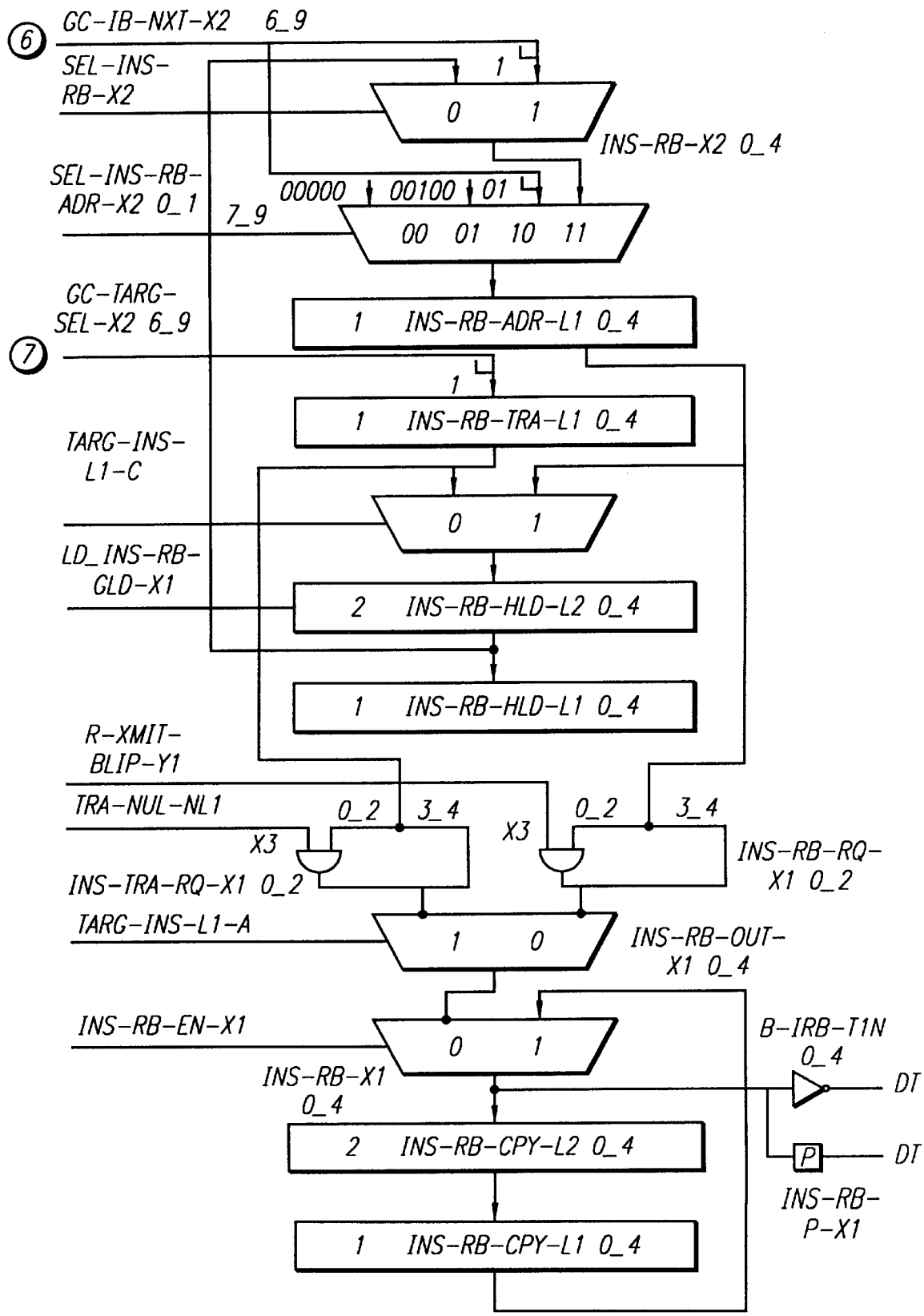

Refer to FIG. 6 and the following discussion.

A.2.2.1—Consultation Cycle

CD executes a consultation cycle only on basic processing unit requests, prefetch, internal invalidate or full-write requests in case of interference and reread after siphon. The high address used to access the processor directory comes from:

TED (the virtual to real, associative memory address translator in the paging unit) if TED hit or from CDPD if paging on basic processing unit requests, an operand buffer or a temporary address register ITEMP for a prefetch, DD on reread-c (B-H-X1 0:18), or SSP (i.e., service scan path).

The low address used to access the processor directory comes from:

CDPD on basic processing unit requests,

DD on prefetch and on reread-ob or reread-c (B-L-X1 18:9), or

.SSP.

A.2.2.2—Read Cycle

The processor directory executes a read cycle on write back, CPU bus block change and reread-ob. The level used to access CD comes from:

DD on CPU bus block change (B-LV-X1 0:4), an operand buffer for an OB write back, or

SSP.

The low address used to access the directory comes from:

DD on CPU bus block change (B-L-X1 18:9), an operand buffer for an OB write back or a reread-ob, or

SSP.

A.2.2.3—Write Cycle

CD executes a write cycle on write after a CPU bus block change. The low address used to access CD comes from DDSB (B-L-X1 18:9) or from SSP. The high address written in the directory comes from DDSB (B-H-X1 0:18) or from SSP. DDSB sends the status to be written in CD directory on the B-L-X1 20:4 lines.

A.2.2.4—NOP Cycle

CD executes some NOP (no operation) cycles without specific addresses when there is no operation.

A.2.3—Priority Tree

As shown in FIG. 7, 0 is the highest priority to access the CD Directory, 7 is the lowest. The nxt (next) codes are described in FIGS. 6–10.

A.3—Address Data Path

CDAD is the real address data path for the access to the CD directory. DDDP is the byte address in the block and block in the page address.

A.3.1—CDAD Data Path

The main functions of the CDAD data path, shown in FIGS. 11, 12, 13, are:

to provide the real address to CD:
in operand access operations,
in prefetch, re-read, and write-OB, EDI buffers to RAM operations, and
in operations in which a directory location is written to change the status and/or address, and to load a new block or invalidate a block;

to temporarily store the instruction buffer and operand buffer sub-block addresses and detect if these addresses are equal to the current address;

to temporarily store the lower and upper limit address registers for memory and expanded memory unit (EMU) access and detecting if an address is out of the bounds;

to temporarily store the real address trap and detect a match with the current address; and to transfer data between CDPD and DDSB.

This data path is 30 bits (27 bits data and 3 bits parity) wide. The control part is in CDCC (the selection of the multiplexers is calculated in CDCC from the next codes). The main interfaces of the CDCC block are:

interface with CDPD:
reception of the real page address if TED hit: TED-OUT-X2 4:18 (+2P),
reception of the real page address if TED miss: VIRTUAL-ADDER-OUTPUT-X2 0:18 (+2P),
reception of the address in the page: LOW-PAGE-ADDR-X2 0:9 (+P),
emission/reception of data exchanged with CDAD: CD-TRI-DATA-X1 0:18 (+2P), and
reception of data from CDAD: CD-LOW-DATA-X1 18:9 (+P);

interface with the CD directory and the data to access the cache, and read or write the directory addresses:
emission of the address in the page RSAL-X2 0:7 (block address for CD directory and sub-block address for data) for the access of a set,
emission of the page address CON-WRITE-BUS-X1 0:18 (+2P) for write or comparison,
reception of the page address read in the directory CDAM-OUT-RB-X1 1:18 (+status and 2P, used for swap or SSP);

interface with DDSB:
reception of data from DDSB: B-H-X1 0:18 and B-L-X1 18:9 (+2P) and
emission of data to DDSB: P-H-X1 0_18 and P-L-X1 18:9 (+2P).

The real address trap register is loaded in CDAD with the basic processing unit command LD-TRAP, PL 6=1. The limit address registers (ULAR, LLAR, EULAR, ELLAR) are loaded in CDAD with the basic processing unit command LD-LARn, and sent back to the basic processing unit with the basic processing unit command ST-LARn.

For main memory access in VMOS mode, the comparison of the current real address with the upper and lower limits is systematically done. For EMU access in VMOS mode, the comparison of the current real address with the EMU upper and lower limits is done with the basic processing unit command EMU-LIM. If CDAD detects that the address is out of bounds, CD will send a VW bound fault to the basic processing unit.

Integrity: the inputs of CDAD are protected with a 9 bit parity. They are systematically verified at the input. CDAD emits its outputs with 9 bit parities.

A.3.2—DDDP Data Path

Referring to FIGS. 16–19, the main functions of the DDDP data path are:

the calculation of the next address for operand or instruction (prefetch),
the detection of sub-block, block and page crosses, and
the incrementation of the address for EIS.

The control part is in DDEC. This data path is 12 bits wide, without parity. The main interfaces of the DDDP block are:

with the basic processing unit:
reception of the address in the page: A-AD-T1 24-35 and
reception of the parameter-length: A-PL-T1 0_11;

with cache memory:
emission of the selection of the word to be sent on the instruction bus: B-IRB-T1N 0:5 (+P);

with DDSB:
emission of CTL-ADR-L1 0:9 (+P) that will be temporarily stored in ESB or TSB registers in DDSB and
emission of CTLTRAC-BUS-L-X1 18:9 (+P) that will be sent on B-L-X1 or temporarily stored in ESB or TSB registers in DDSB; and interface with DDB8, DDCS, DDMF
transmission of the parameter-length PARM-LN-A-X2 to DD control blocks,
emission of CTL1-ADR-X2 6:6 and CTL2-ADR-X2 6:6 to DDDT, for B-ORB-TIN and B-WR-T1N generation (from DDDT to DRAM), and
emission of the crossing, size information to DD control blocks.

DDDP is divided in three parts called controllers:

a general controllerG used for instruction target prefetch and target fetch, a controller1 used for main operand and EIS operand1 address, count, and a controller2 used only as a multiplexer for general commands and for EIS operand2 address, count.

DDDP receives from the basic processing unit a byte address in the page (bits 24:35 of the virtual address). Bits 24:7 (sub-block address in the page) are used in the prefetch sub-block incrementer/decrementer processes to form the address of the next 32 byte sub-block of any sequentially accessed string of instructions or of bytes, words and decimal digits. This sub-block is to be prefetched and loaded into one instruction buffer or operand buffer. The prefetch address is transmitted to CD over the B-L-T1 18:7 lines.

Bits 31:5 (byte address in sub-block) are incremented or decremented in the controllers G, 1, 2 to form the address of the byte string within a 32 byte sub-block for each cache memory buffer access and instruction, operand, or result bus transmission. These addresses are transferred to the cache memory (directly or via DDDT) in control codes specifying the buffer source of a sub-block and the word or byte address within the sub-block.

B. SYSTEM DIRECTORY ACCESS AND CPU BUS REQUEST MANAGEMENT

B.1—Role of the Bus Directory

The Bus Directory (corresponding to BDIR 37 in FIG. 3) is also called the DD directory. Two roles can be distinguished: to interface with the CPU bus and to filter CPU bus invalidate requests.

B.1.1. CPU Bus Interface

The DD directory (and its support logic circuitry) interfaces with the CPU bus in order to be able to access the shared cache 11, other private caches on the board and the main memory through the shared cache. The DD directory is accessed on every CPU bus request. All the block state evolutions or changings are ordered by the shared cache, and this procedure takes place when the shared cache acknowledges the request (internal request or external request). So, updates are performed in the same order in the shared cache directory and in the private cache DD directory.

B.1.2—Filter on CPU Bus Invalidate Requests

A second function of DD is to filter external invalidate, full-write and read-&-exclusivity requests not filtered by the shared cache. Indeed, when the shared cache receives a CPU bus (or system bus) invalidate request on a block with the state valid or valid-exclusive, it acknowledges all the CPU's on the board because it doesn't know which private caches own a copy of this block. The same situation applies on a full-write or a read-&-exclusivity request. Similar conditions apply each time a block with the state valid, valid-exclusive or valid-modify (dirty) has to be replaced in the shared cache. In this case, an invalidate command is sent to all the private caches on the board. So, if the DD directory doesn't have a copy of this block, it will not disturb the CD directory.

B.2—CPU Bus Requests

The CPU bus requests can be separated into two classes: internal requests and external requests. All requests emitted by the private cache are deemed internal, and all requests coming from the CPU bus are deemed external There are two types of external requests: requests originating in the shared cache and requests originating in the other private caches connected on the board.

B.2.1 Remind on CPU Bus Request Management

B.2.1.1—Request Sent by a Private Cache

Figure 20:
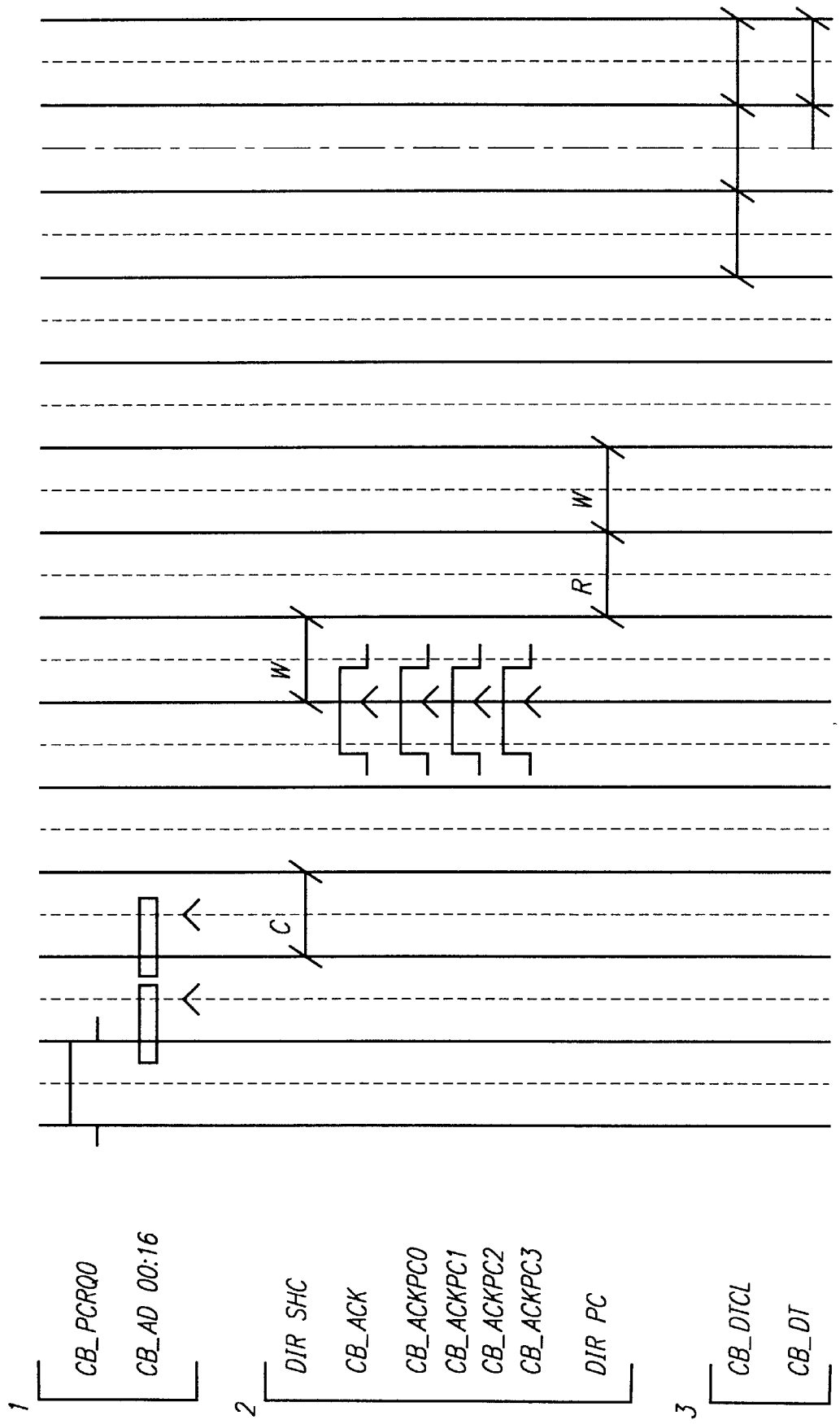

As shown in FIG. 20, management of requests from a private cache requires three steps:

$1^{st}$ step: request emission (address and command), $2^{nd}$ step: acknowledgment of that request and update of private cache directories (shared cache directory has previously been updated), and $3^{rd}$ step: data transfer (not in FIFO mode versus request emission or acknowledgment) if needed.

B.2.1.2—Request Sent by the Shared Cache

Figure 21:
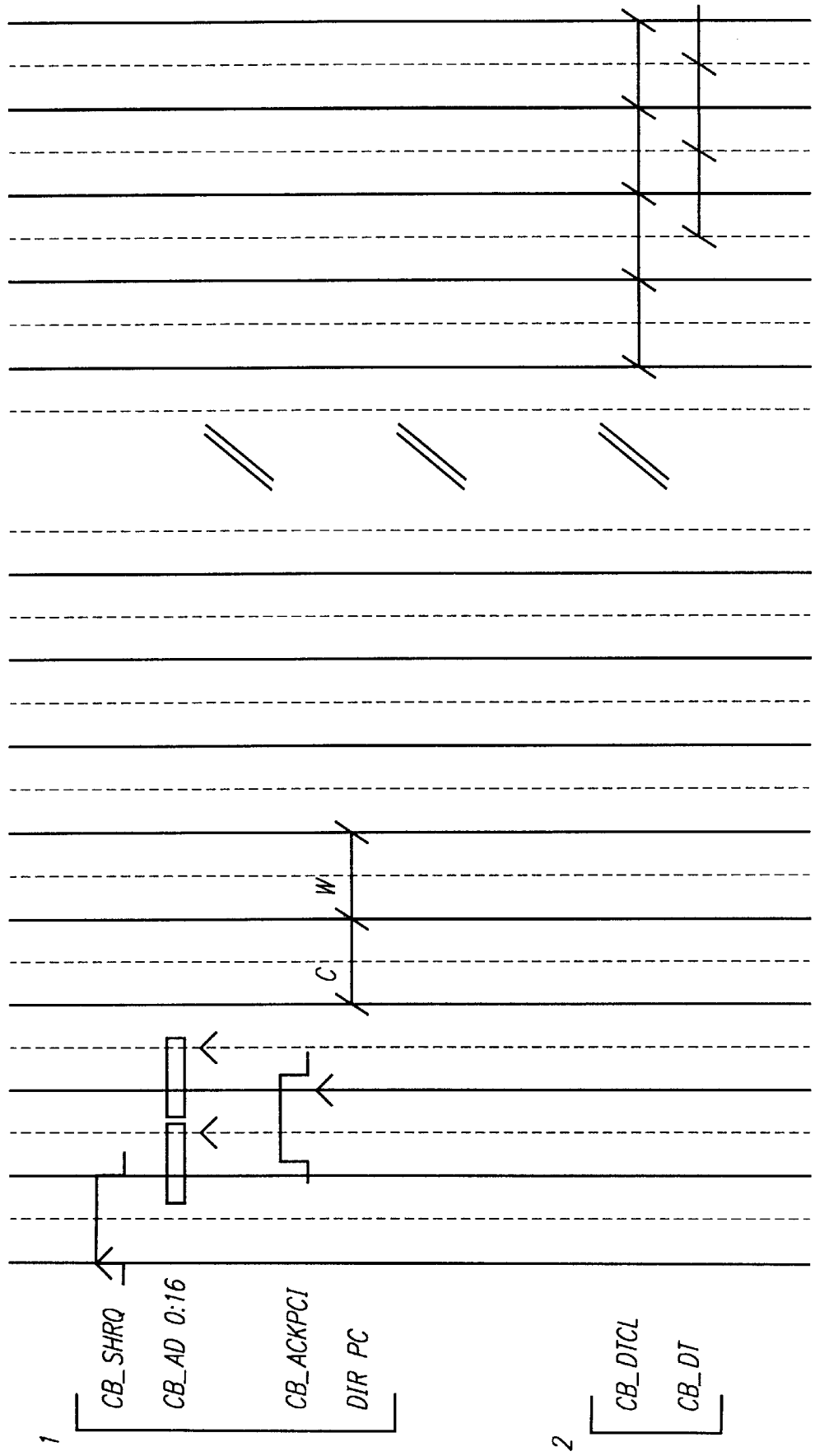
Figure 22A:
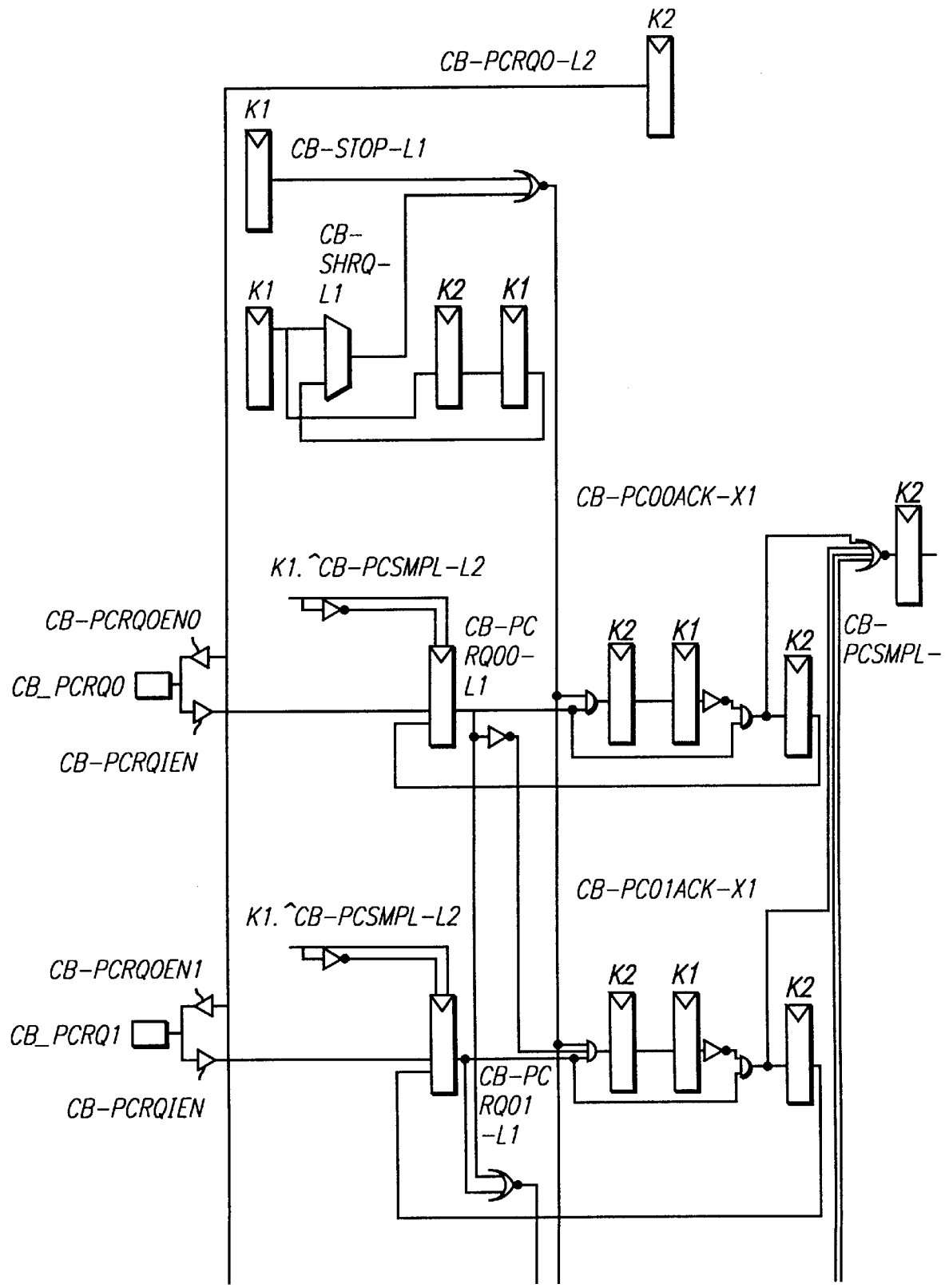
FIGS. 22A–22B, taken together, constitute a logic diagram of a priority determination network for prioritizing competing requests on the CPU bus.
Figure 22B:
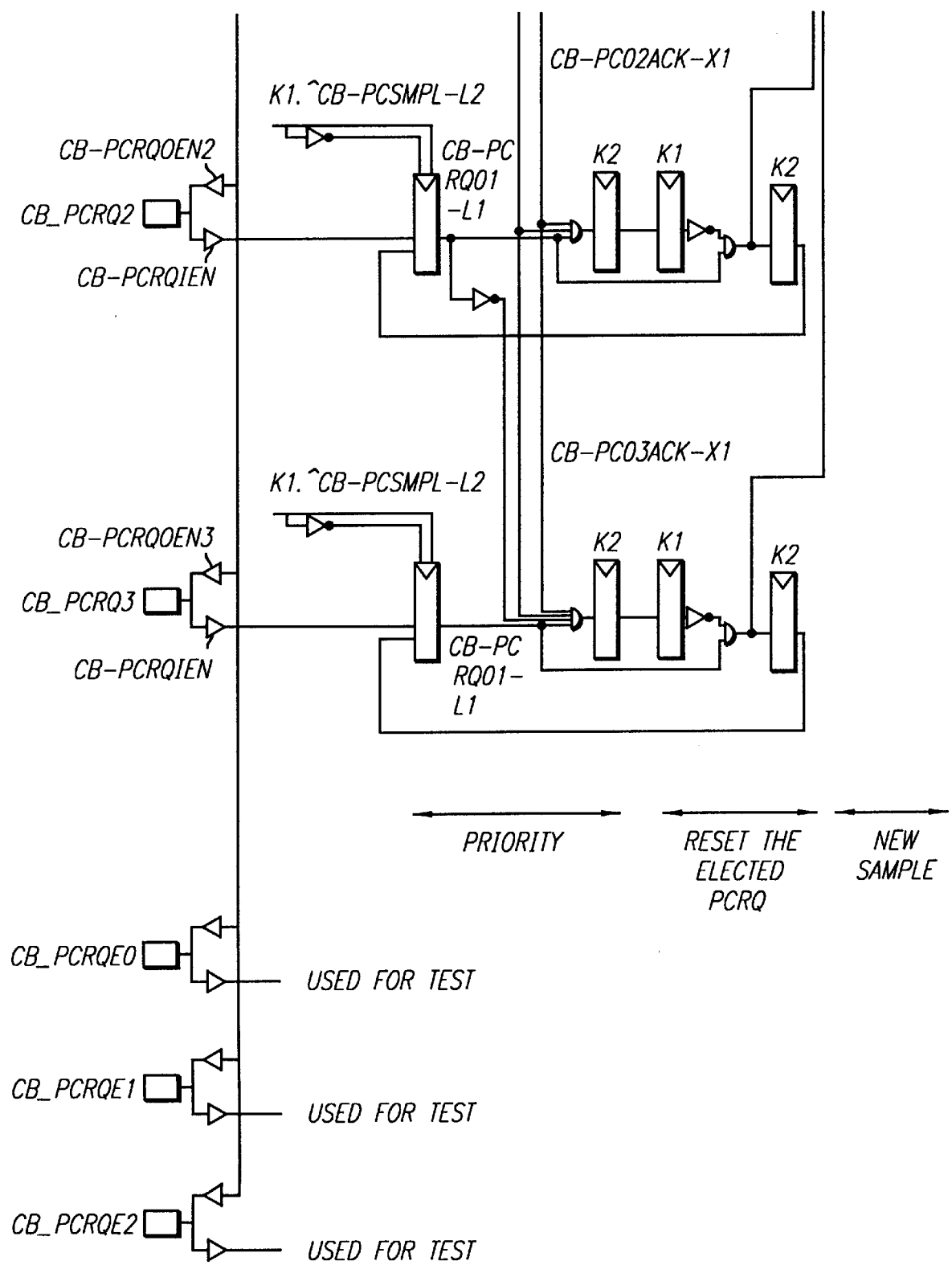

Referring to FIG. 21, management of requests from the shared cache requires only two steps:

$1^{st}$ step: Request emission (address and command) with implicit acknowledgment=>CD and DD directories are updated (shared cache directory has previously been updated).

$2^{nd}$ step: Data transfer (in FIFO mode versus shared cache Request emission) if needed.

B.2.2—CPU Bus Commands

The following commands are available on the CPU bus. All commands may be sent by cache controller. Only read, read-with-exclusivity, invalidate and interrupt commands may be sent by the shared cache.

| | | |
|---|---|---|
| 0000 | NOP | no data |
| 0001 | INTERRUPT | no data |
| 0010 | INVALIDATE | no data |
| 0011 | WRITE REGISTER | 16 byte data |
| 0110 | FULL WRITE | no data |
| 0111 | READ REGISTER | 16 byte data |
| 1010 | SWAPP | 64 byte data |
| 1110 | READ WITH EXCLUSIVITY | 64 byte data |
| 1111 | READ | 64 byte data |

The missing binary codes are forbidden and not sent by the cache controller.

B.3—CPU Bus Address Allocation

The cache controller sends a request onto the CPU bus, each time:

a miss occurs in the CD directory (read, read-&-exclusivity, full-write), a write is performed on a block with the state valid (invalidate), and a block with the state valid-modify has to be replaced in the cache (swap).

The cache controller also sends interrupt requests to manage the interrupts and read register or write register requests to manage some specifics commands such as read-calendar-clock-from-SCU. When the cache controller needs to send a request on the CPU bus, it sets the CB-PCRQO signal in order to obtain the CPU bus allocation. This information is broadcast to all the units connected on the CPU bus.

B.3.1. Priority Determination

The priority is computed simultaneously in the five units (shared cache and four CPUs) on the board. Referring to FIG. 20, this priority is done by sampling CB_PCRQi, and applies the following rules:

the shared cache request has the highest priority and does not enter into the sample such that:
when the shared cache sends a request, it is automatically elected,
it is the responsibility of the shared cache to send its request at an appropriate time, and
when the CB SHRQ signal is present, it means that the two next CPU bus cycles will be used for the servicing the shared cache address transfer;

the elected request depends on the CPU number; i.e.:
inside a sample, first, the CPU #0 request which is elected, then the CPU #1 request, then the CPU #2 request and then the CPU #3 request;

all the requests inside a sample are treated before the temporary storage of another sample.

Each private cache samples the requests coming from the four private cache controllers. The CPU number is used to determine from which buffer the CB_PCRQi signal has to be sent. The priority network inside the five units (four CPUs and the shared cache) on the CPU bus elects one request (CB-PCOiAC1-X1). Once elected, this request is reset, and the cache controller for the elected unit drives the CPU bus address and command bus section during the following two cycles. Every two cycles, if there is no request from the shared cache, one request can be elected. When all requests inside a sample have been handled, the signal CB-PCSMPL-L2 is set, and a new sample is temporarily stored. A request from the shared cache invalidates the priority network.

B.3.2—CPU Bus Address Emission

When a given cache controller's request has been elected, it drives the CPU bus during two cycles during which it sends the address of the block, the associated command, the label (request number) and the type of the data (private or shared). The address transfer lasts two cycles:

Cycle 1:
  low address bits 16:16
  data type on bit 0 of the CB__CMD field
    0 stands for private data
    1 stands for shared data
  label of the request on bit 1 of the CB__CMD field (this label is used to quality the responses on the CPU bus)
Cycle 2:
  high address bits 00:16
  command During the broadcast of an address, all the transferred information is temporarily stored in each unit in order to anticipate the request acknowledgment.

B.4—CPU Bus Address Management
B.4.1—CPU Bus Blocks Overview

Figure 23:
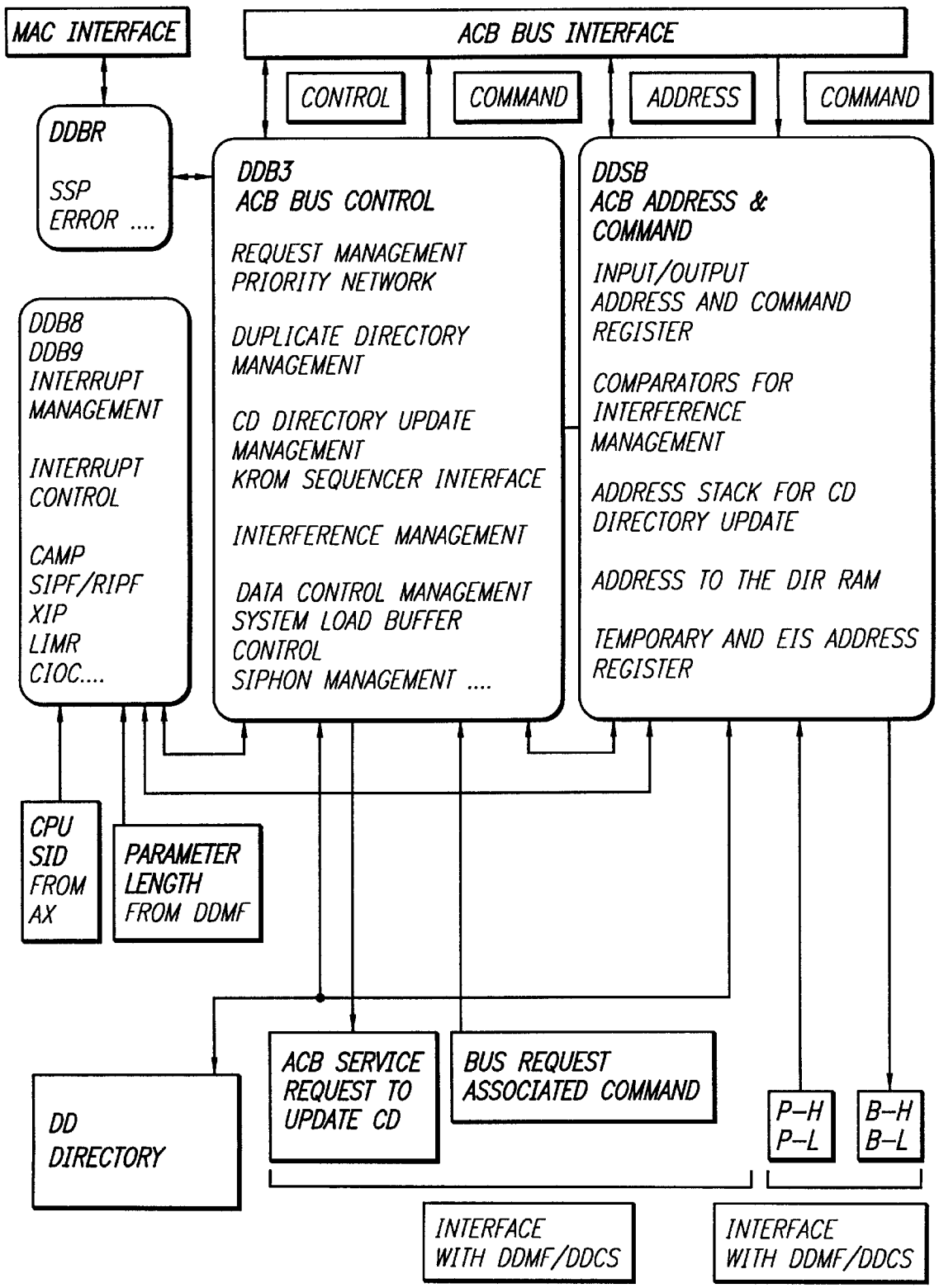
Figure 24:
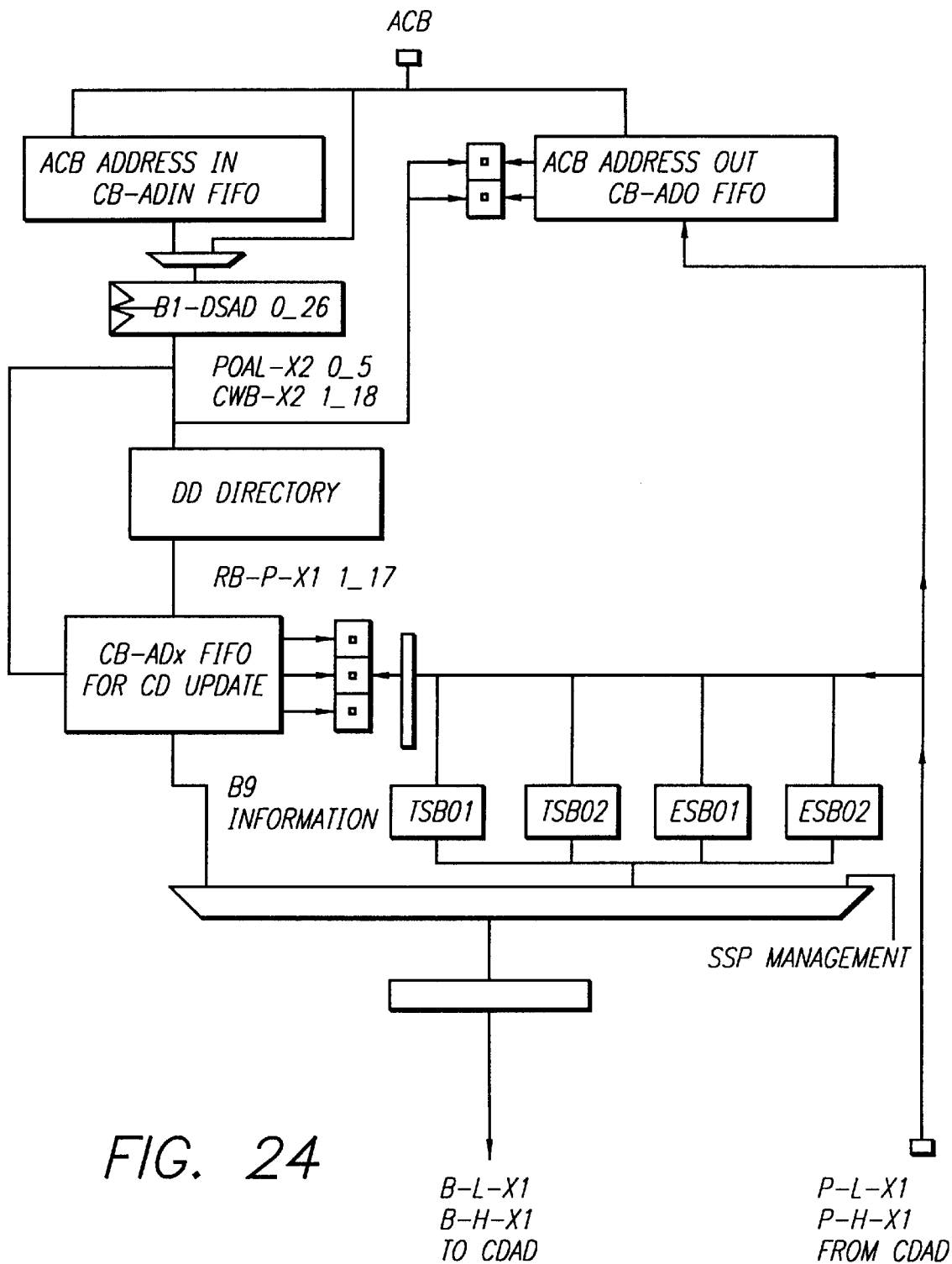
Figure 25:
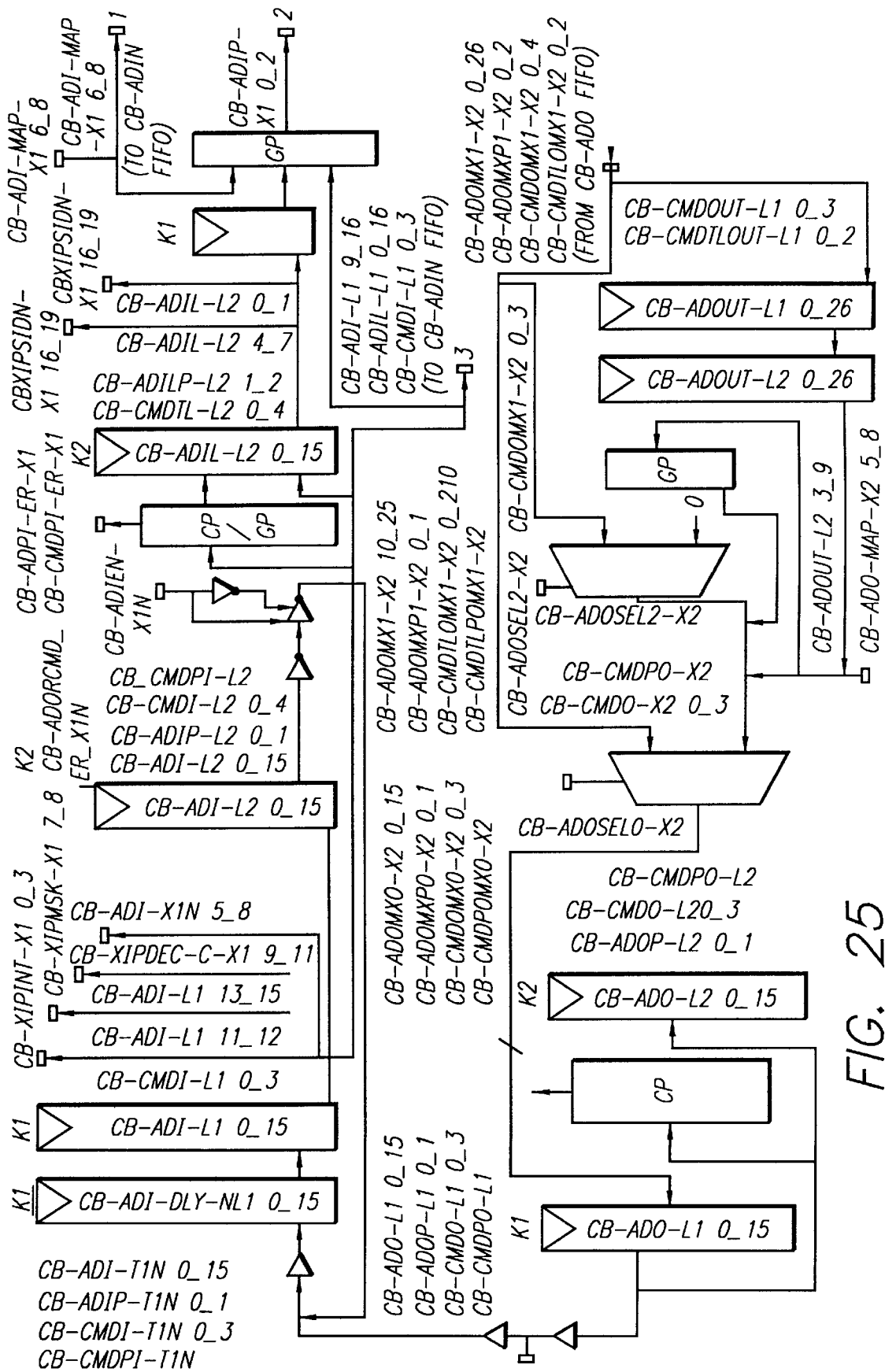
Figure 26:
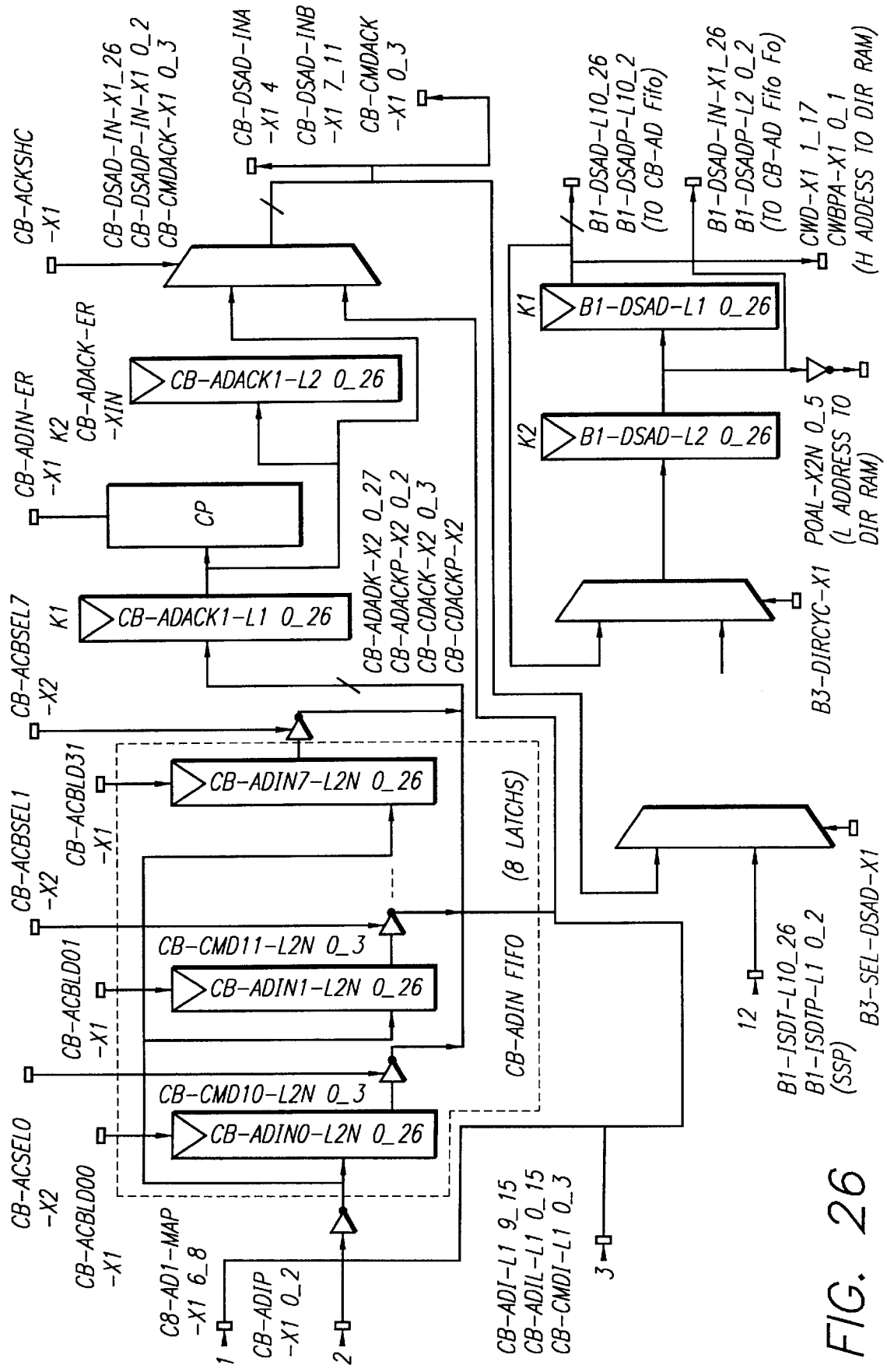
Figure 27:
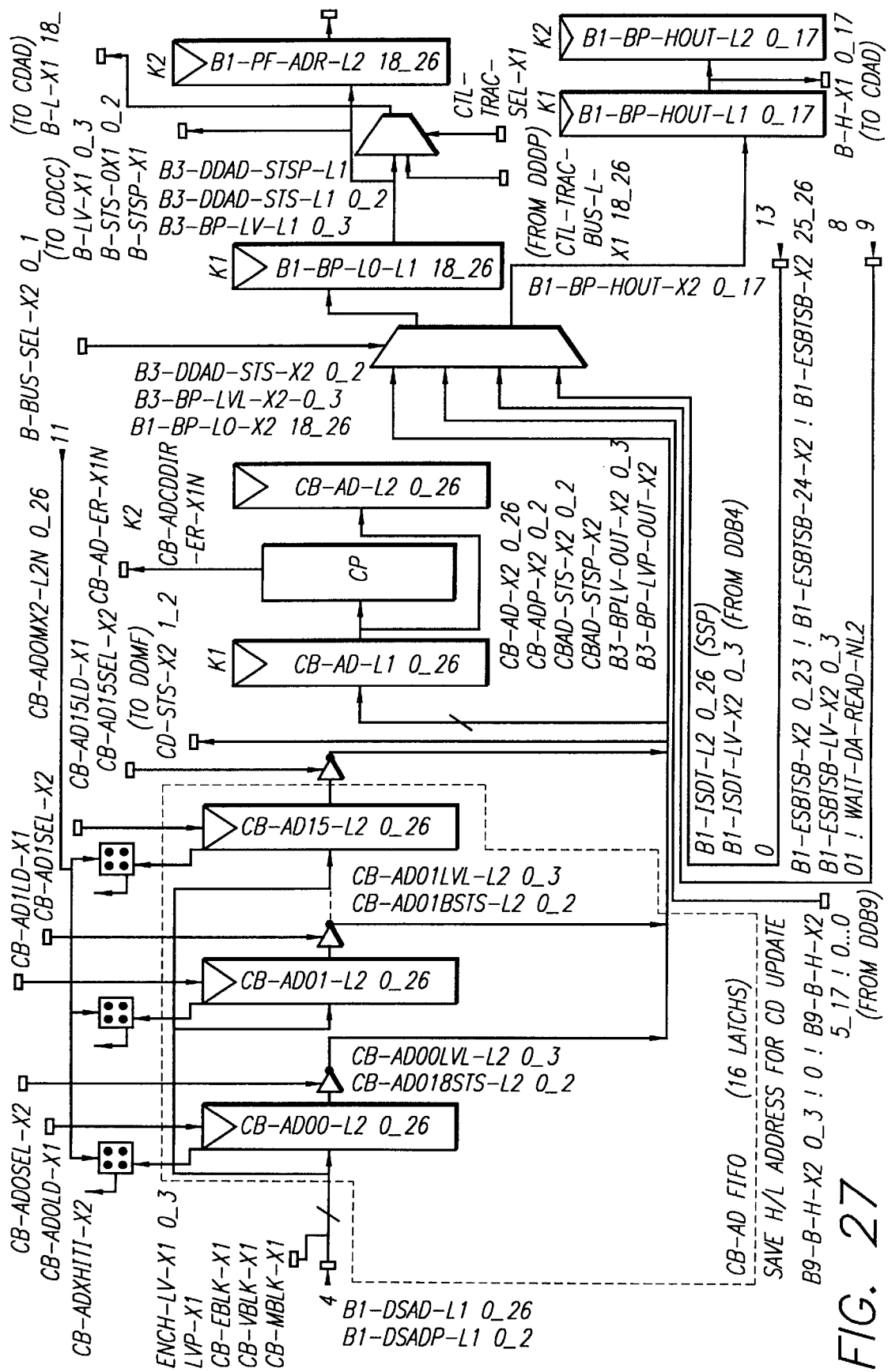
Figure 29:
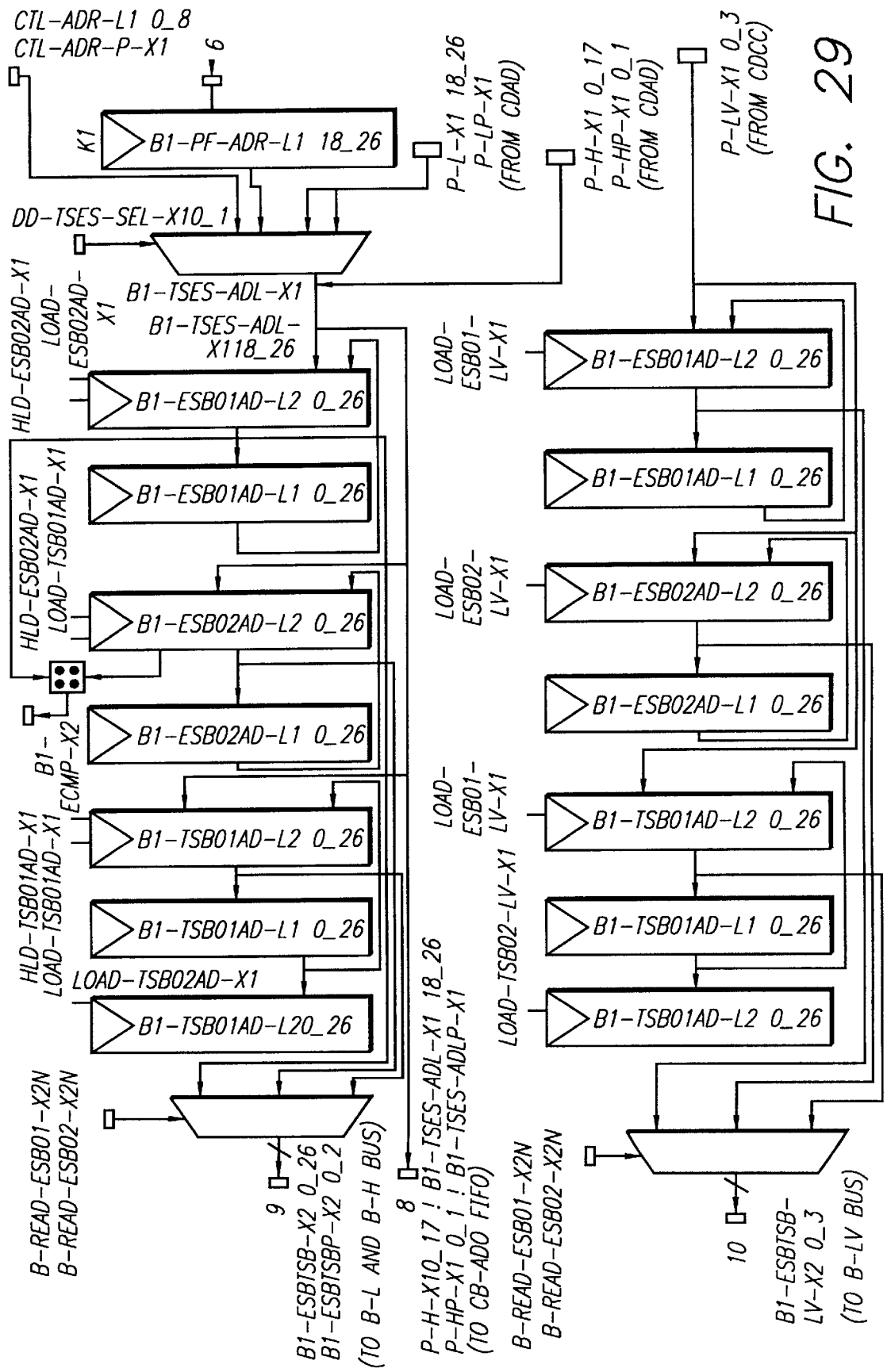

The CPU bus is managed by several blocks as shown in FIG. 23. The address and command data path is in DDSB. The control part is done in DDB3. The interrupts are treated in DDB8 and DDB9. The DDB4 block manages the errors and the SSP.

B.4.2—CPU Bus Address and Command Data Path

Referring to FIGS. 24–28, the CPU bus addresses and commands data path is in DDSB whose main functions are:
  the address management for the internal requests (output address register),
  the address management for the external requests (input address register),
  the address management for the DD directory update (low address and high address),
  the address management for the CD directory update,
  the address management for the temporary and EIS registers, and
  the SSP.

The main interfaces of DDSB are:
  the CPU bus:
    addresses and commands from the CPU bus: (CB-ADI-X1 0:16, CB-ADIP-X1 0:2, CB-CMDI-X1 0:4, CB-CMDIP-X1) and
    addresses to the CPU bus: (CB-ADO-L1 0:16, CB-ADOP-L1 0:2, CB-CMDO-L1 0:4);
  the DD directory RAM
    low address to the DIR RAM (POAL-X2 0__5),
    high address to the DIR RAM write bus (CWB-X2 1__17 & CWBPA-X2 0__1), and
    output of the DD directory (RB-P-X1 1__17 & RBPA-P-X1 0__1);
  the CDAD block
    to CDAD: to access the CD directory, to transmit the interrupt word and for MPSC management:
      low address (B-L-X1 18__26) and
      high address (B-H-X1 0__17 & B-HP-X1 0__2);
    from CDAD: to manage the internal CPU bus request, the temporary and EIS Registers and MPSC:
      low address (P-L-X1 18__26 & P-LP-X1) and
      high address (P-H-X1 0__17 & P-HP-X1 0__1); and
  DDB9 block for interrupt management, the get-length-after-a-page-crossing and read IMSK results:

(B9__B__HX2 0__3 ! B9__B__H__X2 5__17).

B.4.3—Internal Address Management

When a cache controller receives a request from its BPU via its paging unit, it consults the CD directory. The CD directory is addressed by the CDAD block through the lines P-ADR-X2 0:7. If a miss occurs, the DDMF block, informed via the CDCC block, sends the signal CB-PCRQ__LD__X1 to the DDB3 block in order to set the CB__PCRQ line on the CPU bus. The address miss is temporarily stored in the CB-ADO FIFO 32 until the CPU bus is granted to the cache controller. Then, when access to the bus is granted, the address, the command, the data type and the label of the request are broadcast onto the CPU bus.

Each unit on the CPU bus owns a bank of eight registers (named CB-ADIN FIFO), corresponding to buffer 35 in FIG. 3, in which the commands and the addresses are temporarily stored, according to the CPU number and the label of the request. In order to update the directories, all this information remains in the CB-ADIN register bank as long as the acknowledgment from the shared cache hasn't yet been received. (There can be at least two concurrent non-acknowledged requests per CPU).

B.4.3.1—Directory Updating

As summarized in FIG. 30, internal requests can be divided into three types:
  miss requests for which data is expected,
  invalidate requests with no data, and
  other requests which don't require a directory access (read-register, write-register, interrupt).

On a read miss, CD updates its own directory, and the DD directory is updated after receiving the acknowledgment for the read command. The address for the CD directory update is loaded in the TSB01 register and sent on the B-L and B-H lines. During the cycle read of the CD directory, a swap operation can be required (i.e., a block with the state valid-modify has to be replaced). In this case, the CD directory will issue a swap command with the associated address and the level chosen. Thus, there can be at most two internal requests pending: one read and one swap. The swaps can be detected before the corresponding read request has been sent onto the CPU bus. For internal read-&-exclusivity requests, the cache controller has the same behavior.

On an internal invalidate, the CD directory is updated after the consultation and then waits for the ack (i.e., acknowledge) or nack (i.e., not acknowledge) indication from the DD directory before proceeding with the write. The DD directory is updated after receiving acknowledgment from the shared cache, taking the interferences into account. The ack/nack signals from the DD directory also takes interferences into account. Interferences management is described below.

B.4.3.2—Request Acknowledgement

The request acknowledgment (CB__ACK) signal is sent by the shared cache to all the private caches on the board. This acknowledgment concerns the requests which are temporarily stored in the CB-ADIN FIFO. On the CPU bus, three signals (CB__ACKID 0:2 & CB__ACKLB) serve to identify which request is being acknowledged. They will be used to read the CB-ADIN FIFO. The CB__ACKPCi signals determine if the local private cache is concerned by the acknowledgment or not, and so, if a directory update is necessary.

The request acknowledgment has several roles including:
  update the cache controller directories,
  request complete for requests such as interrupts, read register, write register, and
  boundary of interference for invalidate or swap requests.

When the cache controller receives an acknowledgment, it reads the CB-ADIN FIFO and:
  updates the DD Directory:

the low address is sent on the POALX2 0_5 lines and the high address is sent on the CWB-X2 1_17 lines; the
DD directory update lasts two cycles: one read (or CONS for external requests) and one write cycle; these two cycles are called cycle 2 and cycle 3;

for external requests, writes the needed information in the CB_ADx FIFO to update the CD directory at a later point in time; and for internal invalidate requests, sends the acknowledge (or not acknowledge in case of interference) signal.

B.4.3.3—Cache Controller Behaviour on Internal Requests

Figure 31A:
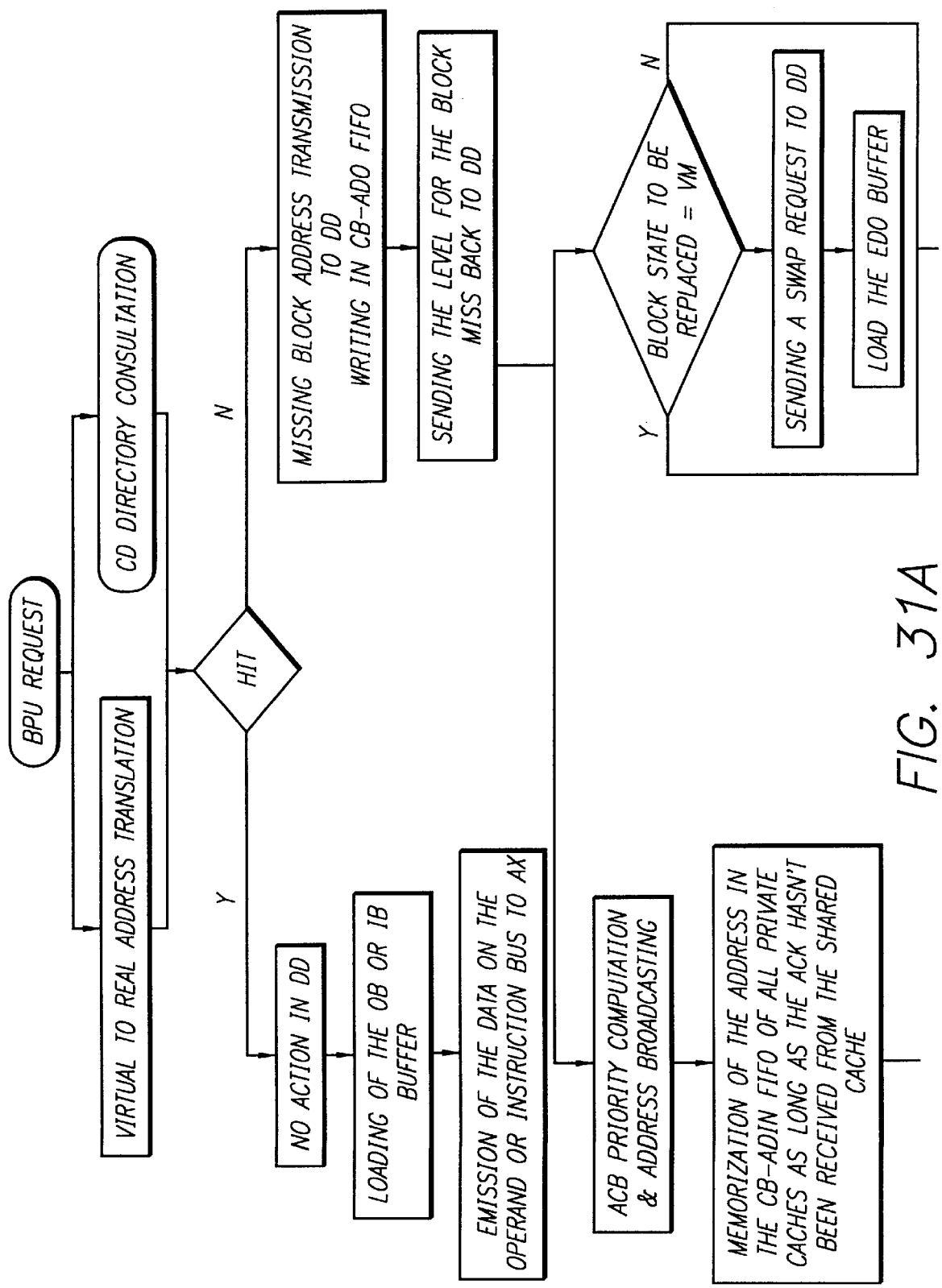
Figure 31B:
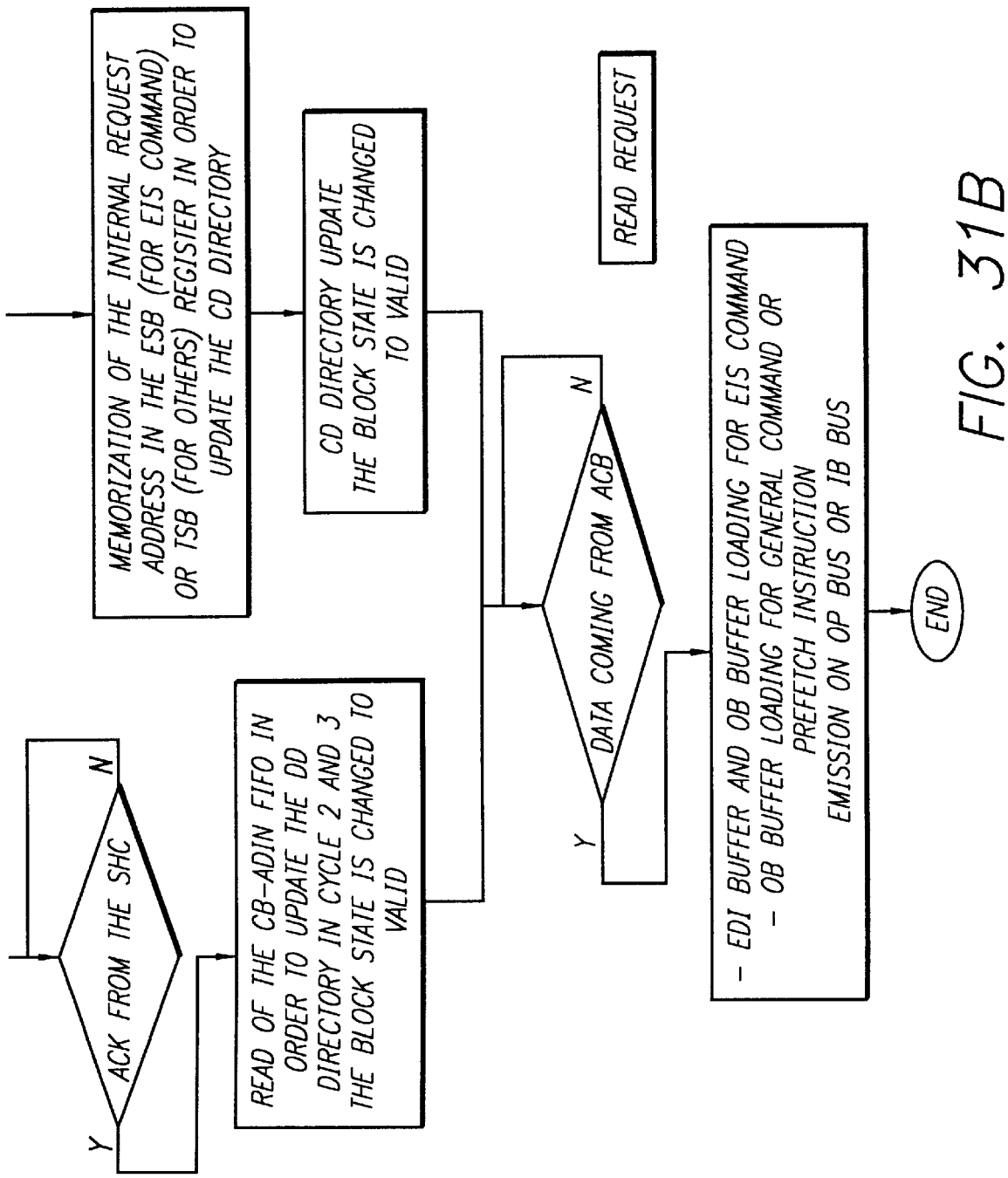
Figures 1, 32A:
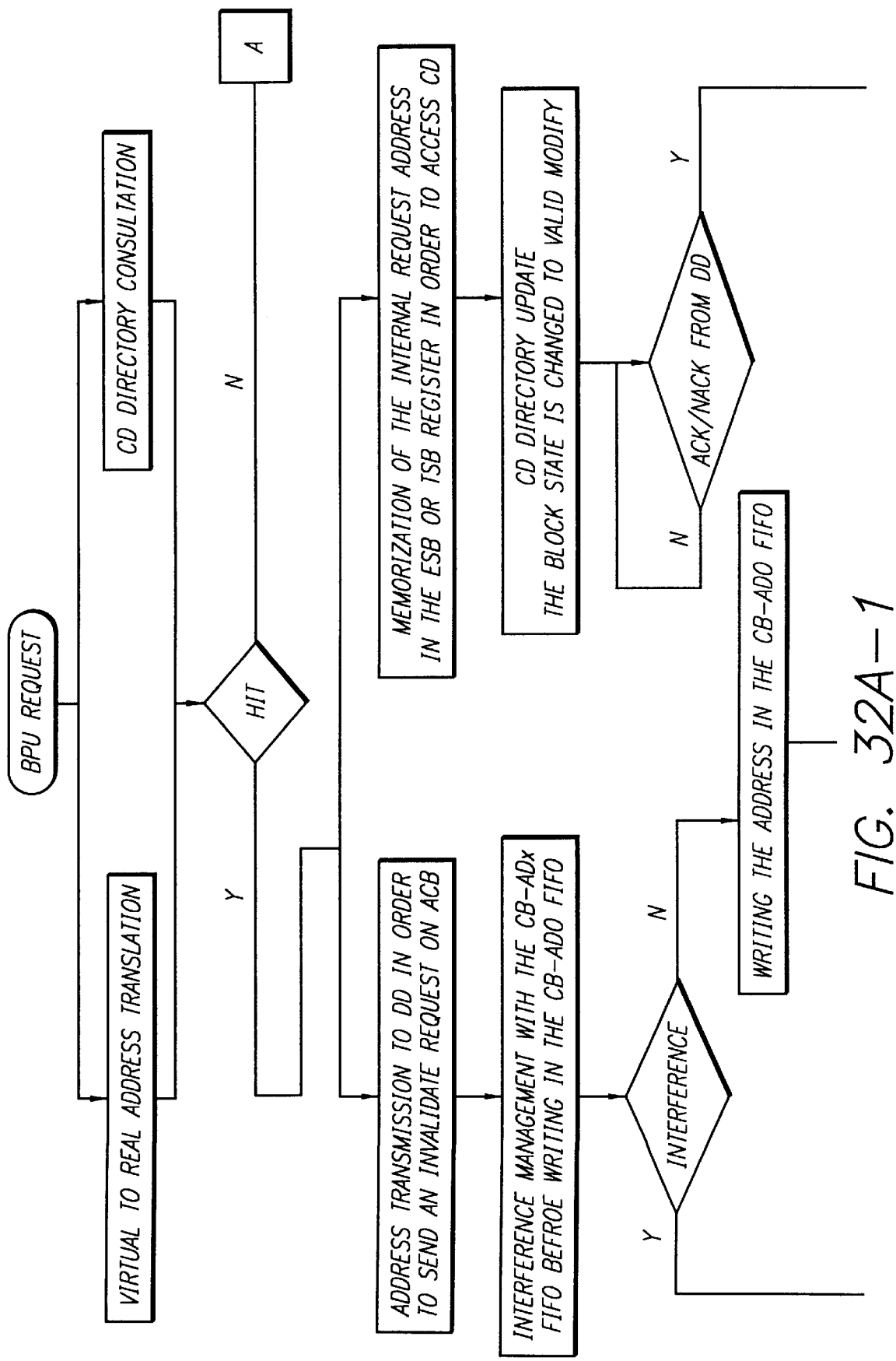
Figures 2, 32A:
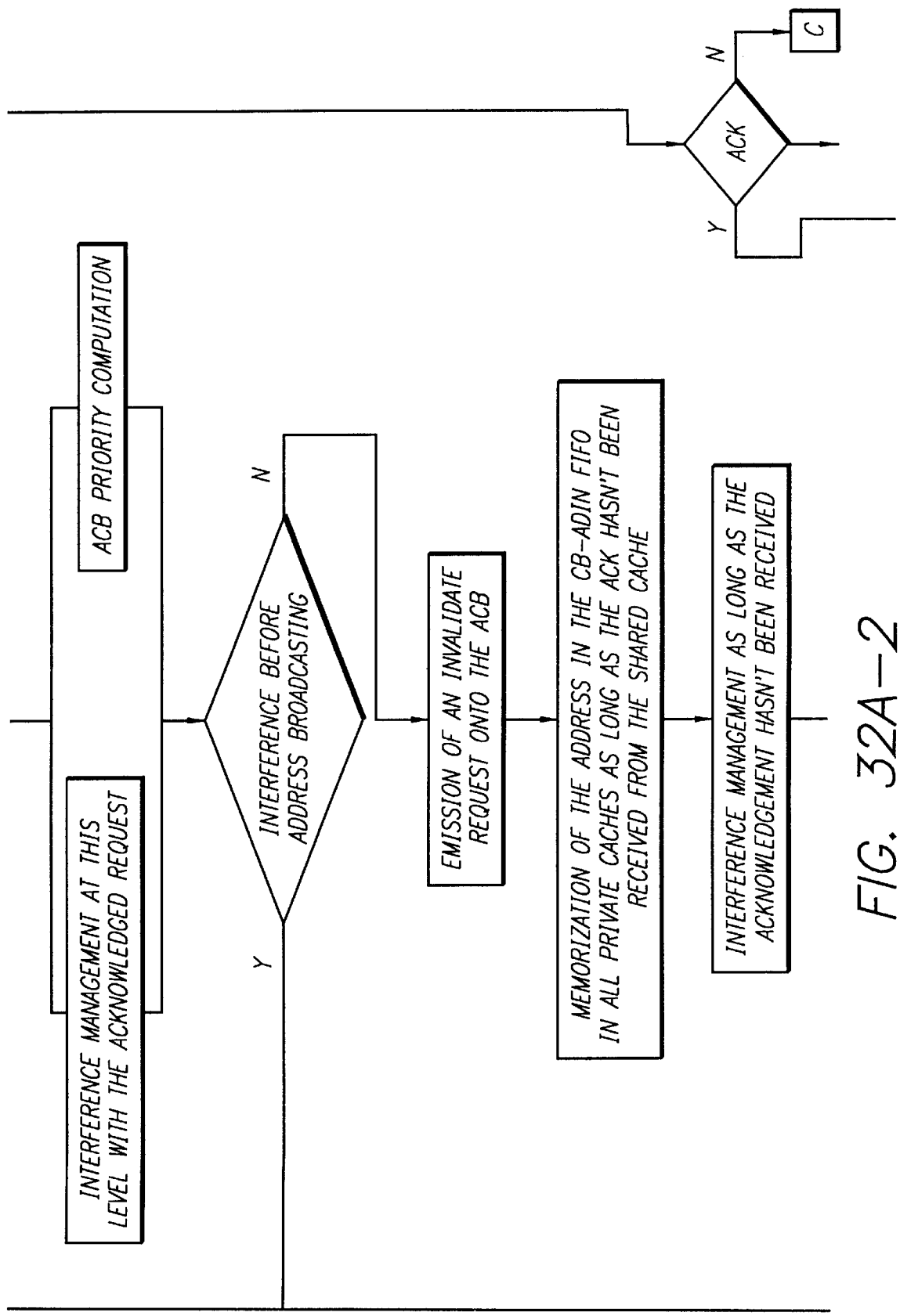
Figures 3, 32A:
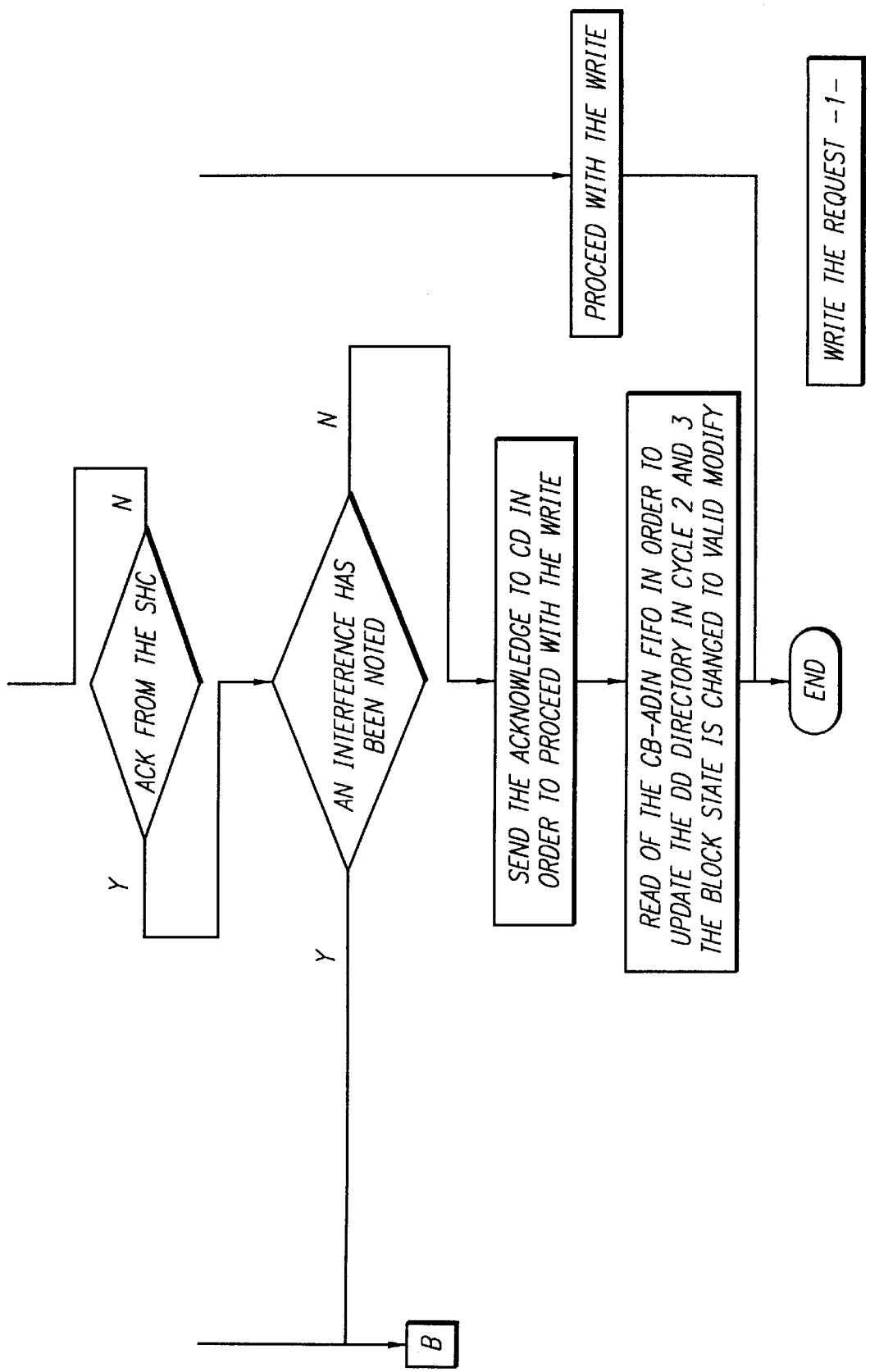
Figures 1, 32B:
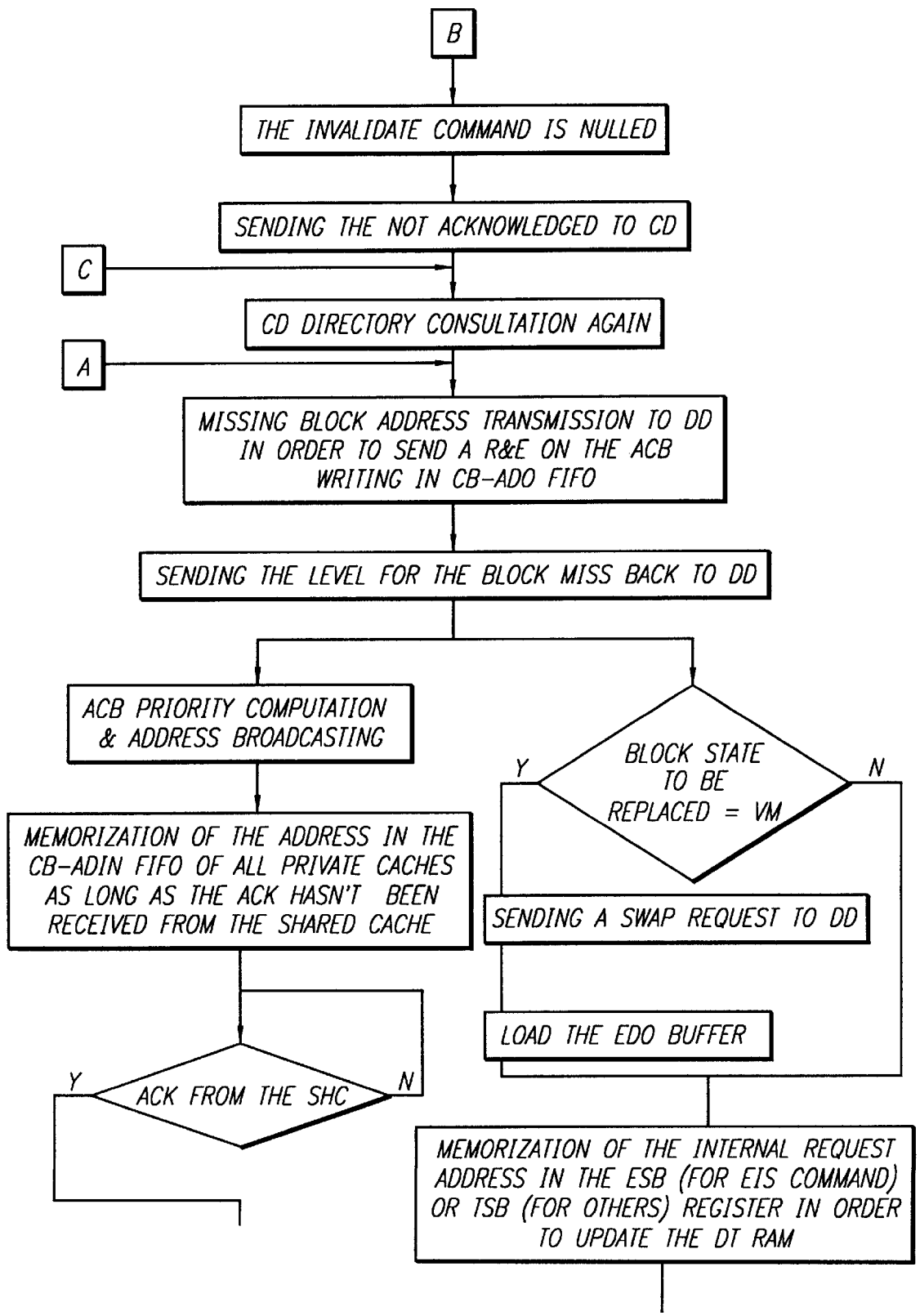
Figures 2, 32B:
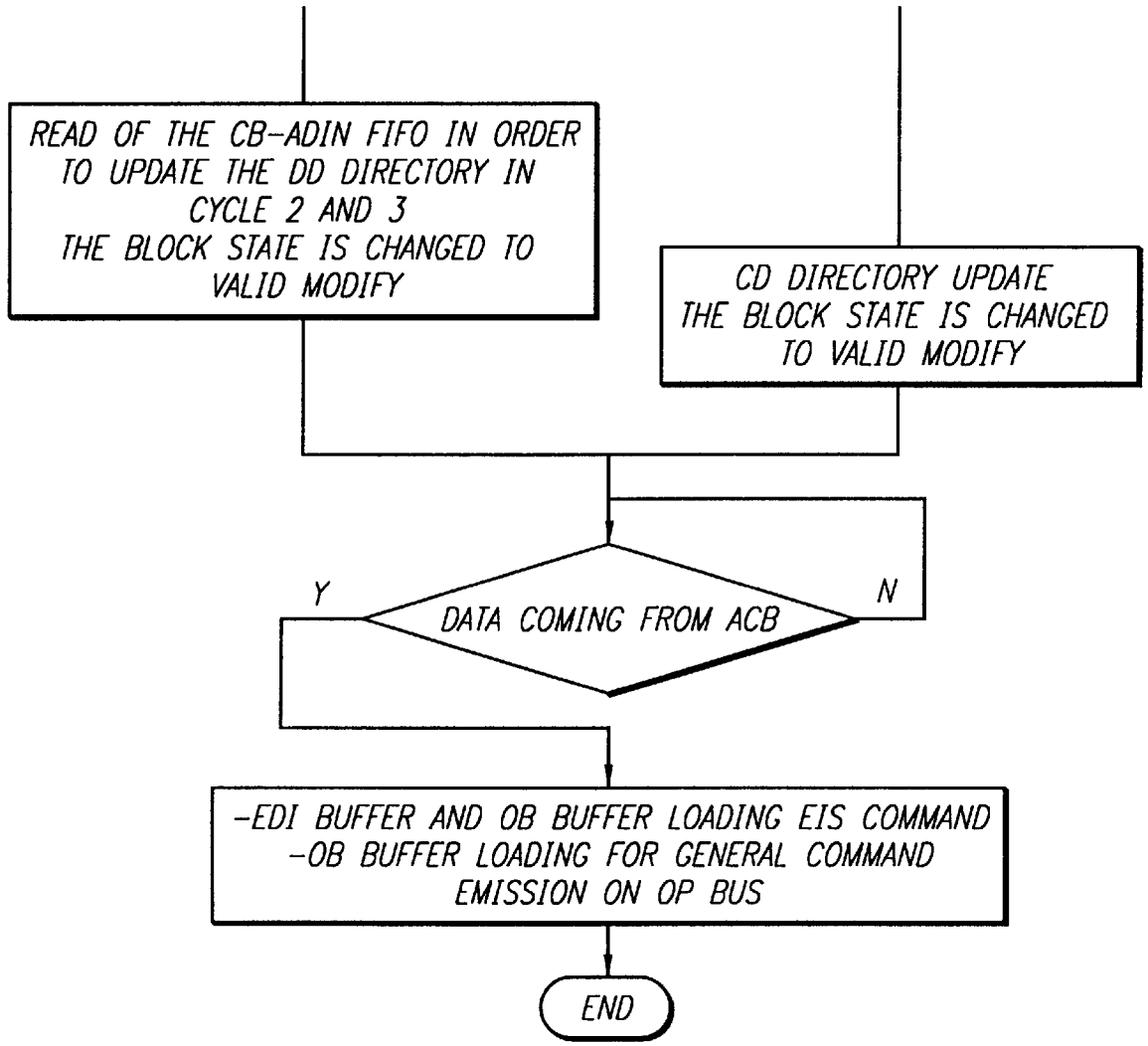
Figure 33:
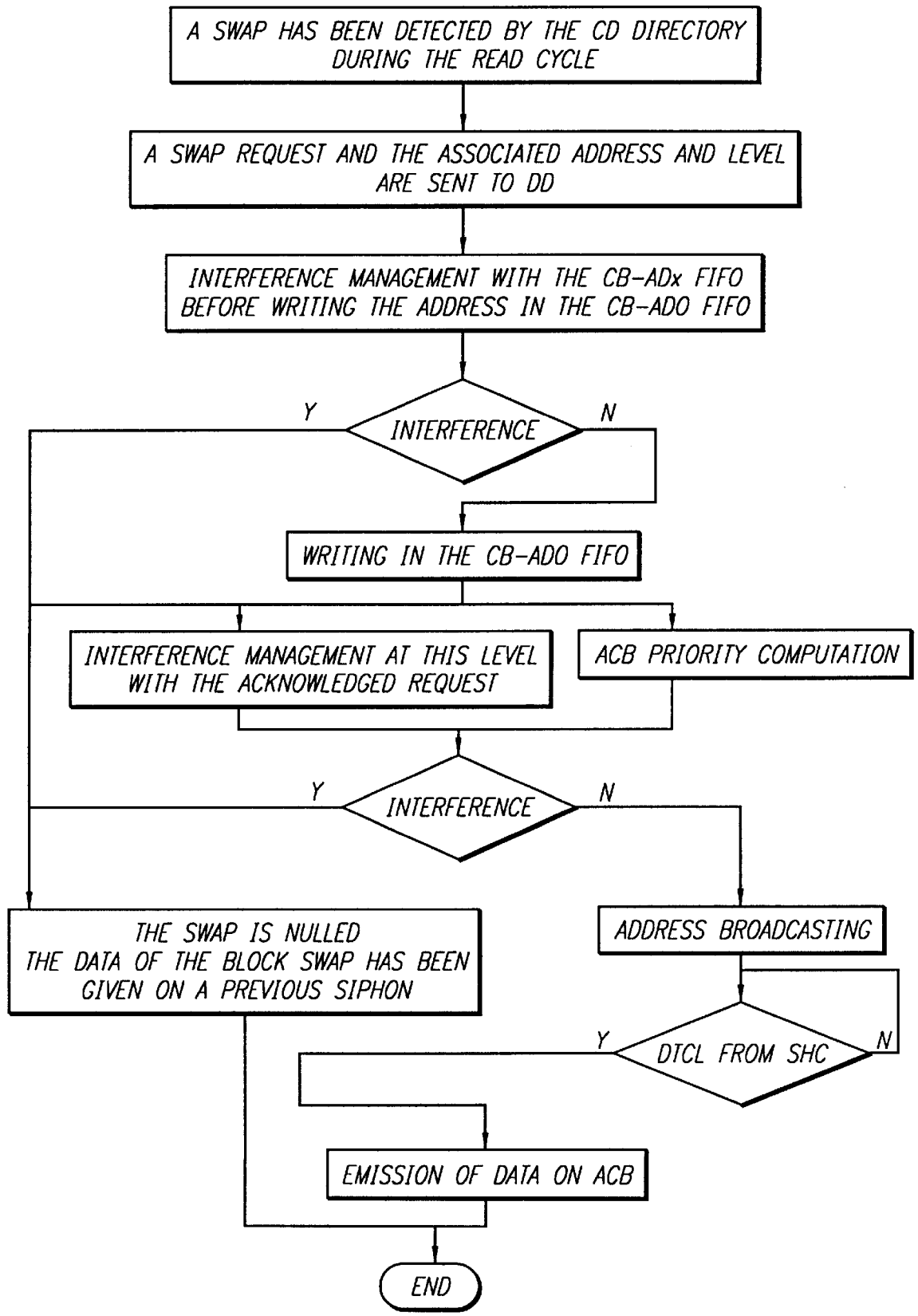

FIGS. 31, 32A/B and 33 describe the cache controller behavior on internal requests which need a directory access.

B.4.4—External Address Management

There are two types of external (as to a given CPU) requests: requests originating in the shared cache and requests originating in the private cache of another CPU on the board.

As discussed above in section B.4.3 and due to the fact that, for the private cache requests, the acknowledgment from the shared cache can be sent "n" cycles after the address is broadcast on the CPU bus, the address and command are temporarily stored into the CB-ADIN FIFO. However, an address coming from the shared cache doesn't have to be temporarily stored in the CB-ADIN FIFO to maintain the correct timing between the CB-ACKPCi and the directory update. It is sent directly to the B1-DSAD-L2 latch to be able to access the directory RAM on the next cycle.

B.4.4.1. Directory Updating

As summarized in FIG. 34, in handling external requests, the DD directory is consulted first, then, if a hit occurs, the CD directory is accessed.

B.4.4.2—Request Acknowledgement

For external requests, there are two types of acknowledgment:

one implicit acknowledgment for the requests sent by the shared cache (the directory update is done on the cycle following the transmission of the high address on the CPU bus) and one explicit acknowledgment for all the requests sent by a private cache (reception of CB_ACK).

The CPU bus acknowledgment is used to update the cache controller directories and to take into account the address temporarily stored in the CB-ADIN FIFO.

B.4.4.3. Cache Controller Behaviour on External Requests

Figures 1, 35A:
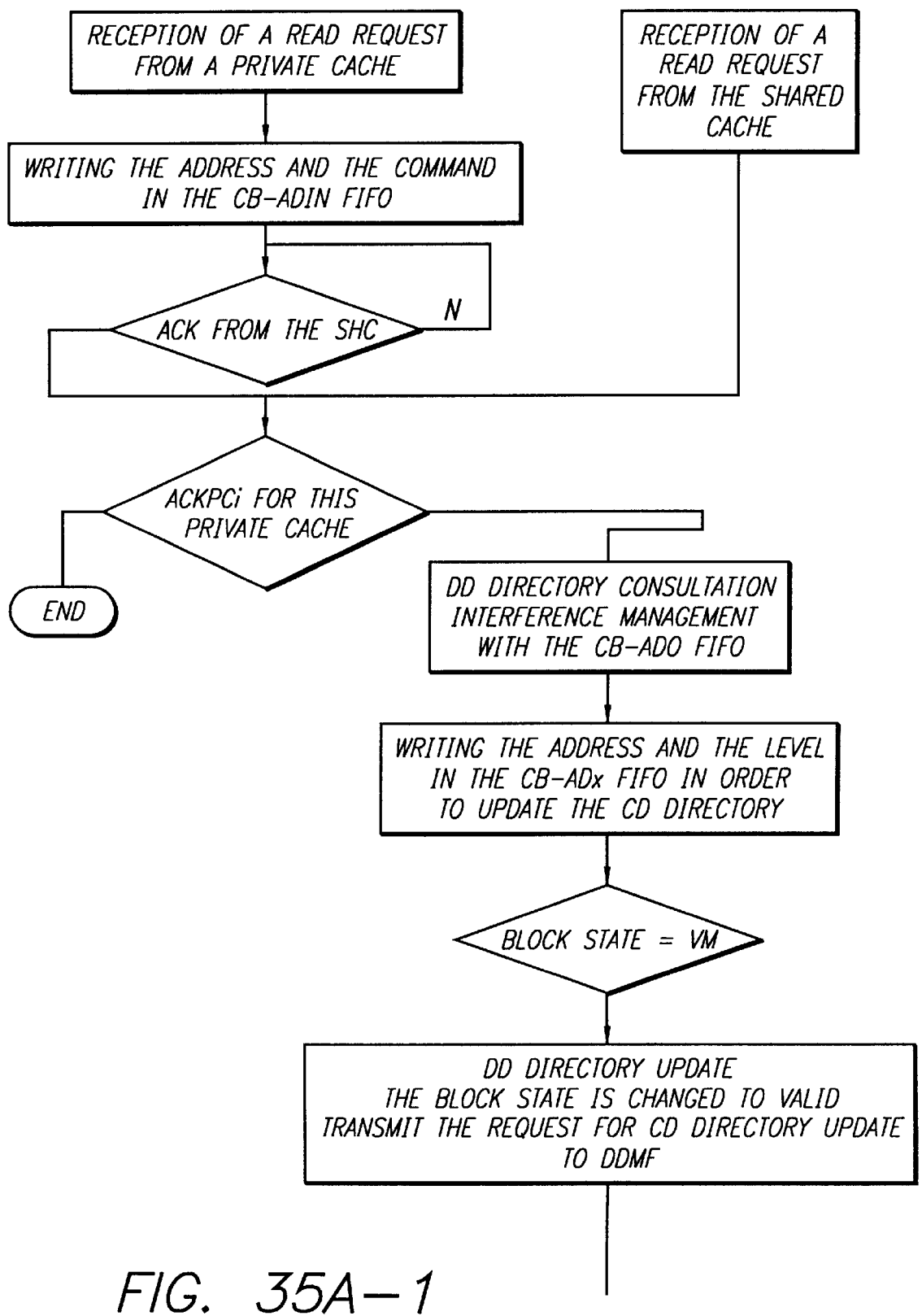
Figures 2, 35A:
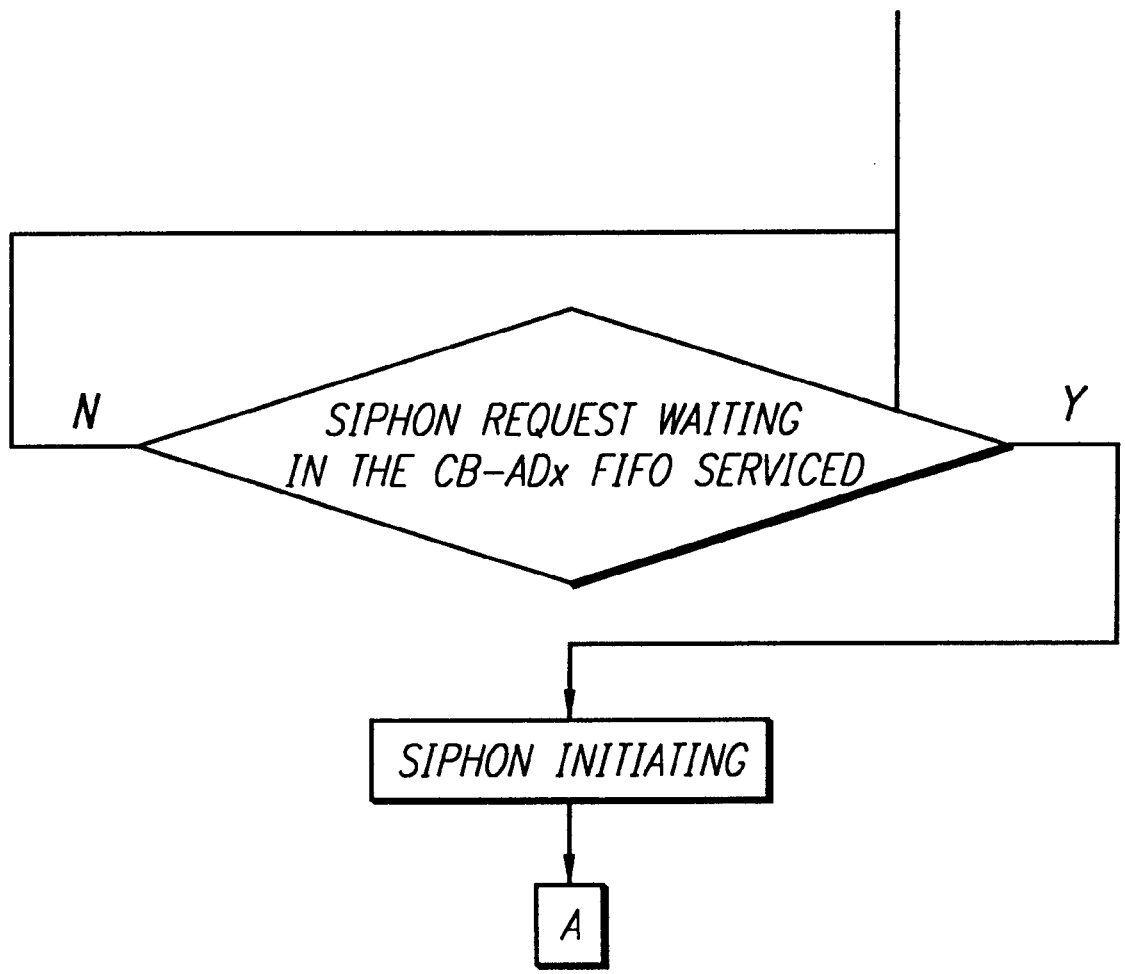
Figure 35B:
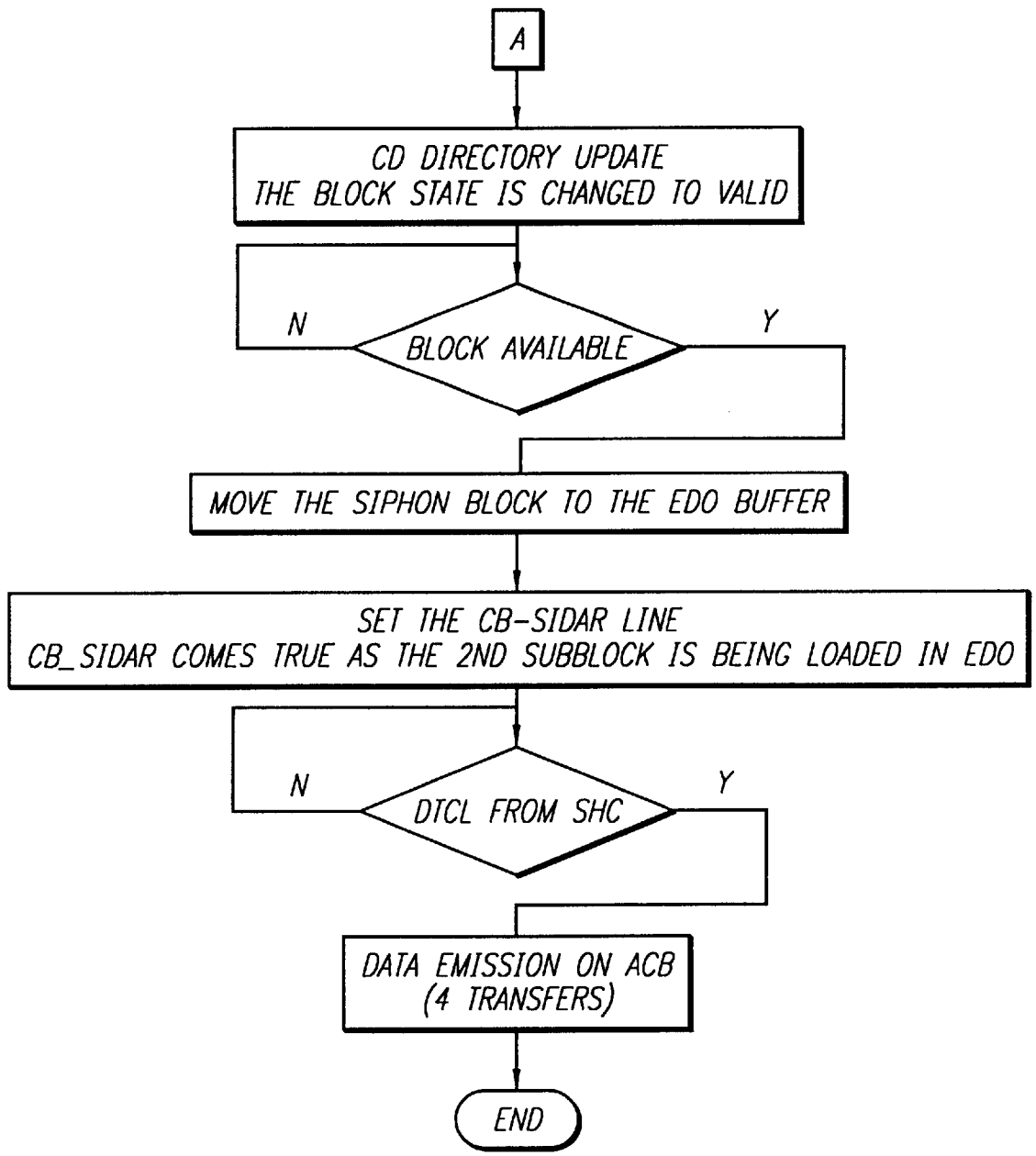
Figure 36A:
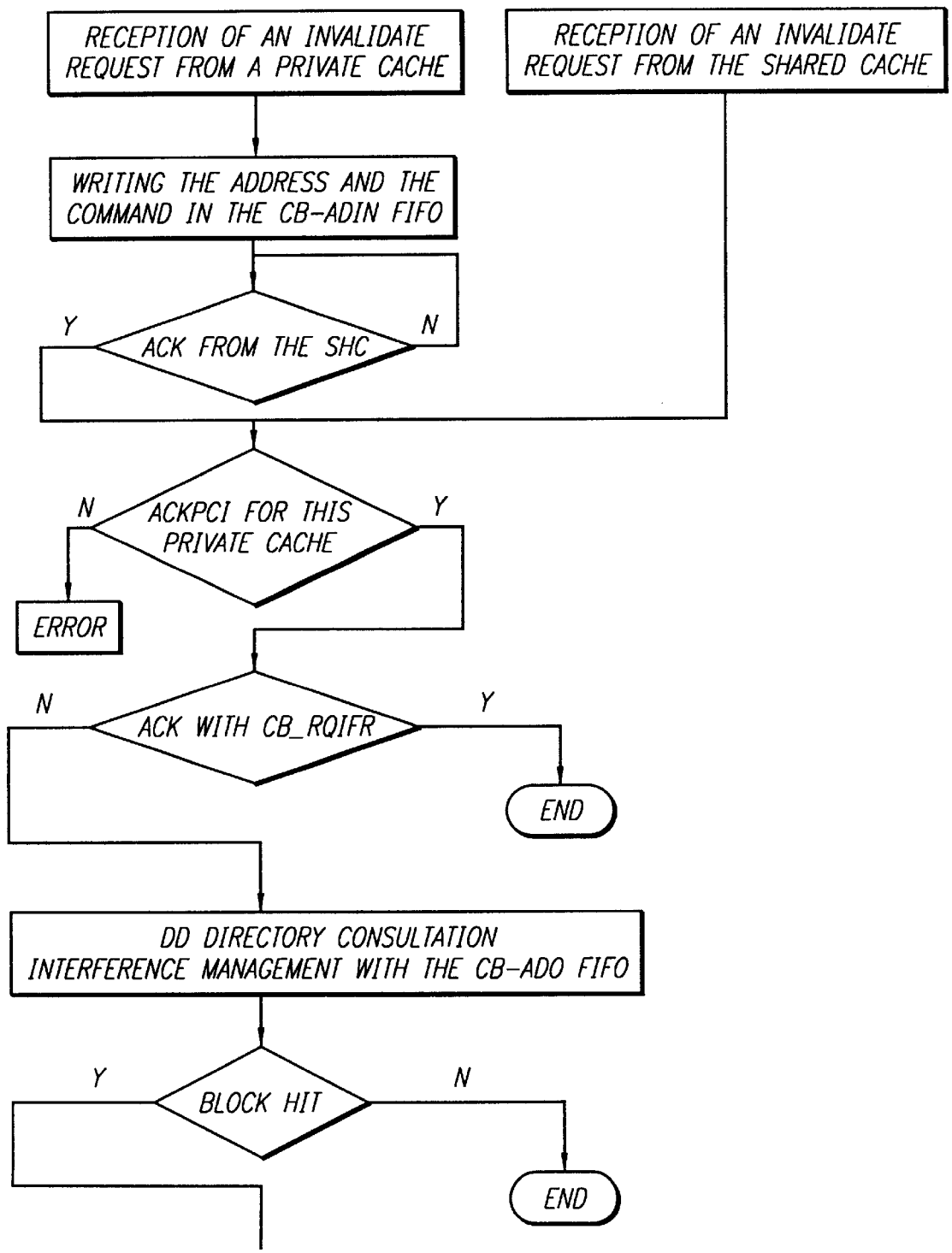
Figure 36B:
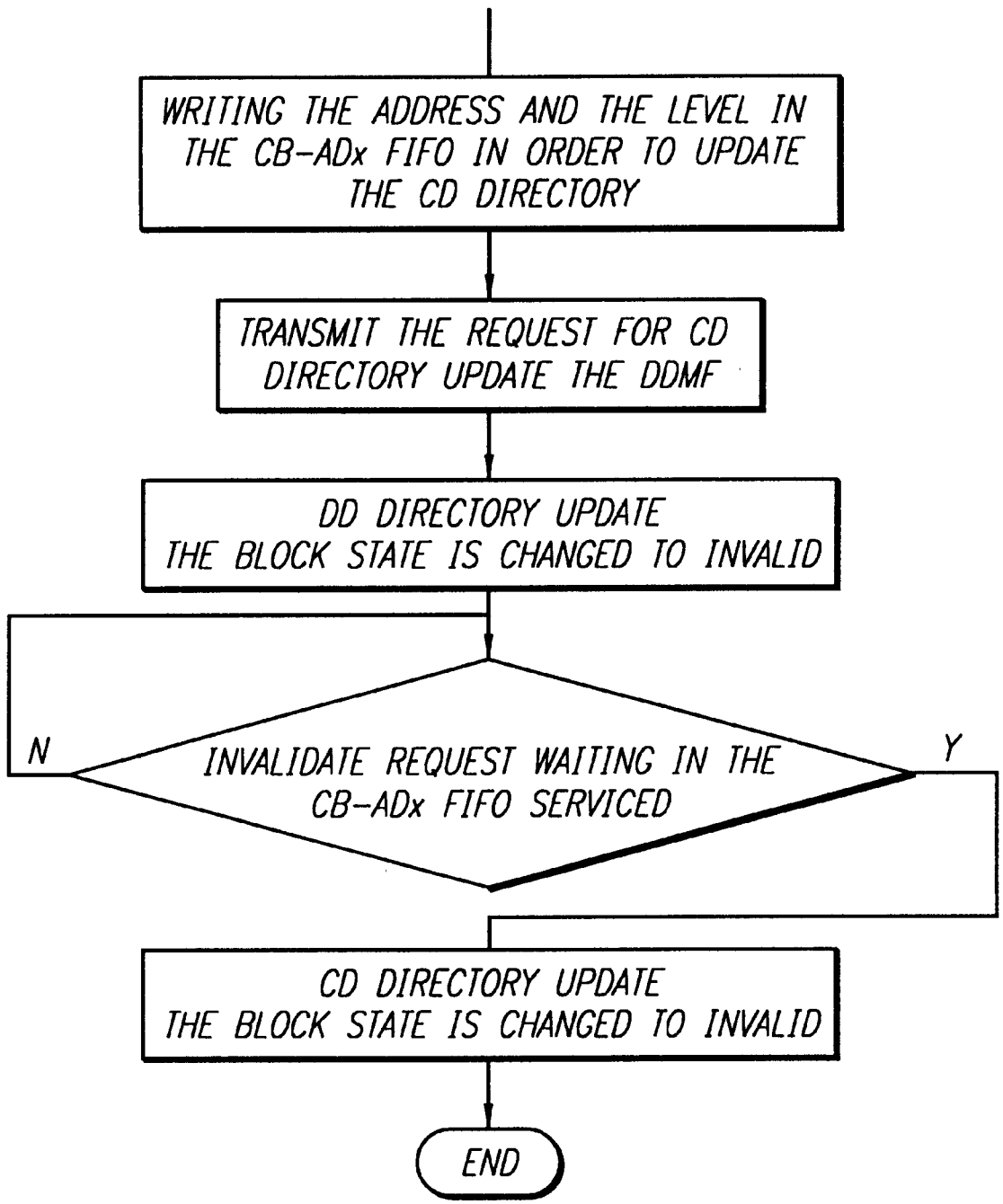
Figures 1, 37A:
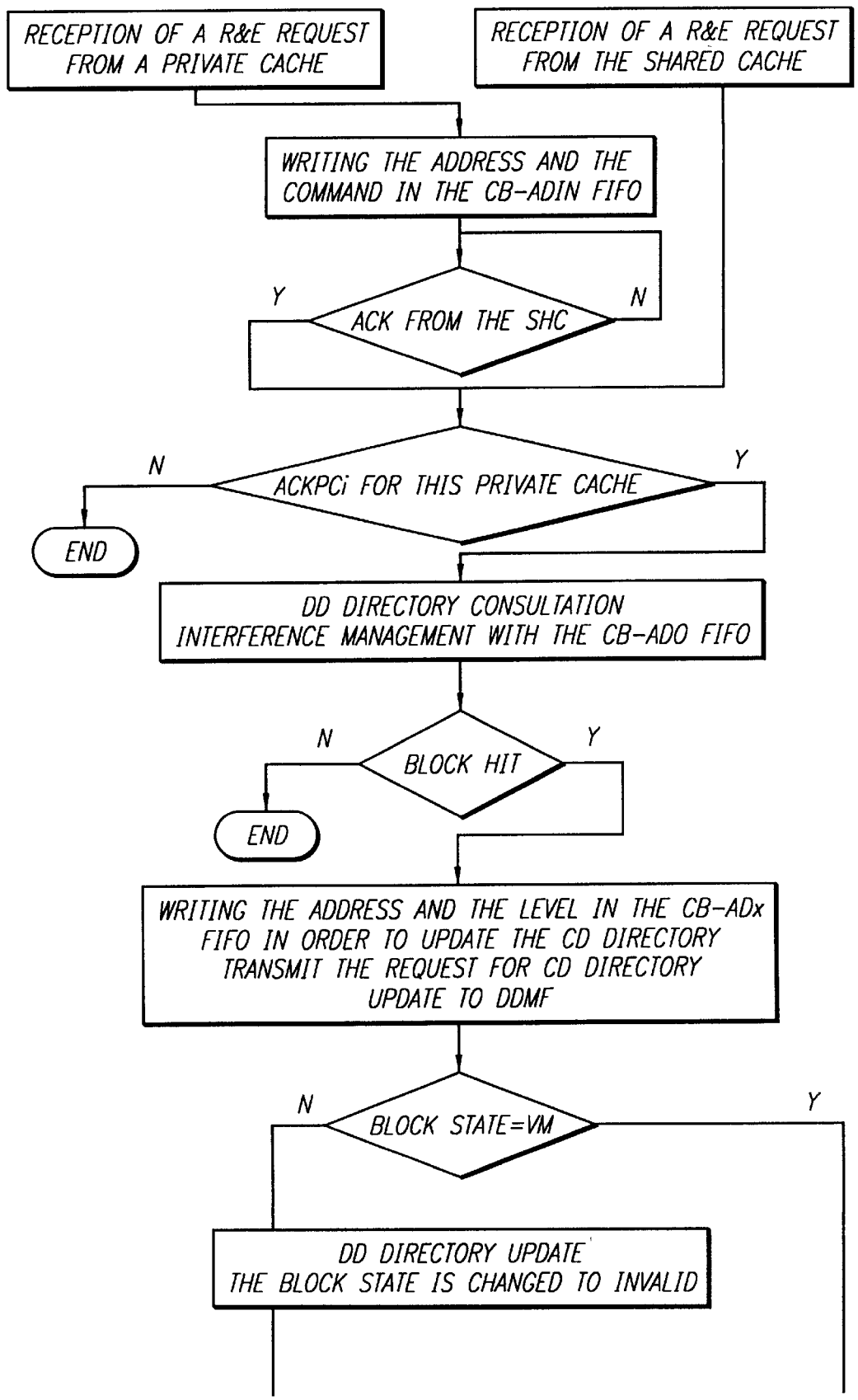
Figures 2, 37A:
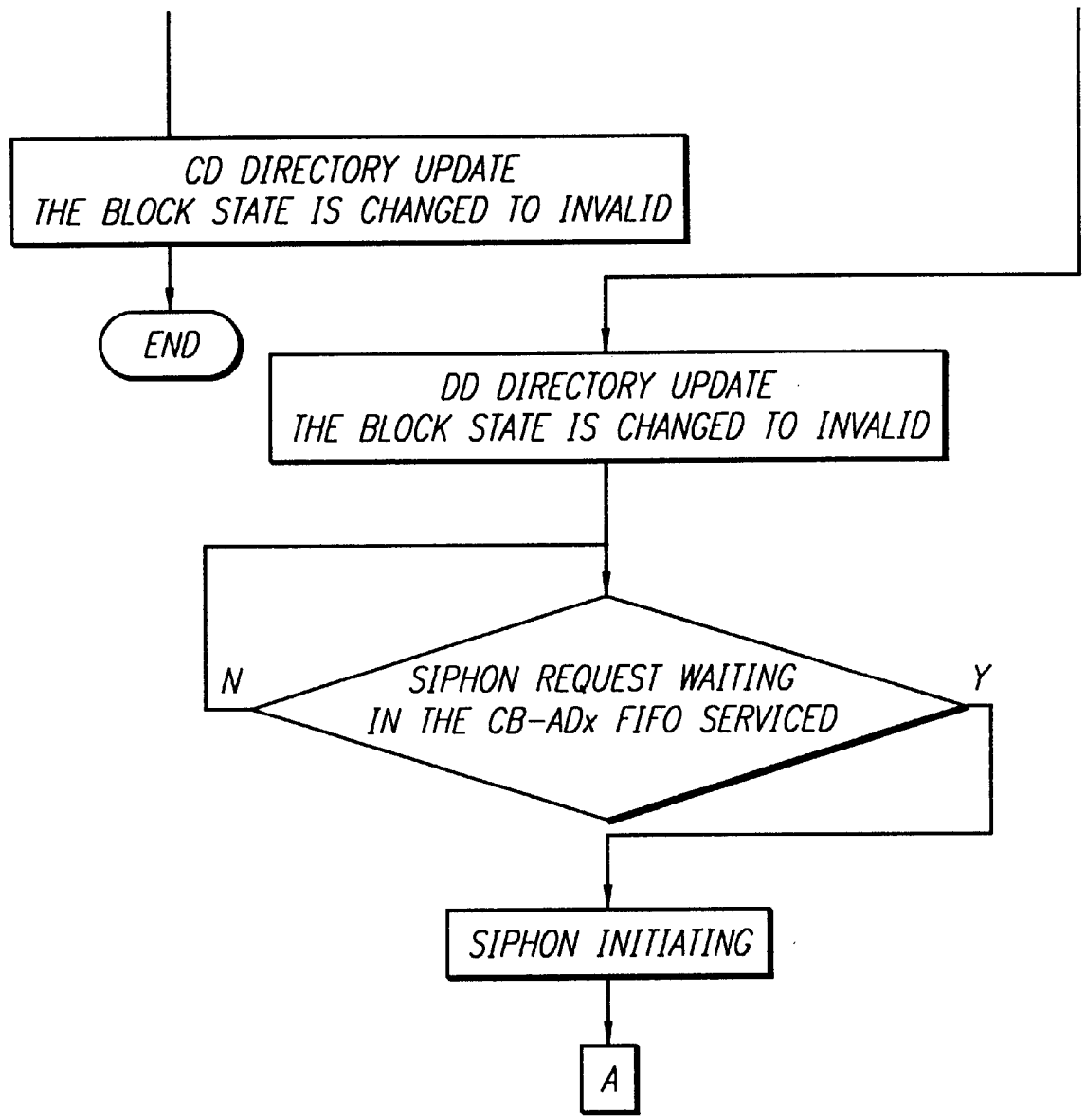
Figure 37B:
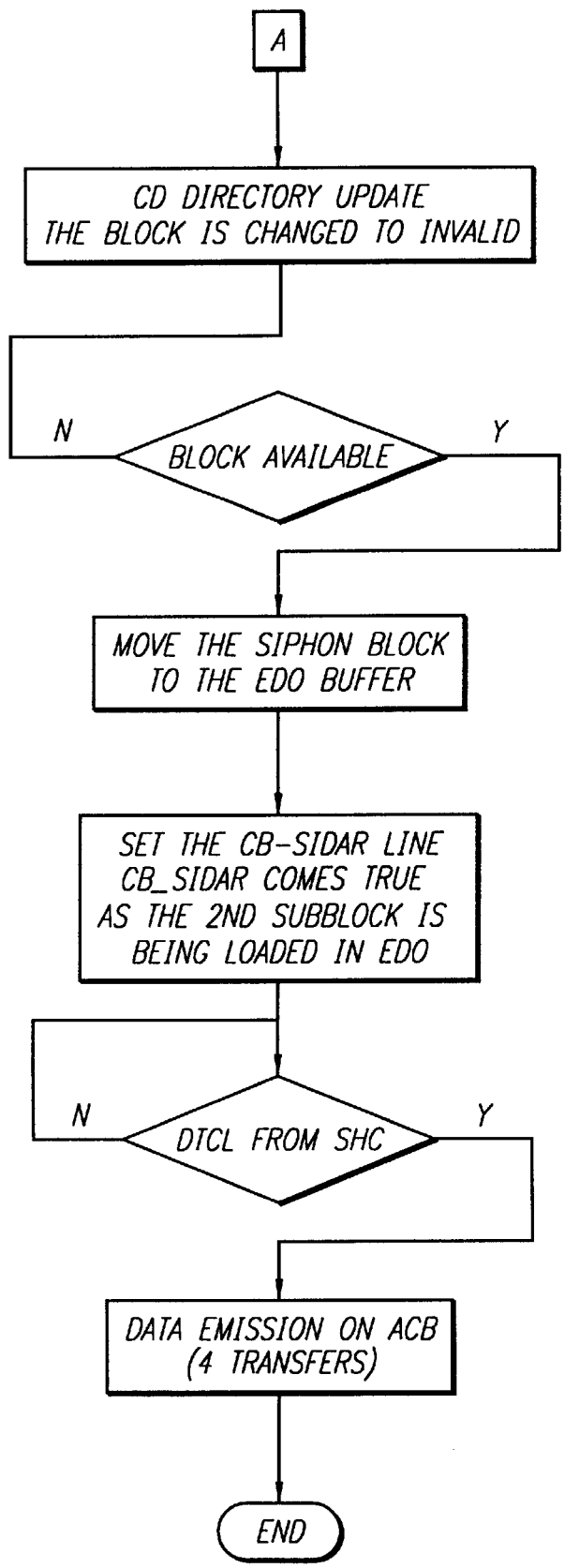

FIGS. 35A/B, 36, 37A/B describe the cache controller behavior on external requests which need a directory access: read, read-&-exclusivity, invalidate.

B.5. Coherence Conflict Management

There may be a coherence conflict (called "interference") when there are two requests not complete for the same block (one internal request and one external request). The requests that may generate coherence conflicts are invalidate and swap. The coherence conflict ceases when the internal request is acknowledged.

B.5.1. Interference on Invalidate

An internal invalidate request may be interfered by an external invalidate and an external read-&-exclusivity. If an interference is detected, the invalidate command is nulled, and the cache controller sequencer consults the CD directory again. The initial invalidate sequence is changed in a write miss (read-&-exclusivity) sequence on the second access.

B.5.2—Interference on Swap

An internal swap request may be interfered by an external read and an external read-&-exclusivity. If an interference is detected, the swap command is nulled—the request is complete. The data will be transferred only once; i.e., during the siphon procedure.

B.5.3—Boundary of Interference

Figure 38:
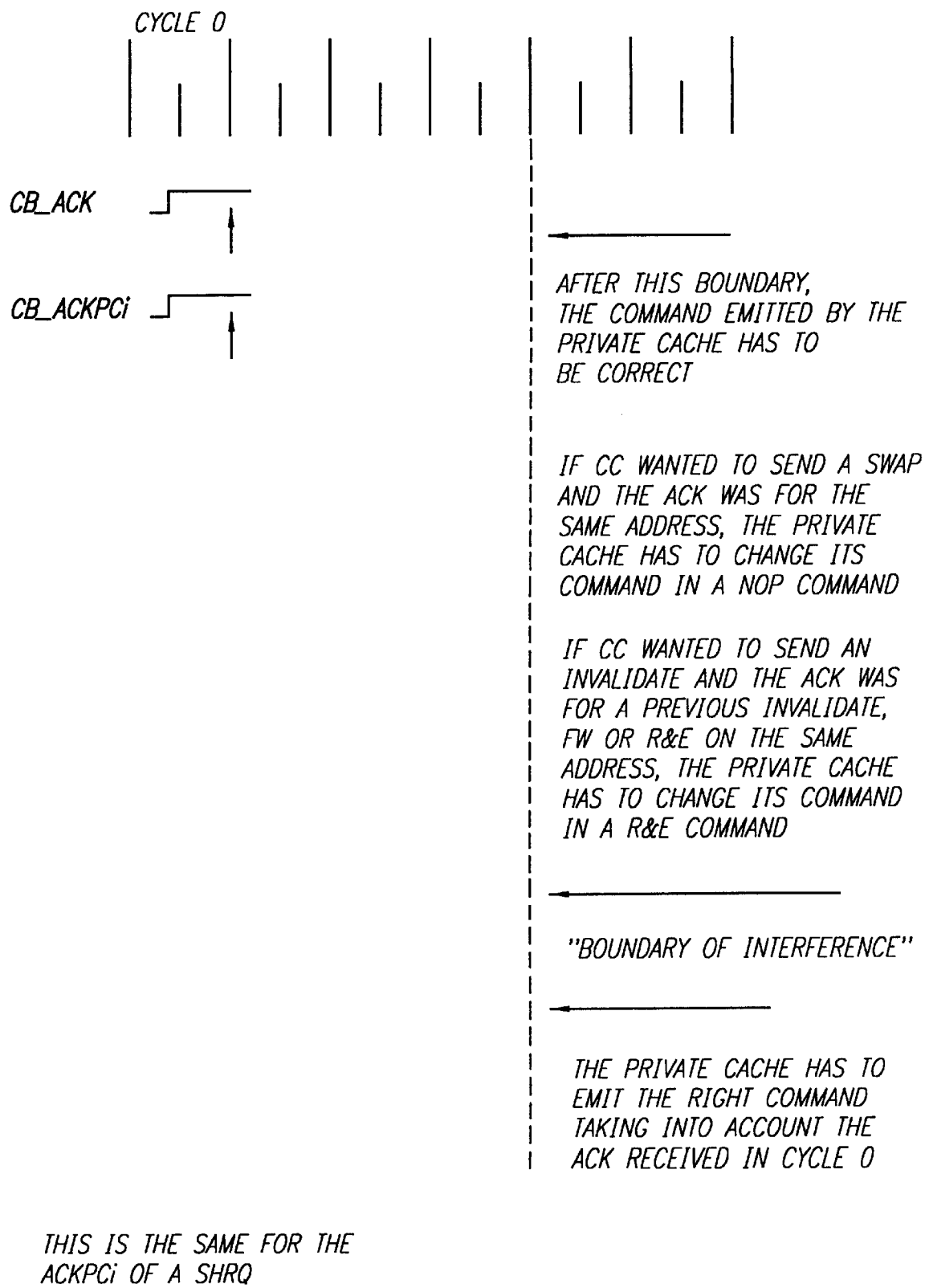

Referring to FIG. 38, three cycles after the reception of the explicit acknowledgment (CB_ACK), the cache controller guarantees it emits its request with the right command. Three cycles after the reception of the implicit acknowledgment (CB_ACKPCi) of a request from the shared cache, the cache controller guarantees it emits its request with the correct command.

B.5.4. Null Command

Figure 39:
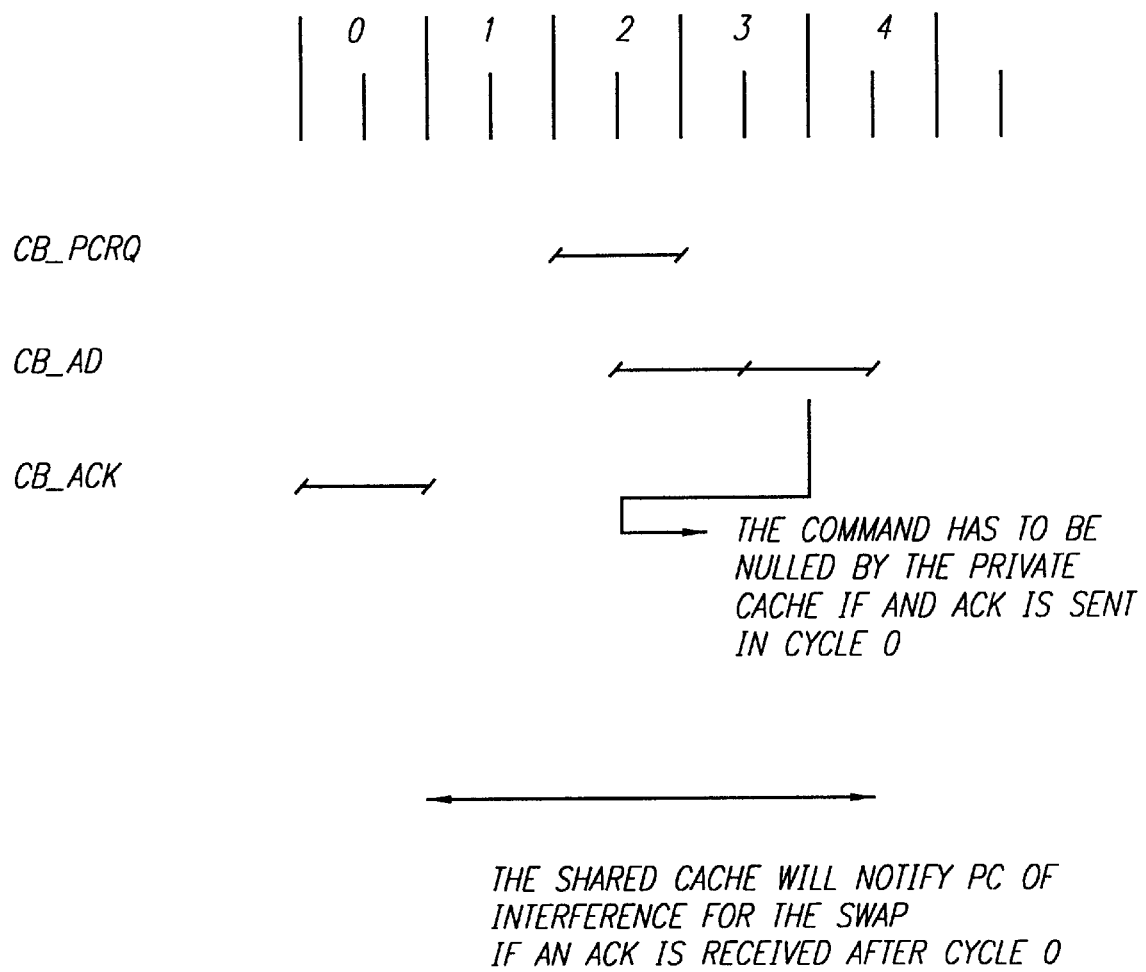

The cache controller has to null the command on any acknowledgment received two cycles before the broadcast of an address. If the acknowledgment is sent later, the shared cache will null the command and will acknowledge the emitter with the signal CB_RQIFR set. Attention is directed to FIG. 39.

B.5.5—Cache Controller Interference Management

The interferences are detected at two levels in order to send the correct command to the shared cache:

first, when a request is written into the CB-ADO FIFO (comparators on CB-ADx FIFO); (in FIG. 3, this corresponds to the buffer 32 and buffer 36 compared by comparator 33) and then, when an external request is acknowledged (comparators on CB-ADO FIFO); (in FIG. 3, this corresponds to the buffer 32 and buffer 35 compared by comparator 34).

B.5.5.1—Comparators on CB-ADx FIFO

To detect an interference, a comparison has to be performed (corresponding to comparator 34 in FIG. 3) between the address in the CB-ADOx register bank (corresponding to buffer 32 in FIG. 3) CD wants to send on the CPU bus and the address present in the CB-ADx FIFO (corresponding to buffer 36 in FIG. 3). Indeed, the content of the CD and DD directories is not always the same, and the difference is saved in the CB-ADx FIFO.

If CD wants to send an invalidate onto the CPU bus, and an equality has been found between this request and another invalidate or read-&-exclusivity waiting for CD update in the CB-ADx FIFO, the invalidate must be nulled. This comparison is done, when writing the CB-ADOx register bank, between the address in the CB-ADOMX2-L2 latch and the sixteen addresses temporarily stored in the CB-ADx FIFO. Then, the request written in the CB-ADOx FIFO is validated or not according to the result of the comparison.

B.5.5.2—Comparators on CB-ADOx FIFO

To detect the other interferences and to be able to send the correct command to the shared cache, a comparison (corresponding to the comparator 33 in FIG. 3) has also to be carried out between the address which is acknowledged (i.e., stored in the CBADx FIFO, corresponding to the FIFO 36 in FIG. 3) and the addresses which are waiting for emission on the CPU bus in the CB-ADOx FIFO or waiting for acknowledgment.

B.5.5.3—CB_RQIFR Signal from the Shared Cache

Once the request has been sent onto the CPU bus, the cache controller takes the CB_RQIFR signal from the shared cache into account to determine if its request has been interfered. This signal indicates that the shared cache has computed the request as a NOP. This line is valid with CB_ACK and means that no directory updating has to be carried out.

B.5.5.4—ACK/NACK from DD to CD

The ack/nack network in DD takes into account:

a possible interference between the address CD wants to send on the CPU bus and the addresses waiting for a CD update in the CB-ADx FIFO, a possible interference between an acknowledged request and the address waiting for the CPU bus in the CB-ADOx FIFO, and the CB_RQIFR signal from the shared cache.

If the DD sends a nack signal to CD, the cache controller sequencer then consults CD again and this should lead to the write miss sequence (read-&-exclusive).

B.5.5.5—External Read Request on a Block Swap

Figure 40A:
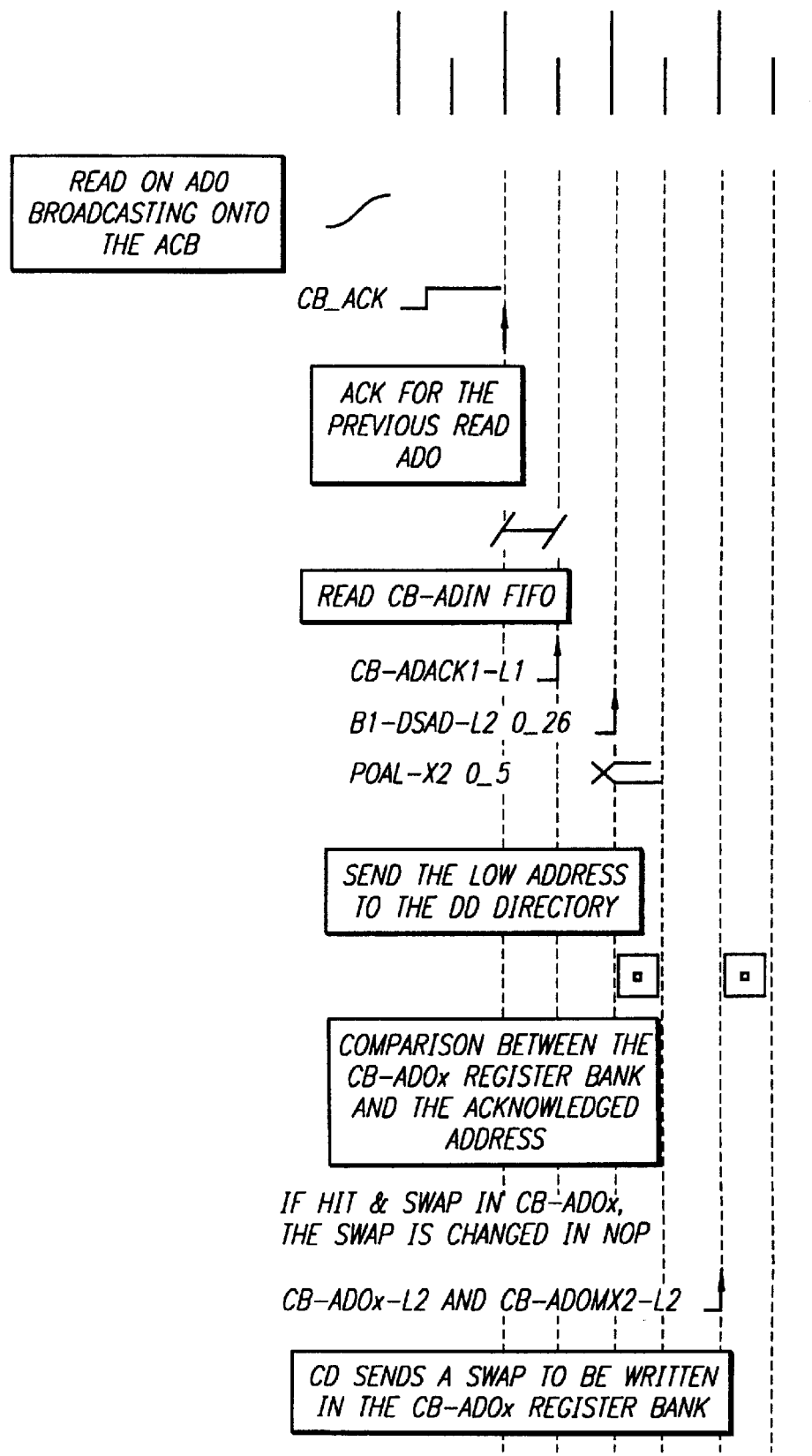
FIGS. 40A–40B, taken together, constitute a chronogram of an external read request on a block swap.
Figure 40B:
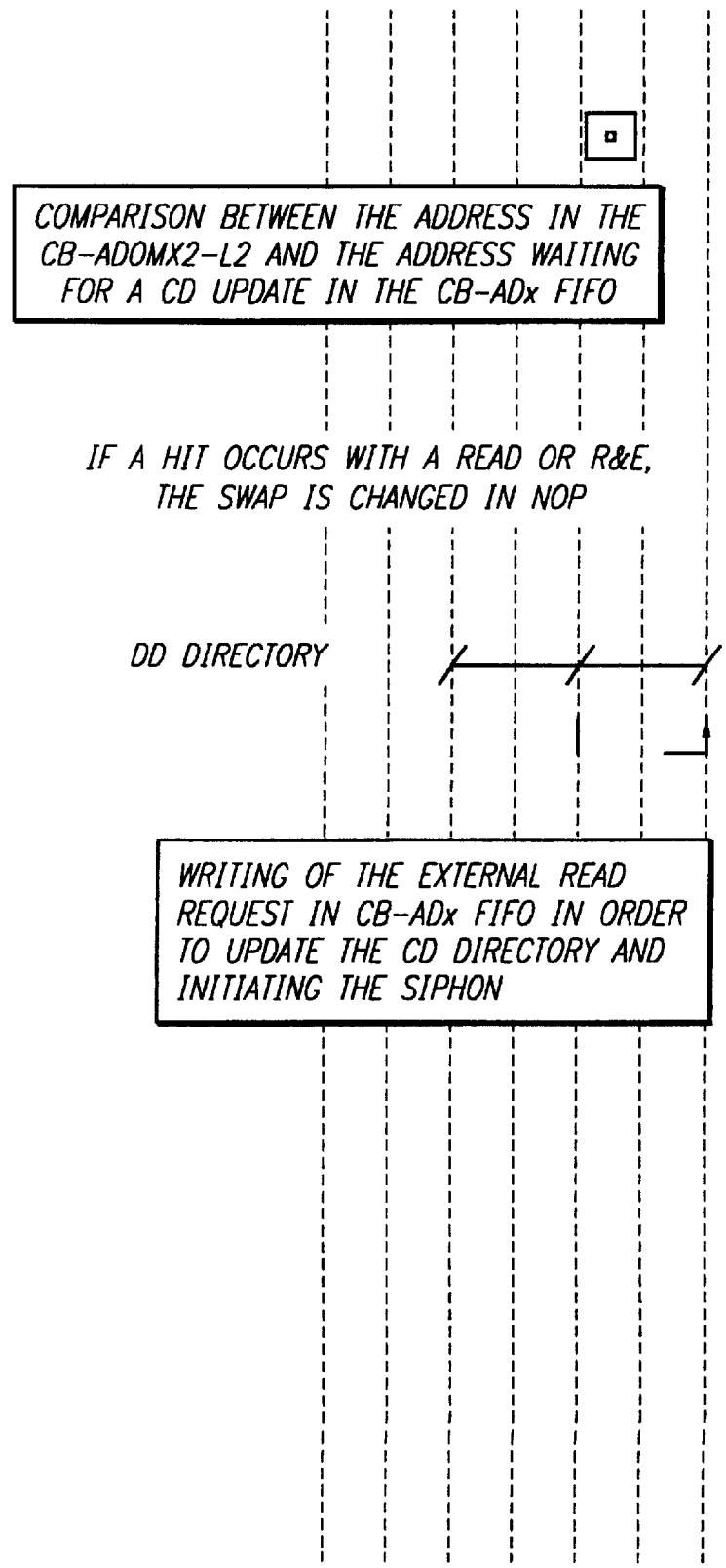

A chronogram is given in FIG. 40.

C. CPU BUS DATA MANAGEMENT

C.1—Data Transfer on CPU Bus

Except for the read register or the write register operations which manage 16 bytes, all the memory operations on the CPU bus are on 64 byte blocks. 16 bytes are transferred every cycle on the CPU bus such that, for a given block, the data exchanges are split into four transfers of 16 bytes each.

On the CPU bus, data is not necessarily delivered in the same order as requests have been issued; i.e., for a 64 byte block, the four transfers may not and need not be consecutive. For instance, two blocks requested by the same CPU may be served multiplexed. However, when data blocks are delivered by a CPU (swap request or siphon), these blocks are not mixed themselves. The four data transfers of a swapped or siphoned block will not be mixed with the data transfers of another swapped or siphoned block, but they can be interrupted by data transfer from the shared cache.

Two signals per private cache (CB_DTCL0 i:1 and CB_DTCL1 i:1), sent by the shared cache, identify the type of data transfer which will take place on the next CPU bus cycle and are used to select which buffer in the cache memory unit is affected by the transfer.

DTCL coding is shown in FIG. 41. The CB_DTLB is sent with the CB_DTCL0 i:1 and CB_DTCL1 i:1 to identify which request is affected by the transfer.

When the shared cache sends data to a private cache, the address acknowledgment may be sent after, during or before the data transfer of the request. In the case of a swap command, the acknowledgment appears at least three cycles before the first data transfer. In the case of a write register command, data are always transferred before the acknowledgment.

C.2—Data Transfer Timing

FIG. 42 shows a data transfer of a block; the four cycles may be split.

C.3—Buffers Interfacing With the CPU Bus

There are three types of buffers which interface with the CPU bus:

the EDI buffer (external data input buffer):
one EDI buffer of 64 bytes, used to load the data coming from the CPU bus for EIS commands;

the OB buffers (operand buffers):
two operand buffers of 64 bytes, used to load the data coming from the CPU bus (these buffers are also used to perform operand read or write transfers over the operand or result bus, and they can be used as four independent buffers of 32 bytes each;

the EDO buffers (external data output buffers):
three EDO buffers of 64 bytes, used to send data to the CPU bus (two swap buffers and one siphon buffer).

When the cache controller receives the DTCL0 and DTCL1 signals, it selects which type of buffer is concerned:

DTCL=01, data reception (EDI or OB),

DTCL=10, data emission for a swap (EDO0 or EDO1):
In this case, the choice is done with the CB_DTLB signal:

If DTLB=0, EDO0 is selected and
If DTLB=1, EDO1 is selected;

DTCL=11, data emission for a siphon (EDO2):
If the siphon has interfered a swap, the buffer for the siphon can be EDO0 or EDO1.

This information is sent to the cache memory through the B-SLB 0_5 lines.

The cache controller has to select the number of the 16 byte sub-block which is concerned by the DTCL. This information is sent to the cache memory unit through the B_EDOi_QAD_T2N 0:2 lines. (i=0, 1 and 2 for the three EDO buffers). These signals are sent one clock phase before the B_SLB_lines.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A computer system comprising:
    A) a group of central processor units;
    B) a private cache module included with each said central processor unit in said group, each said private cache module communicating bilaterally with its central processor unit to receive requests for instruction and operand information blocks and for servicing such requests;
    C) a CPU bus coupled to all said private cache modules in said group for bilateral communication therewith of address and control signals and information blocks;
    D) a shared cache unit coupled to said CPU bus for bilateral communication therewith of address and control signals and information blocks;
    E) each said private cache module including a cache memory and a cache controller, said cache controller comprising:
        1) a processor directory for storing identification words for corresponding information blocks resident in said cache memory, each identification word including a status field indicating a current authority of the one central processor unit with which said private cache module is included to modify the corresponding information block and the validity thereof, a first value in the status field indicating that said one central processing unit has a valid copy of, but does not have authority to modify, the corresponding information block and a second value in the status field indicating that said one central processing unit has a valid copy of, and does have authority to modify, the corresponding information block;
        2) a command/address output buffer;
        3) write permission request processing means responsive to said one central processing unit seeking to modify a given block of information resident in its said private cache memory for which the identification word therefor in said processor directory contains the first value in the status field by:
            a) changing, in said processor directory, the status field of the identification word for the given block of information to the second value;
            b) placing the identification word for the given block of information into said command/address output buffer; and c) placing an invalidate command into said command/address output buffer to specify, in conjunction with the identification word, a write permission request;

4) a command/address input buffer;

5) means for copying all write permission requests from all said central processor units in said group placed onto said CPU bus into said command/address input buffer;

6) a first comparator for comparing the identification words in said command/address output buffer with the identification words in said command/address input buffer;

7) abort means, responsive to said first comparator ascertaining that an identification word in said command/address output buffer and an identification word in said command/address input buffer identify the same block of information, for aborting the write permission request in said command/address output buffer; and 8) means for sending, if the write permission request is not aborted, the identification word and invalidate command from said command/address output buffer onto said CPU bus.

2. The computer system of claim 1 in which said cache controller further includes:

A) a bus directory;

B) a command/address transfer buffer;

C) means for sending identification words, with the status field set to a third value, from said command/address input buffer for selective transfer into said bus directory to update the contents thereof;

D) means for selectively sending identification words from said bus directory to said command/address transfer buffer; and E) a second comparator for comparing identification words in said command/address output buffer with the identification words in said command/address transfer buffer, said abort means responding to said second comparator ascertaining that an identification word in said command/address output buffer and an identification word in said command/address transfer buffer identify the same block of information by aborting the write permission request in said command/address output buffer.

3. The computer system of claim 1 in which said abort means is further responsive to said first comparator ascertaining that an identification word in said command/address output buffer and an identification word in said command/address input buffer identify the same block of information by directing the change of the status field in the identification word therefor transferred to said bus directory to a third value which indicates that said one central processing unit does not have a valid copy of the block of information.

4. The computer system of claim 2 in which said abort means is further responsive to said second comparator ascertaining that an identification word in said command/address output buffer and an identification word in said command/address transfer buffer identify the same block of information by directing the change of the status field in the identification word therefor transferred to said processor directory to a third value which indicates that said one central processing unit does not have a valid copy of the block of information.

5. In a computer system comprising: a group of central processor units; a private cache module included with each central processor unit in the group, each private cache module communicating bilaterally with its central processor unit to receive requests for instruction and operand information blocks and for servicing such requests; a CPU bus coupled to all the private cache modules in the group for bilateral communication therewith of address and control signals and information blocks; a shared cache unit coupled to the CPU bus for bilateral communication therewith of address and control signals and information blocks; each private cache module including a cache memory and a cache controller, the cache controller comprising: a processor directory for storing identification words for corresponding information blocks resident in the cache memory, each identification word including a status field indicating a current authority of the one central processor unit with which the private cache module is included to modify the corresponding information block and the validity thereof, a first value in the status field indicating that the one central processing unit has a valid copy of, but does not have authority to modify, the corresponding information block, and a second value in the status field indicating that the one central processing unit has a valid copy of, and does have authority to modify, the corresponding information block; a method of servicing requests of the one central processing unit to obtain write permission on a given block of information stored in the cache memory and having an identification word with the status field set to the first value, the method including the steps of:

A) changing, in the processor directory, the status field of the identification word for the given block of information to the second value;

B) placing the identification word for the given block of information into a command/address output buffer;

C) placing an invalidate command into the command/address output buffer to specify, in conjunction with the identification word, a write permission request on the given block of information;

D) copying all requests placed onto the CPU bus to obtain write permission on blocks of information from all central processor units in the group into a command/address input buffer;

E) comparing the requests for write permission in the command/address output buffer with the requests for write permission present in the command/address input buffer;

F) responding to a determination that a request for write permission in the command/address output buffer and a request for write permission in the command/address input buffer identify the same block of information by aborting the request for the same block of information in the command/address output buffer; and G) responding to a determination that no request for write permission in the command/address output buffer identifies the same block of information as any request for write permission in the command/address input buffer by selectively sending each request to obtain write permission on a block of information out from the command/address output buffer onto the CPU bus.

6. The method of claim 5 in which the computer system further comprises a bus directory and a command/address transfer buffer and in which the method further includes the steps of:

A) selectively sending information from the command/address input buffer for transfer into the bus directory to update the contents thereof;

B) selectively sending information from the bus directory to the command/address transfer buffer;

C) comparing the requests for write permission in the command/address output buffer with the requests for write permission present in the command/address input transfer; and D) responding to a determination that that a request for write permission in the command/address output buffer and a request for write permission in the command/address transfer buffer identify the same block of information by aborting the request for the same block of information in the command/address output buffer.

7. The method of claim 5 which further includes the step of further responding to ascertaining that a request for write permission in the command/address output buffer and a request for write permission in the command/address input buffer identify the same block of information by directing the change of the status field in the identification word therefor in the processor directory from the second value to a third value which indicates that the central processing unit does not have a valid copy of the block of information.

8. The method of claim 6 which further includes the step of further responding to ascertaining that a request for write permission in the command/address output buffer and a request for write permission in the command/address transfer buffer identify the same block of information by directing the change of the status field in the identification word therefor in the processor directory from the second value to a third value which indicates that the central processing unit does not have a valid copy of the block of information.

9. The method of claim 7 which further includes the step of changing the command in the control/address output register from invalidate to no operation and subsequently broadcasting onto the CPU bus the identification word and no operation command.

10. The method of claim 8 which further includes the step of changing the command in the control/address output register from invalidate to no operation and subsequently broadcasting onto the CPU bus the identification word and no operation command.

* * * * *